US012634101B2

(12) United States Patent
Olesen et al.

(10) Patent No.: US 12,634,101 B2
(45) Date of Patent: May 19, 2026

(54) SUB BAND FULL DUPLEX BASE STATION METHOD AND APPARATUS AND 6G USER EQUIPMENT

(71) Applicant: Oswego Technologies LLC, Columbus, NJ (US)

(72) Inventors: Robert Olesen, Huntington, NY (US); Soheil Rostami, Carrollton, TX (US)

( * ) Notice: Subject to any disclaimer, the term of this patent is extended or adjusted under 35 U.S.C. 154(b) by 0 days.

(21) Appl. No.: 19/366,324

(22) Filed: Oct. 22, 2025

(65) Prior Publication Data

US 2026/0128849 A1 May 7, 2026

Related U.S. Application Data

(60) Provisional application No. 63/775,962, filed on Mar. 21, 2025, provisional application No. 63/753,873, filed on Feb. 4, 2025, provisional application No. 63/737,149, filed on Dec. 20, 2024, provisional application No. 63/726,980, filed on Dec. 2, 2024, (Continued)

(51) Int. Cl.
| | |
|---|---|
| *H04L 5/14* | (2006.01) |
| *H04L 5/00* | (2006.01) |
| *H04W 72/232* | (2023.01) |
| *H04W 72/30* | (2023.01) |

(52) U.S. Cl.
CPC .............. *H04L 5/14* (2013.01); *H04L 5/0048* (2013.01); *H04W 72/232* (2023.01); *H04W 72/30* (2023.01)

(58) Field of Classification Search
CPC ...... H04L 5/14; H04L 5/0048; H04W 72/232; H04W 72/30
See application file for complete search history.

(56) References Cited

U.S. PATENT DOCUMENTS

2024/0178967 A1 * 5/2024 Mohandoss ........... H04L 5/0048
2024/0333444 A1 10/2024 Abotabl
(Continued)

FOREIGN PATENT DOCUMENTS

WO WO-2025231201 A1 * 11/2025 ............ H04W 76/15

OTHER PUBLICATIONS

CATT, "Summary #2 of SBFD TX/RX/measurement procedures," Oct. 14-18, 2024.
(Continued)

*Primary Examiner* — Ayanah S George

(57) ABSTRACT

A method performed by a subband full duplex (SBFD) compliant base station is disclosed herein. The method comprises transmitting a first indication of first SS/PBCH blocks of an SCELL of the base station and transmitting a second indication by way of a MAC CE, wherein the second indication configures second on demand SS/PBCH blocks, wherein the MAC CE specifies a number N of on-demand SSB bursts on the SCELL and an SFN offset. The method further comprises transmitting configuration information for a SRS transmission corresponding to the SCELL, wherein the configuration information for the SRS transmission includes power control settings for SBFD symbols and power control settings for non-SBFD symbols. The base station may transmit DCI on the SCELL which indicates whether the DCI corresponds to a dynamic grant or a static grant. Data is transmitted on subbands, based on the DCI, and SRS is received.

20 Claims, 48 Drawing Sheets

Related U.S. Application Data provisional application No. 63/719,573, filed on Nov. 12, 2024, provisional application No. 63/715,477, filed on Nov. 1, 2024.

(56)                    References Cited

U.S. PATENT DOCUMENTS

| | | | |
|---|---|---|---|
| 2025/0159467 A1 | 5/2025 | Zhang | |
| 2025/0184104 A1* | 6/2025 | Fakoorian | H04L 5/143 |
| 2025/0226852 A1 | 7/2025 | Lu | |
| 2025/0279865 A1 | 9/2025 | Grant | |
| 2025/0311007 A1* | 10/2025 | Abotabl | H04W 74/0866 |
| 2025/0317865 A1* | 10/2025 | Abotabl | H04W 52/50 |

OTHER PUBLICATIONS

LG Electronics, "Summary #1 of on-demand SSB for NES," Apr. 15-19, 2024.
CATT, "Summary #1 of subband non-overlapping full duplex," Aug. 22-26, 2022.
CATT, "Summary #1 of subband non-overlapping full duplex," Toulouse, France, Aug. 21-25, 2023.
3rd Generation Partnership Project, Technical Specification Group Radio Access Network, "Study on Evolution of NR Duplex Operation," 3GPP TR 38.858 V18.1.0 (Mar. 2024) (text only copy).

* cited by examiner

DL      SBFD/ FD-URLLC      UL

FIG. 26

DL      SBFD/ FD-URLLC      UL

SUB BAND FULL DUPLEX BASE STATION METHOD AND APPARATUS AND 6G USER EQUIPMENT

CROSS REFERENCE TO RELATED APPLICATIONS

This application claims priority from U.S. Provisional Patent Application No. 63/715,477, filed on Nov. 1, 2024, from U.S. Provisional Patent Application No. 63/719,573, filed on Nov. 12, 2024, from U.S. Provisional Patent Application No. 63/726,980, filed on Dec. 2, 2024, from U.S. Provisional Patent Application No. 63/737,149, filed on Dec. 20, 2024, from U.S. Provisional Patent Application No. 63/753,873, filed on Feb. 4, 2025 and from U.S. Provisional Patent Application No. 63/775,962, filed on Mar. 21, 2025, which are incorporated by reference as if fully set forth herein.

BACKGROUND

A communications system may be a multiple access system that provides content, such as voice, data, video, messaging, broadcast, etc., to multiple wireless users. The communications system may enable multiple wireless users to access such content through the sharing of system resources, including wireless bandwidth. For example, the communications systems may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

A communications system may include user equipment devices, which may be referred to herein as a wireless transmit/receive units (WTRUs). The communications system may also comprise a core network and other networks. In some examples, WTRUs may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

The communications systems 100 may also include a base station which may be any type of device configured to wirelessly interface with at least one of the WTRUs to facilitate access to one or more communication networks, such as the CN, the Internet, and/or the other networks. By way of example, each base stations may be a base transceiver station (BTS), a Node-B, an eNode B, a Home Node B, a Home eNode B, a gNB, a NR NodeB, a gNB, a 6GR node B, a site controller, an access point (AP), a wireless router, and the like. While the base stations described herein are each depicted as a single element, it will be appreciated that the base stations may include any number of interconnected base stations and/or network elements. Base stations may comprise communication circuitry including a processor, transceiver (transmitter/receiver) and an antenna.

A WTRU may include a processor, a transceiver, a transmit/receive element, a speaker/microphone, a keypad, a display/touchpad, non-removable memory, removable memory, a power source, a global positioning system (GPS) chipset and/or other peripherals. The processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor may perform signal coding, data processing, power control, input/output processing, and/or any other functionality that enables the WTRU to operate in a wireless environment. The processor may be coupled to the transceiver, which may be coupled to the transmit/receive element.

Subband full duplex (SBFD) is a wireless communication technique that allows simultaneous transmission and reception of signals within the same overall frequency band, but using different sub-bands. For instance, a base station may operate in a full duplex mode by simultaneously transmitting and receiving in the different sub-bands. UEs or WTRUs may perform half duplex operation by either receiving or transmitting at a particular instant or the WTRU may perform full duplex operation by receiving and transmitting at a same time.

SBFD has a capability to increase throughput and the uplink coverage, reduce transmission latency and support traffic with different requirements in the same cell in time division duplexing (TDD) bands.

BRIEF DESCRIPTION OF THE DRAWINGS

FIG. 26 shows a punctured FD-URLLC resource allocation;

FIG. 27 shows FD-URLLC PUSCH hopping, wherein UL URLLC puncturing is performed;

DETAILED DESCRIPTION OF THE DRAWINGS

Figure 1:
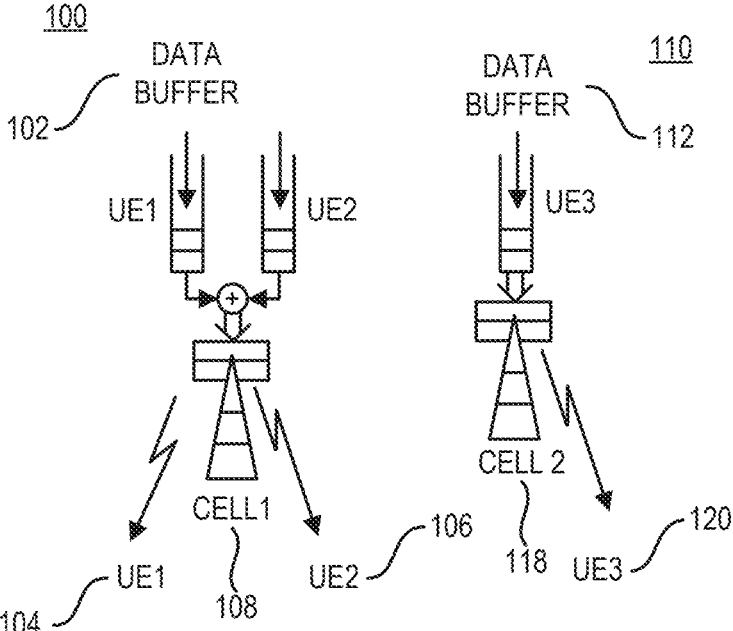
FIG. 1 shows scheduling for data services in 3GPP.

URLLC using a TDD frame format may need to meet two challenging requirements: ultra-low latency and ultra-high reliability. The design needs contradict each other, thus leading to some difficult design choices.

URLLC strives to meet the ITU-2020 requirements, which recite that the average latency of URLLLC (from source L2/L3 to destination L2/L3) should be less than 0.5 msec. The reliability is expected to be at least 0.99999, note that 4G system has a reliability of 0.99 at best. URLLC is meant to address mission-critical use cases such as remote driving, flight, and remote surgery. URLLC is a service class that typically co-exists with an eMBB and/or mMTC service.

To meet the stringent reliability requirements for URLLC, the channel estimation accuracy must be improved as much as possible relative to the other services. This is addressed by providing more resources to the pilot for URLLC and using an advanced channel estimation technique. To reduce latency, very short packets are typically used. This implies a tight timing accuracy requirement.

When there is a URLLC service request, whether in the scheduling period or in the middle of an eMBB or mMTC transmission, the base station may transmit the URLLC packet immediately. This is typically done by puncturing the eMBB transport block to accommodate the immediate scheduling of a URLLC transport block. This requires some tradeoffs in the resource scheduling opportunities for the URLLC packet, which may contend with the eMBB, and/or mMTC resources. In the interest of addressing the use cases envisioned for URLLC, latency is considered a priority relative to other KPIs.

The design for URLLC packets may emphasize the processing latency $T_{proc}$. In addition, the propagation/processing latency Tttt may be minimized. Toward this goal, the pilot, control, and data portions of the URLLC packet are placed close to one another in the URLLC frame structure.

For 3GPP NR Polar Coding was chosen as the channel coding scheme for control packets, and LDPC coding for the data packets.

For 3GPP 5G NR, relative to eMBB or mMTC the resource allocation for the URLLC packet is narrow in time and extended in frequency. This allows prioritizing the minimization of latency. Another aspect that can be used to control the latency is the sub-carrier spacing. When the carrier frequency is above 6 GHz it is possible to increase the sub-carrier spacing to 60 KHz or 120 KHz relative to the 15 kHz baseline that 5G NR uses for non-latency-sensitive packets. By using a higher sub-carrier spacing (e.g. 60 kHz, or 120 kHz) the symbol length can be reduced by more than half. As noted this is suitable for bands that are greater than 6 GHz. For less than 6 GHZ, increasing the sub-carrier spacing may not be desirable due to the delay spread; in this case, 3GPP NR has defined a mini-slot (e.g. 2-3 symbols) and slot level (e.g. 7 symbol) transmission where in Tttt can be reduced. Using the mini-slot the Tttt can be made less than 1 ms. To support this flexibility in the frame structure 3GPP NR has utilized an advanced receiver design that supports fast tracking, synchronization, and pipelined decoding functions.

Frame Structure

The following table provides the time domain parameters of 3GPP NR assuming a normal CP.

TABLE 1

| Frame Structure Parameters | |
| --- | --- |
| Parameter | Value |
| Radio Frame Length | 10 ms |
| Subframe Length | 1 ms |
| No. of OFDM Symbols in a slot | 14 |
| No. of Slots in a Frame | Numerology Dependent |

The following table summarizes the number of slots in a frame for each numerology for normal CP,

TABLE 2

| | | Frame Structure Numerology | | |
| --- | --- | --- | --- | --- |
| m | SCS (kHz) | No. of Slots per Subframe | No. of Slots per Radio Frame = $10*2^m$ | Slot Duration (ms) |
| 0 | 15 | 1 | 10 | 1 |
| 1 | 30 | 2 | 20 | 0.5 |
| 2 | 60 | 4 | 40 | 0.25 |
| 3 | 120 | 8 | 80 | 0.125 |
| 4 | 140 | 16 | 160 | 0.0625 |

The number of TTIs are scalable in NR A TTI can have different time durations and is dependent on the SCS. A short TTI is also referred to as a mini-slot and can be used of URLLC for ultra-low latency services.

Although a URLLC TDD packet may be scheduled nearly in real-time, the method by which this is done may have to be a compromise with the baseline 5G NR scheduling schemes for eMBB and mMTC.

There are two types of scheduling for URLLC, 1) Instant Scheduling 2) Reservation-based scheduling. For reservation-based scheduling, either semi-static or dynamic reservations are available. For semi-static reservations, the resource information is sent infrequently, while for dynamic reservations, the resource information is updated frequently using the control channel of the scheduled user. The drawback of semi-static reservations is that if the resource(s) are not needed for a particular URLLC transmission, the resources may be wasted.

3GPP Release 19 introduced many enhancements to 5G Advanced; one of these was the introduction of a study group for Sub-Band Full Duplex as described in the Revised WID by Huawei.

URLLC shares many of the scheduling attributes and issues with those of SBFD when operating using the TDD mode. The various forms of possible scheduling approaches are also shared to some extent. Dynamic TDD resource scheduling is described in embodiments. Static scheduling may also be performed. URLLC and SBFD share several scheduling issues using TDD such as: (a) the non-concurrent availability of DL and UL transmission opportunities and (b) the potential for undesirable cross-link interference (CLI) between neighboring BSs and user equipment (UEs) devices.

In so far as there are differences between URLLC, which requires low latency/ultra-high reliability, and Sub-Band Full Duplex (SBFD), which is intended to address spectral efficiency for TDD, there is the potential for mutual benefits by leveraging the commonality in scheduling requirements.

As noted for LTE the TDD slot configuration is fixed; however, for NR there is much more flexibility. NR supports the configuration of slot formats using static, semi-static, or a fully dynamic schedule. A slot configuration may be configured using the RRC which may consist of two parts, 1) the IE tdd-UL-DL-ConfigurationCommon which provides all the UEs in the cell with a cell-specific DL/UL pattern, and 2) the IE tdd-UL-DL-ConfigurationDedicated which uses dedicated RRC signaling. This UE specific configuration may also further modified/allocate the unallocated (flexible) slots and symbols by tdd-UL-DL-ConfigurationCommon. Lastly to facilitate URLLC a mini-slot allocation is possible, which helps to reduce the latency.

For this embodiment, it may be that only a Master Cell Group (MSG) is present; however, the concepts can be extended to the Secondary Cell Group (SCG).

For dedicated RRC signaling (using the IE TDD-UL-DL-ConfigDedicated), the network may configure flexible slots in a UE-specific manner. Slot configurations are defined in 3GPP 38.213.

Using DCI Format 2-0 scheduling, a very dynamic TDD configuration can be achieved on short notice by referencing the slot configuration description in section 11 of 3GPP 38.213.

The slot configuration for SBFD may support either FDD or TDD modes of operation. However, TDD provides more flexibility as well as advantages for its use. Some options for allocation of resources are given in "Performance Analysis of Subband Full Duplex for 5G-Advanced and 6G Networks Through Simulations and Field Tests." IEEE Open Journal of the Communications ,31 to texociety," 4, 2451-2467, to Wei, X., Li, J., Liang, C., Han, X., Ren, M., & Liu, R. (2023), reproduced herein by way of reference in its entirety. Wei discloses different duplex modes including legacy TDD mode, legacy FDD mode, SBFD pattern 1 and SBFD pattern 2.

As described in 3GPP Release 19 one method for a SBFD resource allocation using TDD is shown in Wei (c) SBFD pattern 1.

By leveraging simultaneous DL/UL transmissions in each timeslot, it is possible for SBFD to significantly improve its spectral efficiency.

For URLLC to reduce latency, the UL channel may use a mini-slot, which can consist of 2-6 symbols for the UL data and feedback. This enables a lower latency and improved reliability for those applications that may require it. In the case of URLLC it leverages the simultaneous transmission of DL and UL within a timeslot; however, it does not benefit from the scheduling features of URLLC to improve the latency.

In this application, embodiments contemplate using SBFD and also leverage the scheduling flexibility of URLLC to benefit SBFD with the latency and reliability benefits of URLLC. One such capability is the use of mini-slots for the simultaneous scheduling of SBFD and URLLC in a mini-slot.

This application introduces the concepts for an enhanced SBFD service which can be referred to as "SBFD advanced".

SBFD in Release 19 utilizes many methods from the 3GPP NR TDD wireless communication specification [8]. These include resource allocation methods, random access methods, timing synchronization, timing advance, and other associated measurement procedures.

To facilitate the simultaneous low-latency transmission of URLLC and SBFD an embodiment for a short transmission time interval is described. In the current state of the art (3GPP TDD Release 19) SBFD uses a TDD time slot scheduling approach that is similar to the time domain scheduling of eMBB/URLLC services. Since URLLC may account for ultra-low latency, it includes features that allow the use of a small transmission time interval, which may be called a mini-slot. For each UE, data from higher layers is received at the serving cell and stored in a user-specific transmission buffer, as illustrated in FIG. 1.

The URLLC latency is measured from the arrival of a URLLC packet until it is successfully received at the UE. Regarding URLLC latency, the total latency is TL. For a given error probability Pe the successful arrival of the first packet may be estimated to be P(T=TL)=1-Pe. The transmission of a URLLC packet may take at least one TTI but may take multiple TTIs depending on the available resources, payload size, scheduler or service priorities, and radio channel conditions.

FIG. 1 shows scheduling for data services in 3GPP. On the left hand side 100, a data buffer 102 is provided by a first cell 108, wherein the data buffer is split and data is transmitted to a first UE 104 and a second UE 106. On the right hand side 110, a data buffer 112 is provided by a second cell 118, wherein the data buffer is dedicated to a third UE 120.

Assuming a short TTI 2 symbol OFDM (0.143 ms) mini-slot resolution, a method to schedule the simultaneous transmission of URLLC, SBFD, and eMBB services is described. A slot can be classified as downlink (all symbols are dedicated for downlink) or uplink (all symbols are dedicated for uplink) or mixed uplink and downlink transmissions. Similar to a LTE TDD system, a guard period is necessary for transceiver switching from downlink to uplink and to allow timing advance in the uplink. NR TDD uses a flexible slot configuration. OFDM symbols in a slot can be classified as 'downlink', 'flexible', or 'uplink'. Flexible symbols can be configured either for uplink or for downlink transmissions. The configuration using the PDCCH DCI of the slot format can be done using a static, semi-static or fully dynamic approach. The purpose for the different scheduling approaches is to enable the gNB to adapt to different scenarios, such as in-home, city, or urban environments.

In Release 19 a SBFD schedule may be static or semi-static and may be scheduled at the same periodicity as the existing eMBB service. An example of this is shown in FIG. 2 below.

Figures 2, 3:
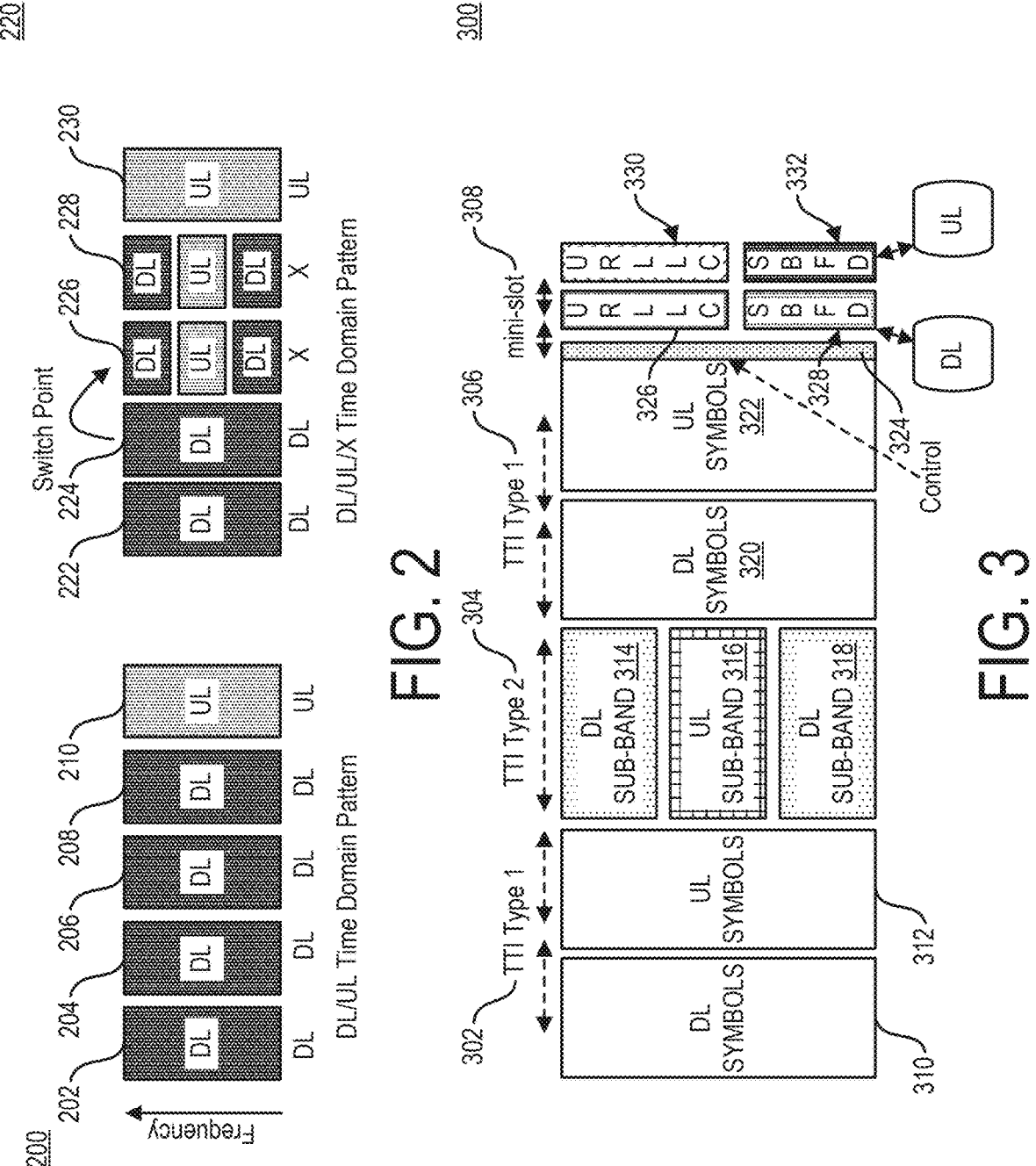
FIG. 2 shows an DL/UL time domain pattern having a format DL, DL, DL, DL, and UL.
FIG. 3. shows scheduling transmission of simultaneous SBFD and URLLC.

FIG. 2 shows Semi-Static Scheduling of a SBFD Service. As noted for FIG. 2, a URLLC transport block may be scheduled immediately, which may be facilitated by puncturing the eMBB transport block. Prior art 3GPP standards do not describe scheduling of a SBFD transport block using a punctured trigger-based non-slot based schedule. For URLLC a non-slot based pre-emptive or non pre-emptive scheduling is supported.

FIG. 2 shows a DL/UL time domain pattern 200 having a format DL 202, DL 204, DL 206, DL 208, and UL 210. FIG. 2 shows a DL/UL/X time domain pattern 220 having a format DL 222, DL 224, DL/UL/DL 226, DL/UL/DL 228 and UL 230.

Dynamic/Flexible time division duplex (TDD) scheduling using a slot format indicator (SFI) can be indicated to a group of UEs by a group-common (GC) DCI (Format 2_0), or UE specific DCI format. In addition, semi-static configurations via tdd-UL-DL-config-common/dedicated may also be configured, where the transmission pattern for each slot/symbol can be configured as either 'D' as downlink, 'U' as uplink, and 'F' as flexible which may also be referred to as a 'X' special slot.

In an embodiment, the simultaneous scheduling of URLLC and SBFD may be supported, as shown in FIG. 3. FIG. 3 shows Scheduling Transmission of Simultaneous SBFD and URLLC 300.

FIG. 3 shows TTI Type 1 302, 306 and TTI type 2 304, and mini-slots 308, which may be from 2 to 7 symbols long. Each may represent different SCS's and resource granularities. In the case of SBFD and URLLC, a pre-emption based dynamic or semi-static allocation to a sub-band is possible. A sub-band may overlap an eMBB RBG, or it may be non-overlapped. Referring to TTI type 1 302, DL symbols 310 and UL symbols 312 are employed. In TTI type 2 304, a DL sub band 314 is located above an UL sub band 316 which is above a DL sub band 318. In a second instance of TTI type 1 306, DL symbols 320 may precede UL symbols 322. There may be a control symbol(s) 324. Mini slots 308 may comprise a DL URLLC dedicated portion 326, a DL SBFD portion 328, an UL URLLC dedicated portion 330 and an UL SBFD portion 332. Other combinations/permutations may be employed without diverging from the scope thereof. There may be gap time/frequency portions located in between data and control portions.

The semi-static indication of the URLLC and SBFD subband frequency locations may be explicitly indicated by an RRC message or may be indicated in a DPCCH SIB 1 message for a UE in a RRC_CONNECTED state. In Release 19 a symbol may be identified as an SBFD type, URLLC type, or a non-SBFD type. In this allocation, a symbol type may be extended to include a SBFD type, URLLC type, URLLC/SBFD type, or non-URLLC/SBFD type.

For cell-specific indication of the SBFD and URLLC subband frequency location, the frequency locations of the UL subband and DL subband(s) may be explicitly configured. Guardband(s), if any, are implicitly derived as the RBs that are not within UL subband or DL subband(s).

For the configuration of SBFD and URLLC symbols within a TDD-UL-DL non-overlapping pattern period, the following parameters may be supported for each or simultaneously for all/both. Although two patterns are currently supported, this may be extended to support more than two patterns. These parameters include a starting slot index, a starting symbol index within the starting slot, an ending slot index and an ending symbol index within the ending slot.

For RRC connected mode UEs, at least a cell-specific configuration of the time and frequency location of simultaneous non-overlapped SBFD and URLLC subbands may be supported within a TDD carrier. Additional support for UE-specific configuration on time and/or frequency locations of SBFD and URLLC subbands may also be supported. Both the time- and frequency-domain location of UL subbands may serve URLC, SBFD, or both.

Signaling of the frequency and time location of the UL subband via RRC a common configuration or a SIB enabled the SBFD and/or URLLC capability of the cell to be taken into account for a cell (re-)selection purpose, e.g. for better coverage/cell-edge performance.

Allowing for a UE-specific configuration of the time and/or frequency locations of SBFD and URLLC subbands enables the AP to force some UEs to be subject to some restrictions to improve Cross Link Interference (CLI). For example, some UEs may be restricted to certain Resource Block Groups (RBG) that allow them to avoid UE-to-UE CLI. An extension of the RRC configuration may also support other scenarios, such as dual connectivity, EN-DC or NR-DC, or carrier aggregation for simultaneous URLLC and SBFD operations.

In another embodiment, a UE-specific configuration of the time and/or frequency locations of simultaneous URLLC and SBFD may define an extended guardband between the URLLC and/or SBFD services and non-URLLC/SBFD services. The gaurdband may be defined as a index for a frequency, time, or both locations and/or ranges.

For RRC connected mode UEs the URLLC/SBFD subband time locations may be configured with a periodic pattern. The periodic pattern may be static or semi-statically defined.

A slot may consist of SBFD, URLLC, URLLC/SBFD, symbols, and/or non-URLLC/SBFD symbols.

URLLC/SBFD and/or flexible symbols may be configured implicitly within a DL symbol or in a TDD-UL-DL-ConfigCommon message, TDD-UL-DL-CofigUE-Specific message, or parameter. The configured URLLC/SBFD symbols may start from any symbol within a slot and end in any symbol within a slot.

A referenceSubcarrierSpacing in TDD-UL-DL-Config-Common may be used as a reference SCS for the allocation of simultaneous URLLC/SNFD services.

A symbol configured as a SBFD type, URLLC type, URLLC/SBFD type, or non-URLLC/SBFD type via a cell-specific configuration method cannot be reverted to a non-URLLC/SBFD symbol via any UE-specific configuration or group-common signaling.

A symbol not configured as a SBFD type, URLLC type, URLLC/SBFD type, or non-URLLC/SBFD symbol via cell-specific configuration cannot be reverted to an SBFD or URLLC/SBFD symbol via any UE-specific configuration or group-common signaling.

Release 19 allows to configure one or two TDD-UL-DL patterns, each with a corresponding combination of UL, DL and flexible symbols and a periodicity (provided via dl-UL-TransmissionPeriodicity). When two TDD-UL-DL patterns are configured, the two patterns may be 'appended' with each other in the time domain and repeated periodically: pattern1, pattern2, pattern1, pattern2, and so on. When two TDD-UL-DL-Pattern are configured, a "slot configuration period" may be defined as the sum of the periodicity of the first period (dl-UL-TransmissionPeriodicity in pattern1) and second period (dl-UL-TransmissionPeriodicity in pattern2) as defined in TS 38.213. The symbol subband locations may use one of two options for periodic repetition.

In a first option, the period may be the sum of the two TDD-UL-DL pattern periods configured by dl-UL-TransmissionPeriodicity in TDD-UL-DL-ConfigCommon, the URLLC/SBFD subband locations may repeat periodically in every "slot configuration period P+$P_2$, for example, as in pattern1+pattern2, pattern1+pattern2, . . . where pattern1 and pattern2 may or may not be configured ith URLLC/SBFD subbands.

In a second option, the period may be an integer multiple of the sum of the two TDD-UL-DL pattern periods configured by dl-UL-TransmissionPeriodicity in TDD-UL-DL-ConfigCommon. The URLLC/SBFD subbands may be configured to only apply to every Nth element of the sequence pattern1+pattern2, pattern1+pattern2.

In an embodiment, the TDD UL/DL slot configuration may be semi-statically, periodically, or dynamically modified using a cell-specific signaling mechanism. For example, it may be beneficial to update the location of SSB and/or CSI-RS signal locations within the UL/DL slot configuration.

Figure 4:
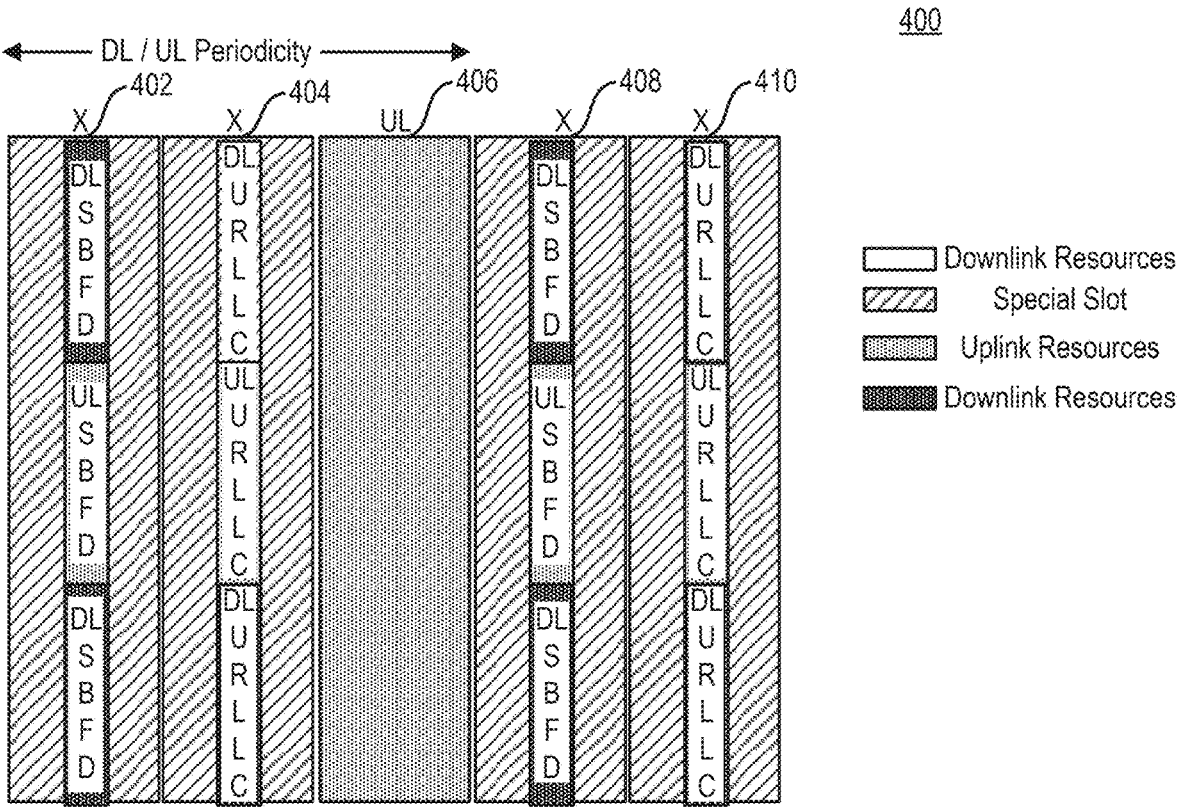
FIG. 4 shows a periodic slot schedule for simultaneous SBFD and URLLC services.

FIG. 4 shows a periodic slot schedule 400 for simultaneous SBFD and URLLC services. An embodiment for transmission periodicity may be as shown in FIG. 4 where the slots may be labeled as either DL, UL, or X. X may be referred to as a "special" slot, which may contain a mix of DL/UL slot configurations. The example demonstrates the use of an SBFD mini-slot for SBFD symbols and a URLLC subband full duplex mini-slot, which may use the abbreviation SBFD_URLLC, which includes URLLC symbols.

Specifically, referring to FIG. 4, a first X portion 402 is followed by a second X portion 404 which is then followed by an UL portion 406. This may repeat, for example, portion X 408 may mirror portion X 402 and portion 410 may mirror portion 404, etc.

Figure 5:
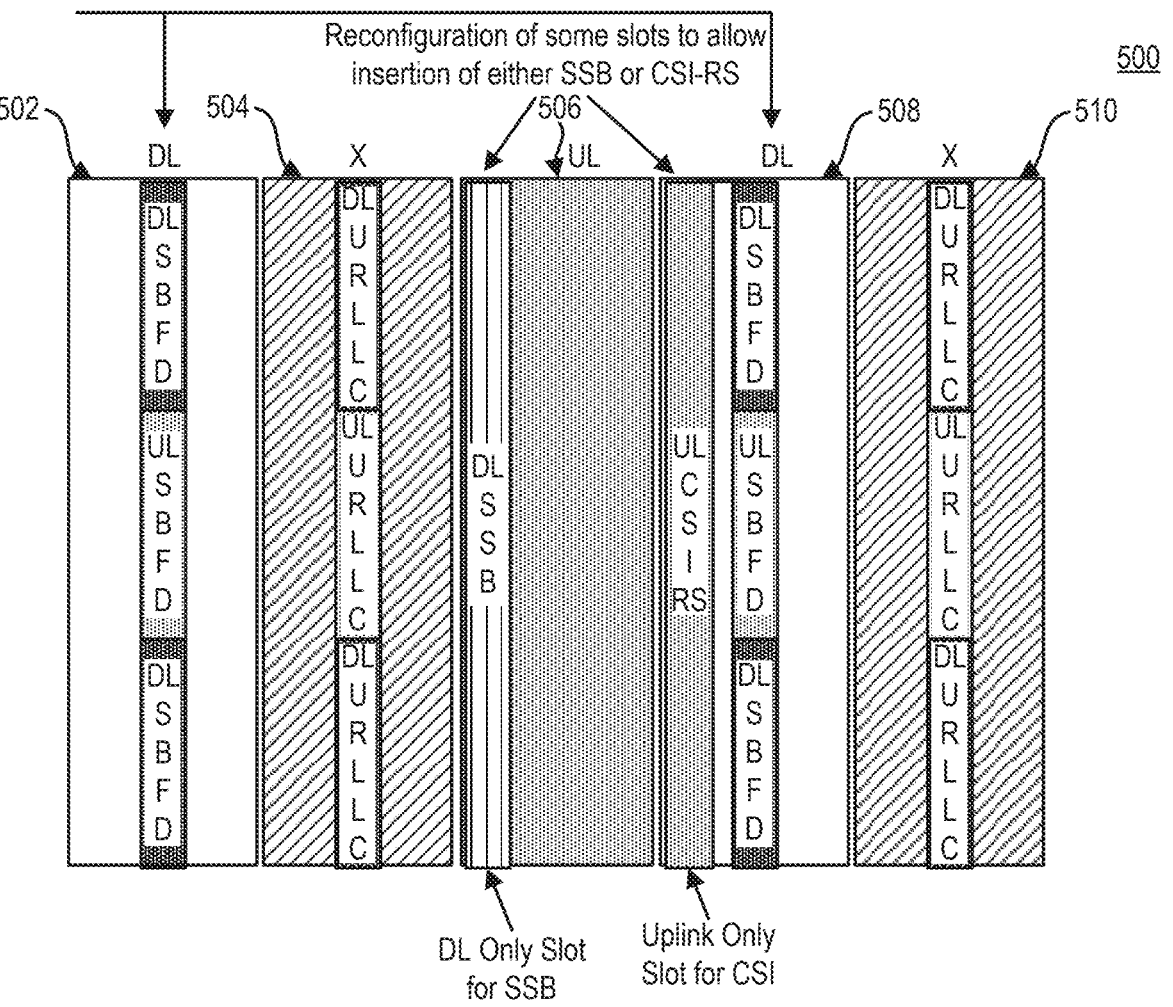
FIG. 5 shows five time portions.

As previously noted, the transmission periodicity may be semi-statically, periodically, or dynamically modified using a cell-specific signaling mechanism reconfigured, as shown in FIG. 5.

FIG. 5 is an example 500 that shows five time portions 502-510. The first portion 502 and the fourth portion 508 have been reconfigured to DL eMBB, wherein SBFD and SBFD_URLLC mini-slots have punctured them. The third portion 506 and fourth portion 508 have been reconfigured to include an SSB synchronization signal and a CSI-RS channel estimation signal, respectively.

Interferent Management

Full duplex presents some unique challenges for TDD operation, which include the following aspects: gNB-to-gNB co-channel CLI, gNB inter-sub-band Self Interference, Inter-gNB inter-sub-band interference, Inter-gNB intra-sub-band interference, UE-to-UE Power Domain CLI, Intra-gNB-to-UE CLI, UE-to-UE co-channel CLI, UE-to-UE co-channel inter-sub-band CLI and Remote Interference Management (RIM) due to Atmospheric Ducting.

Existing Bandwidth Part (BWP) scheduling methods may be able to be reused with SBFD, URLLC, and/or URLLC/SBFD; however, within a BWP, scheduling a CLI becomes a more difficult issue. Note that DL and UL have individual challenges that may need to be addressed separately.

Measurement procedures are provided herein that address these challenges.

A difficulty is coordinating scheduling interference management of resources across URLLC/SBFD DL/UL/X for a subband. For example, CLI of DL-to-UL and UL-to-DL can lead to a significant degradation of performance. It is also possible that UL resources may be limited compared to those for DL. UL coverage may suffer as a result. It is also possible that latency may be negatively impacted if the scheduling of resources is restricted to a particular timeslot relative to the occurrence of CLI.

A method to address this is the ability for CLI measurements and DL/UL resource allocation flexibility to enable this.

Figures 6, 7:
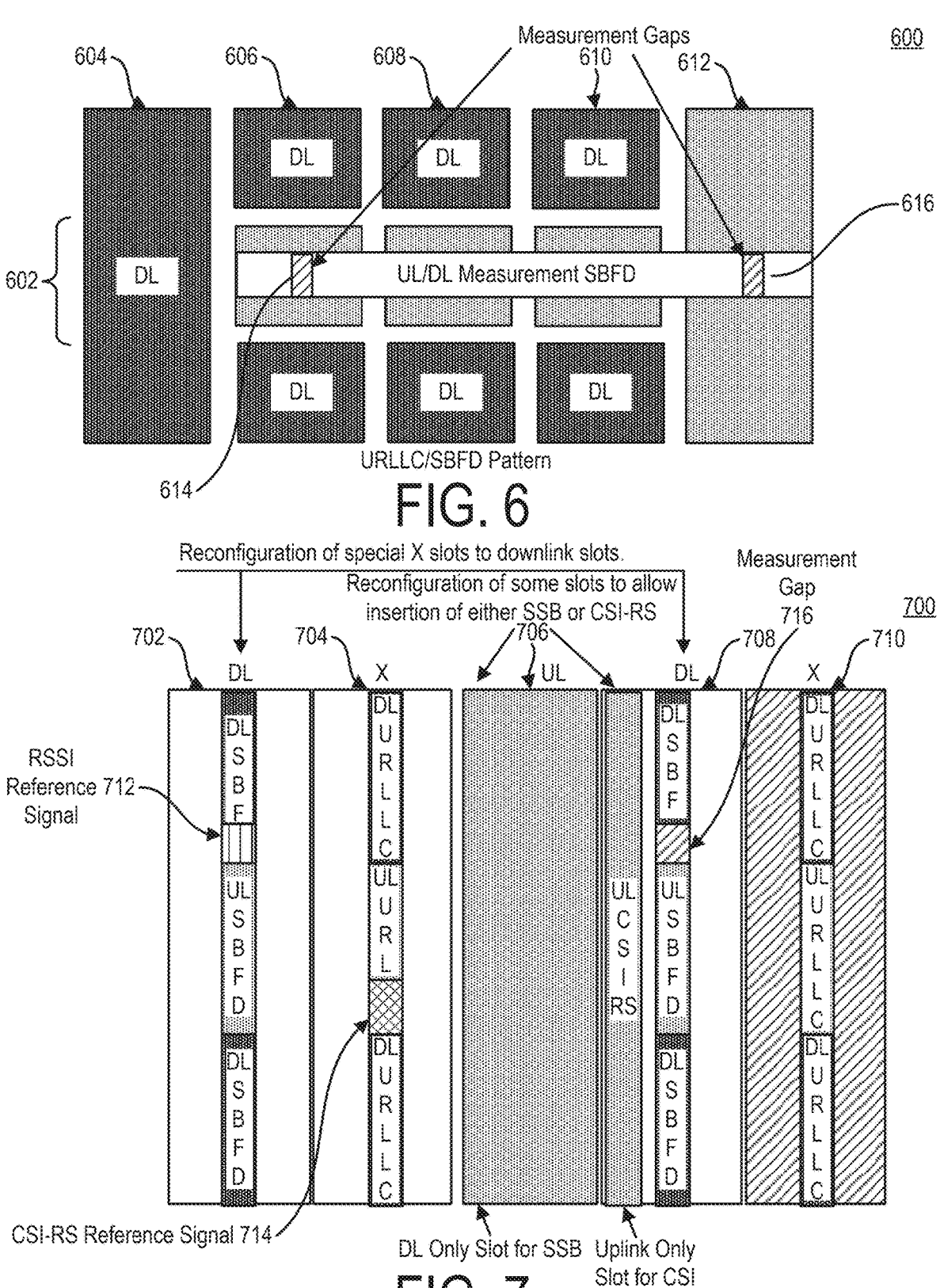
FIG. 6 shows a time/frequency configuration having a time invariant UL or DL CLI measurement subband.
FIG. 7 shows reference signal or measurement gap occurrences.

FIG. 6 shows a time/frequency configuration 600 having a time invariant UL or DL CLI measurement subband 602. Initially, a DL time portion may be employed, followed by DL/UL/DL time portions 604-610 and an UL portion 612. To enable scheduling flexibility for UL CLI measurements, an UL subband may be configured that spans the timeslots for DL/UL/X and URLLC/SBFD transmission slots. To better coordinate/manage the interference, it may be preferred to have the same uplink subband configuration for all full duplex UEs in the same cell and the same uplink subband configuration for all the adjacent gNBs. The UL measurement subband may be excluded from either dynamic or semi-static scheduling of data resources. Instead, it may be reserved for CLI measurement purposes. A time invariant subband, e.g. subband 602, may also allow dynamic measurement gaps, e.g. measurement gaps 614, 616, which may allow inter-band/inter-slot measurements without otherwise affecting resource scheduling on the URLLC/SBFD slots. In a similar manner, a DL subband may be configured if, for example, the resource configuration is UL-heavy.

In an embodiment, a CSI-RS and/or RSSI measurement resource may be allocated to a specific URLLC/SBFD time slot occurrence as shown in FIG. 7.

FIG. 7 shows Reference Signal or Measurement Gap Occurrences 700. FIG. 7 shows five time portions 702-710. The first portion 702 and the fourth portion 708 have been reconfigured to DL eMBB, wherein SBFD and SBFD_URLLC mini-slots have punctured them. The third portion 706 and fourth portion 708 have been reconfigured to include an SSB synchronization signal and a CSI-RS channel estimation signal, respectively. In the first portion, 702 an RSSI reference signal 712 is included. In the second portion 714, a CSI-RS reference signal is included. In the fourth portion 708, a measurement gap 716 is included.

Downlink Preemption Indication

3GPP NR Release 16 developed an effective mechanism for the dynamic multiplexing of eMBB and URLLC services. There are two methods available for the scheduling of eMBB and URLLC service resources: static Frequency Division Multiplexing (FDM), and Dynamic FDM. This is accomplished using a downlink preemption (DLP) indication framework. This allows the base station to signal eMBB users that a URLLC service may be scheduled within the resource pool. To accomplish this, Release 16 introduced a signaling approach called a downlink preemption indication (PI). Each eMBB user can be configured by the base station to periodically monitor a downlink PI signal, which indicates a subset of resources in the last monitoring period over which no transmission to the user is present. Since this is also unpredictable, it may be initiated spontaneously, thus allowing an urgent URLLC message to be sent.

Figure 8:
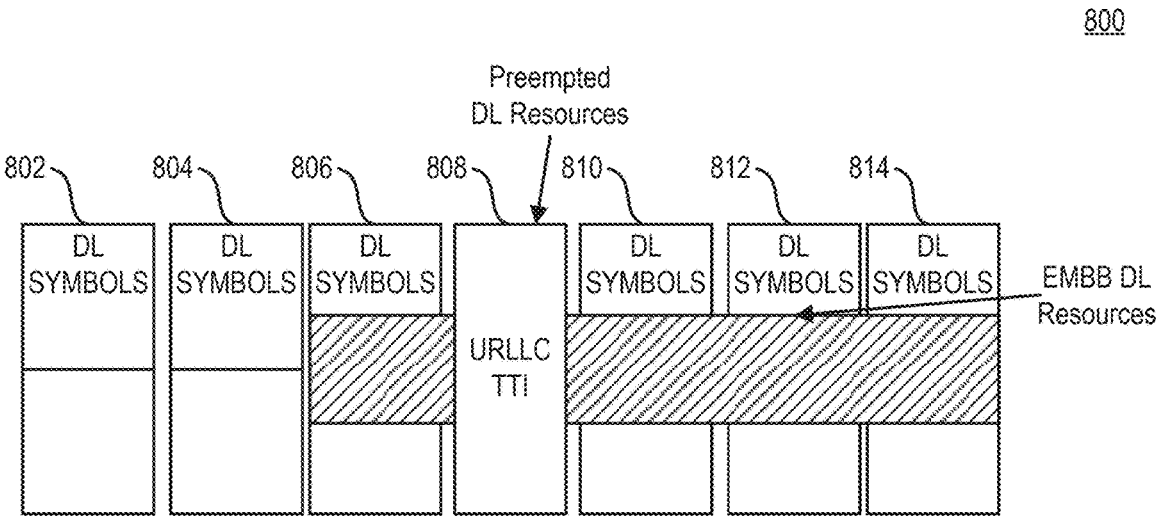
FIG. 8 shows preemption for URLLC resources.

FIG. 8 shows Preemption for URLLC Resources 800. Time intervals 802-814 may be configured for DL. There may be eMBB DL resources configured in time intervals 806-804 and DL resources in time interval 808 may be preempted with URLLC data.

To schedule simultaneous eMBB, URLLC, and SBFD resources, a DLP approach may also be used. However, there are some unique characteristics to this that are considered. This is summarized as follows. A URLLC service may account for low latency, urgent messages. SBFD is typically reserved for optimization of the spectral efficiency. However, spectral efficiency is also an issue for a URLLC service, and low latency may be an issue for SBFD services. SBFD was not initially considered for low latency services. However, a low latency service that benefits from the advantage of using half or full duplex would be highly beneficial. The preemption signaling for the simultaneous use of URLLC and SBFD services should consider the requirements of each without compromising either. There may be a mix of static versus dynamic scheduling of the simultaneous use of URLLC and SBFD services, which may be enabled.

A DLP indication may signal the simultaneous use of URLLC and SBFD services. This preemption may be on its own or at the same time as other eMBB and SBFD services that use the legacy method for the scheduling of these resources. An example of this preemption may be as illustrated by FIG. 9.

Figure 9:
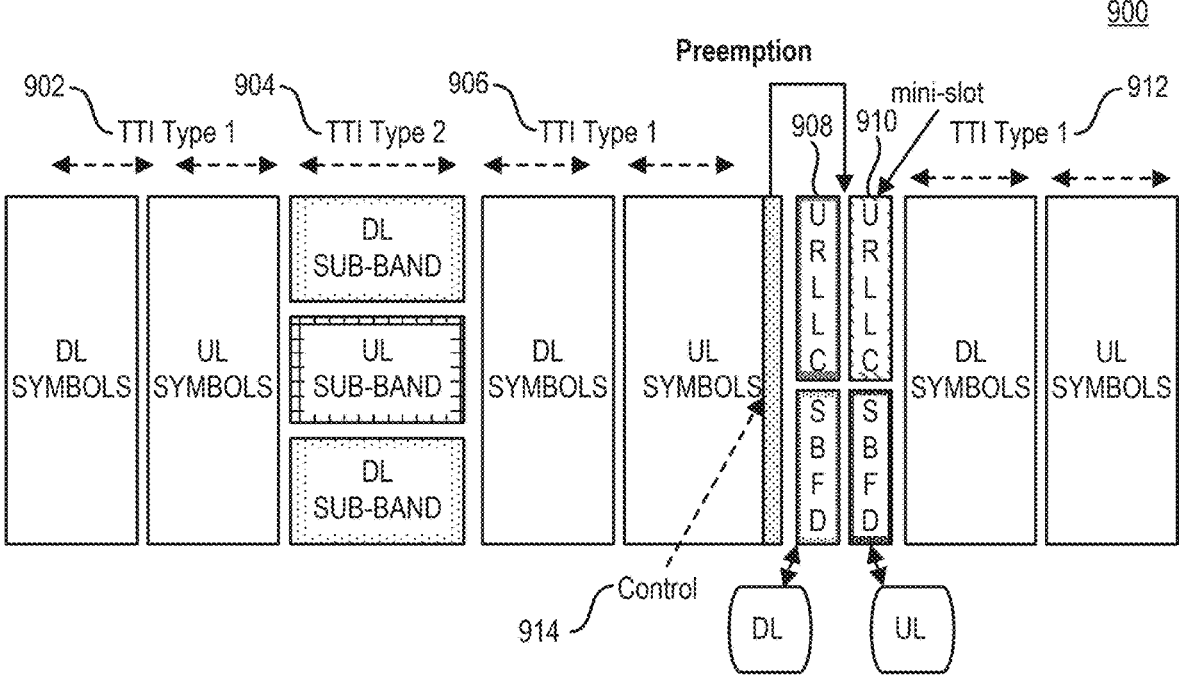
FIG. 9 shows preemption for simultaneous URLLC and SBFD services.

FIG. 9 shows preemption 900 for simultaneous URLLC and SBFD services. Specifically, FIG. 9 shows time intervals 902 of a TTI type 1, a time 904 interval of a TTI type 2, time intervals 906 of a TTI type 1, DL mini slot 908, UL mini slot 910 and time slots 912 of a TTI Type 1. HARQ services may be required by the URLLC and SBFD services. HARQ requires an active buffer for the DL data symbols. Typically for URLLC services, when a preemption is signaled, any outstanding symbols in the buffer for the punctured eMBB service are discarded, and the HARQ process is restarted when the eMBB service restarts. This mechanism may be required for a preempted SBFD service; in this case there may be separate buffers for the URLLC and SBFD services, and as a consequence, there may be separate indications of the HARQ buffer reset indication.

Figure 10:
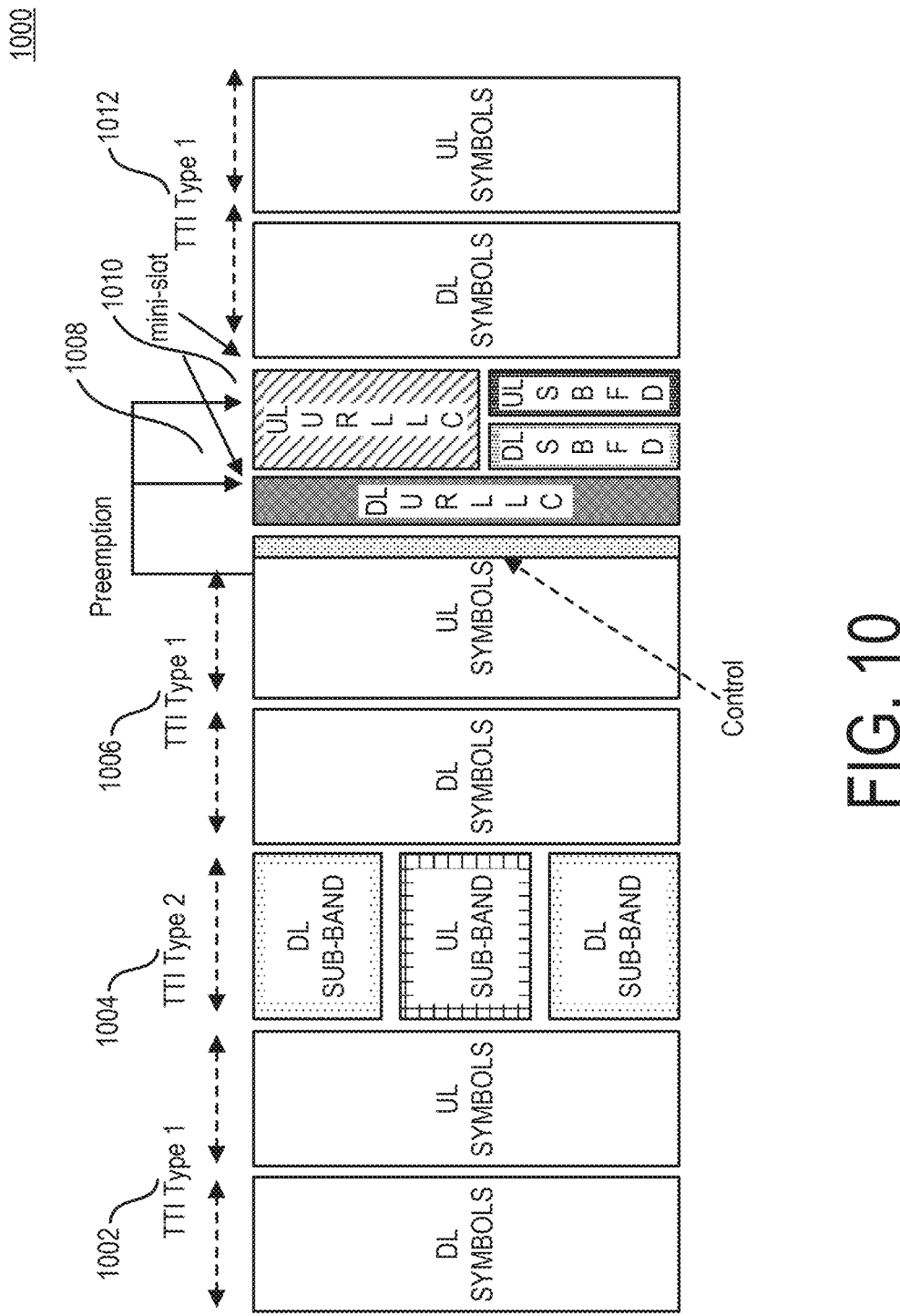
FIG. 10 shows an example of simultaneous preemption of traditional URLCC and preempted SBFD.

In FIG. 9, both the URLLC and SBFD services are shown as full duplex; however, in an embodiment, the URLLC may be more typical of its legacy approach, while at the same time the SBFD service is still full duplex; this is demonstrated in FIG. 10.

FIG. 10 shows an example 1000 of Simultaneous Preemption of Traditional URLCC and Preempted SBFD. In the example, downlink and uplink symbols of TTI type 1 1002 are followed by SBFD TTI type 2 1004 followed by TTI type 1 1006. A last (or other symbol) of TTI type 1 1006 may include control information that preempts mini slot 1008 and/or mini slot 1010 so as to provide an opportunity for DL URLLC traffic in mini slot 1008 and for UL URLLC traffic in mini slot 1010. Mini slots 1008 and 1010 may be followed by a TTI type 1 time period 1012.

Uplink Preemption Indication

To enable uplink preemption, an uplink preemption indication (ULI) may be used. In one example, a ULI may indicate a non-contentious uplink grant for simultaneous URLLC and SBFD services. With this preemption, the URLLC and SBFD services may be either simultaneous or staggered in the UL. To facilitate this, the preemption indication may provide the frequency and time resources for both the URLLC and SBFD services.

The indication of the time frequency locations of the URLLC and SBFD resources may be indicated, or reserved, at the same time as the eMBB uplink grant or as part of a RRC or DCI message and used at the time of the preemption indication.

Figure 11:
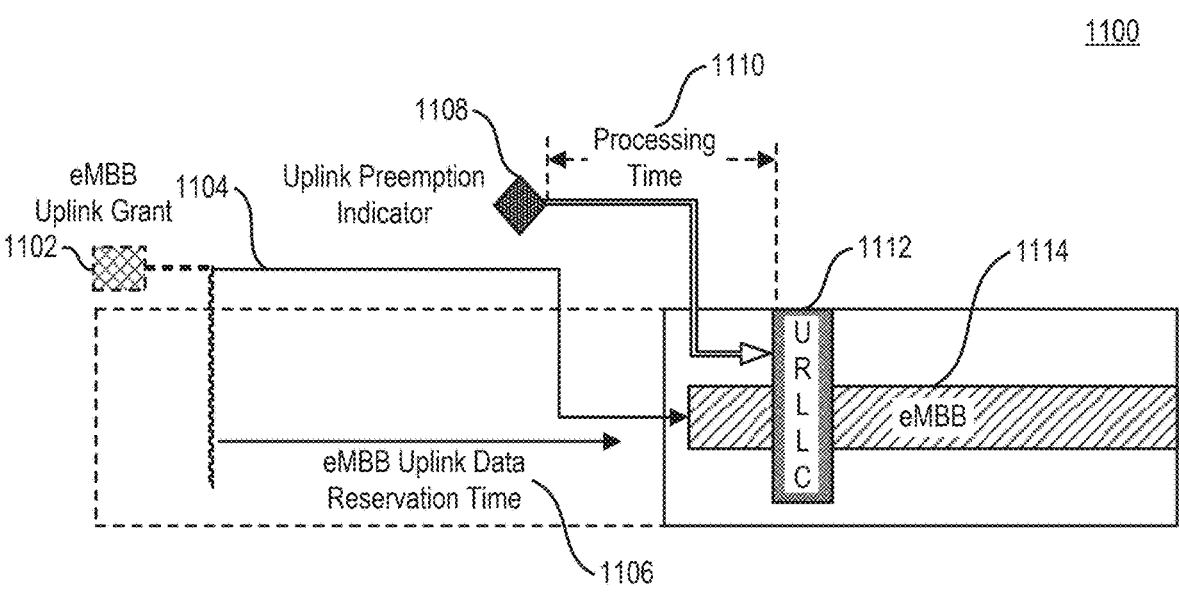
FIG. 11 shows an example of Uplink Preemption for URLLC

FIG. 11 shows an example 1100 of Uplink Preemption for URLLC. For this case there is an important difference relative to that of the downlink, that is the ULI may be signaled to the UE eMBB user prior to the UE's uplink URLLC transmission, in contrast to the downlink, which is during the downlink transmission. Consequently, to meet the latency requirement for URLLC, the UE may need to monitor the ULI very often, i.e., much less than 1 ms. In FIG. 11 an eMBB uplink grant 1102 is provided to schedule eMBB traffic 1114. The eMBB uplink grant has a reservation time 1106. During the reservation time 1106 an uplink premption indicator 1108 may be used to preempt the eMBB traffic 1114, after a processing time 1110, such that URLLC traffic 1112 may be transmitted for processing.

Figure 12:
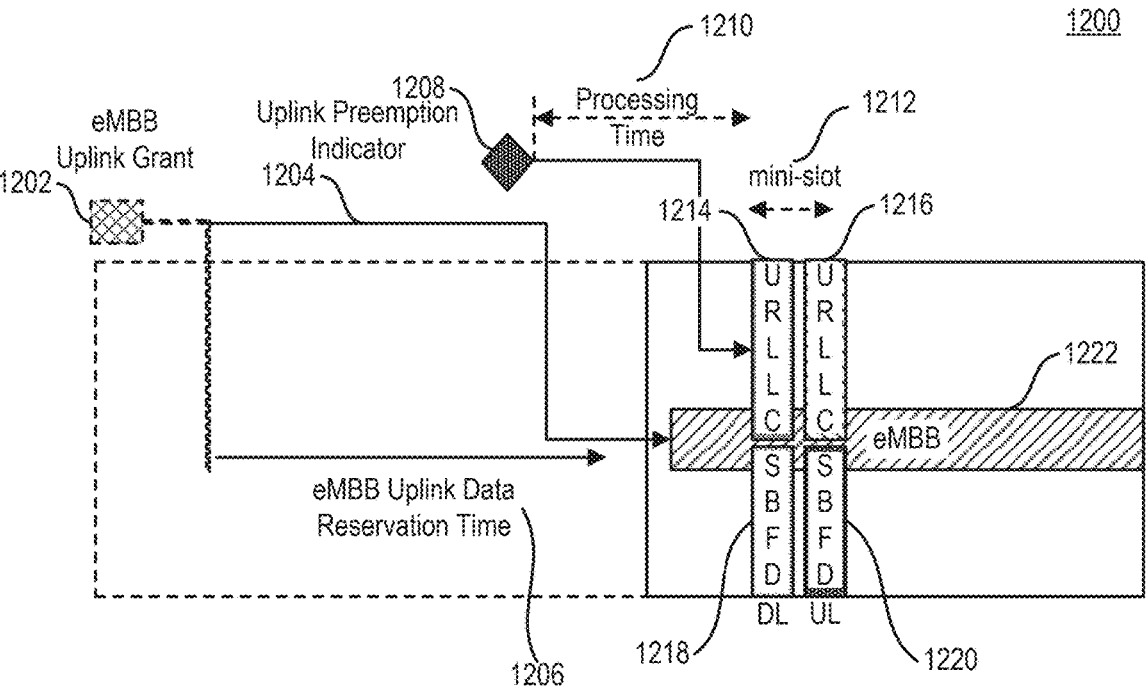
FIG. 12 shows an uplink preemption scenario 1200 for concurrent URLLC and SBFD services

FIG. 12 illustrates an uplink preemption scenario 1200 for concurrent URLLC and SBFD services. The URLLC service may or may not be full duplex in this instance.

The uplink preemption indication in this example may be required to include the time and frequency locations of both the URLLC and SBFD resources.

It may also be possible that they are aligned or coordinated so that the indication may indicate one set of time and frequency locations. This alignment may be beneficial to allow more efficient use of signaling resources for the ULI. Referring to FIG. 12, an eMBB uplink grant 1202 is provided to schedule eMBB traffic 1114. The eMBB uplink grant has a reservation time 1106. During the reservation time 1106 an uplink premption indicator 1108 may be used to preempt the eMBB traffic 1114, after a processing time 1110, such that URLLC traffic 1112 may be transmitted for processing.

FIG. 12 shows an example of Uplink Preemption for Simultaneous URLLC and SBFD Services.

In the embodiment given in FIG. 12 the uplink preemption indication may be coordinated with either or both the downlink sub-band and/or the downlink URLLC instances. In particular, an eMBB uplink grant 1218 may schedule 1204 eMBB traffic 1222 in accordance with a reservation time period 1206. An uplink preemption indicator 1208 may be provided and after a processing time 1210, one or more mini slots 1212 may be employed for URLLC traffic, including DL URLLC 1214 and UL URLLC 1216. Such one or more mini slots 1212 may comprise DL SBFD data 1218 and UL SBFD data 1220.

Figure 13:
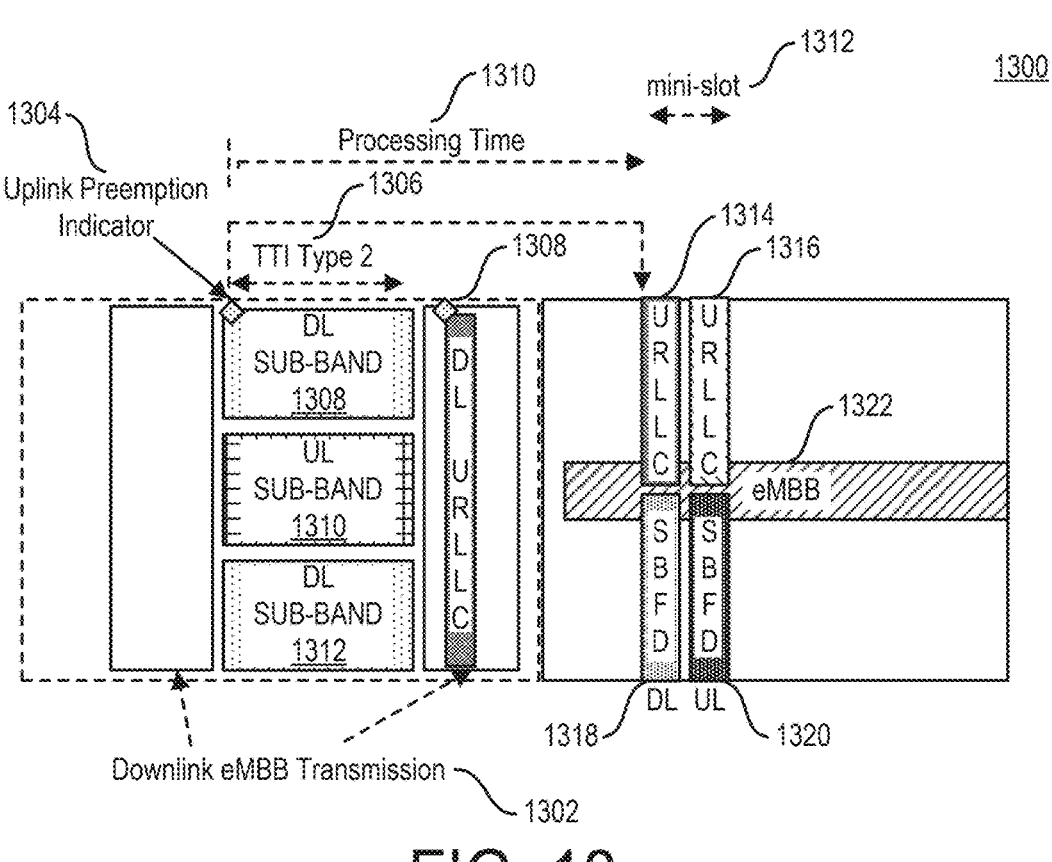
FIG. 13 shows an example of uplink preemption indication aligned with either the downlink sub-band or downlink URLLC instances.

FIG. 13 shows an example 1300 of Uplink Preemption Indication Aligned with Either the Downlink Sub-Band or Downlink URLLC Instances. In this example 1300 there is more time for the setup of the uplink resources for the URLLC and SBFD instances. Specifically, a downlink eMBB transmission 1302 may be made before and after a TTI type 2 comprising DL/UL/DL sub bands 1308-1312. The DL sub band 1308 and/or one or more downlink URLLC instance(s) 1308 may be aligned with the uplink preemption indicator 1304. A processing time 1310 may be necessary for processing of the uplink pre-emption indicator 1304 so as to preempt eMBB 1322. There may be a reception of DL URLLC 1314 and transmission of UL URLLC 1316 along with a reception of DL SBFD 1318 and transmission of UL SBFD 1320.

In some circumstances, it may be required to meet strict latency and spectral efficiency requirements for a downlink and uplink SBFD scenario. In this case, the SBFD resources may be handled in a similar fashion as the legacy URLLC case, with the difference that the resources of the SBFD may be a sub-band reservation.

Figure 14:
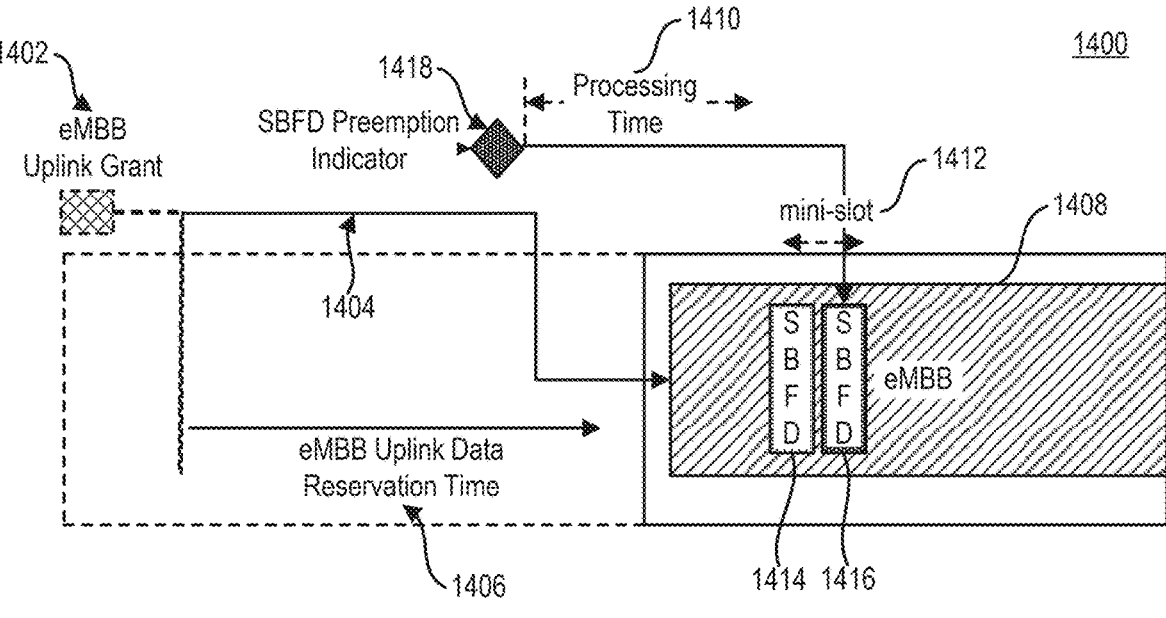
FIG. 14 shows uplink preemption for a ul ultra low latency SBFD instance

FIG. 14 shows an example 1400 of Uplink Preemption for a UL Ultra Low Latency SBFD Instance. In the embodiment shown in FIG. 14 the downlink SBFD may be handled in the same fashion as that in Release 19. For the uplink SBFD resource, it may be reserved using an uplink preemption indication. In this example 1400, specifically, an eMBB grant 1402 may schedule 1404 eMBB traffic 1408 according to a reservation time 1406. A SBFD premption indicator 1418 may be received and processed after a processing time 1410. One or more mini slots 1412 may comprise SBFD URLLC traffic 1414, 1416.

Figure 15:
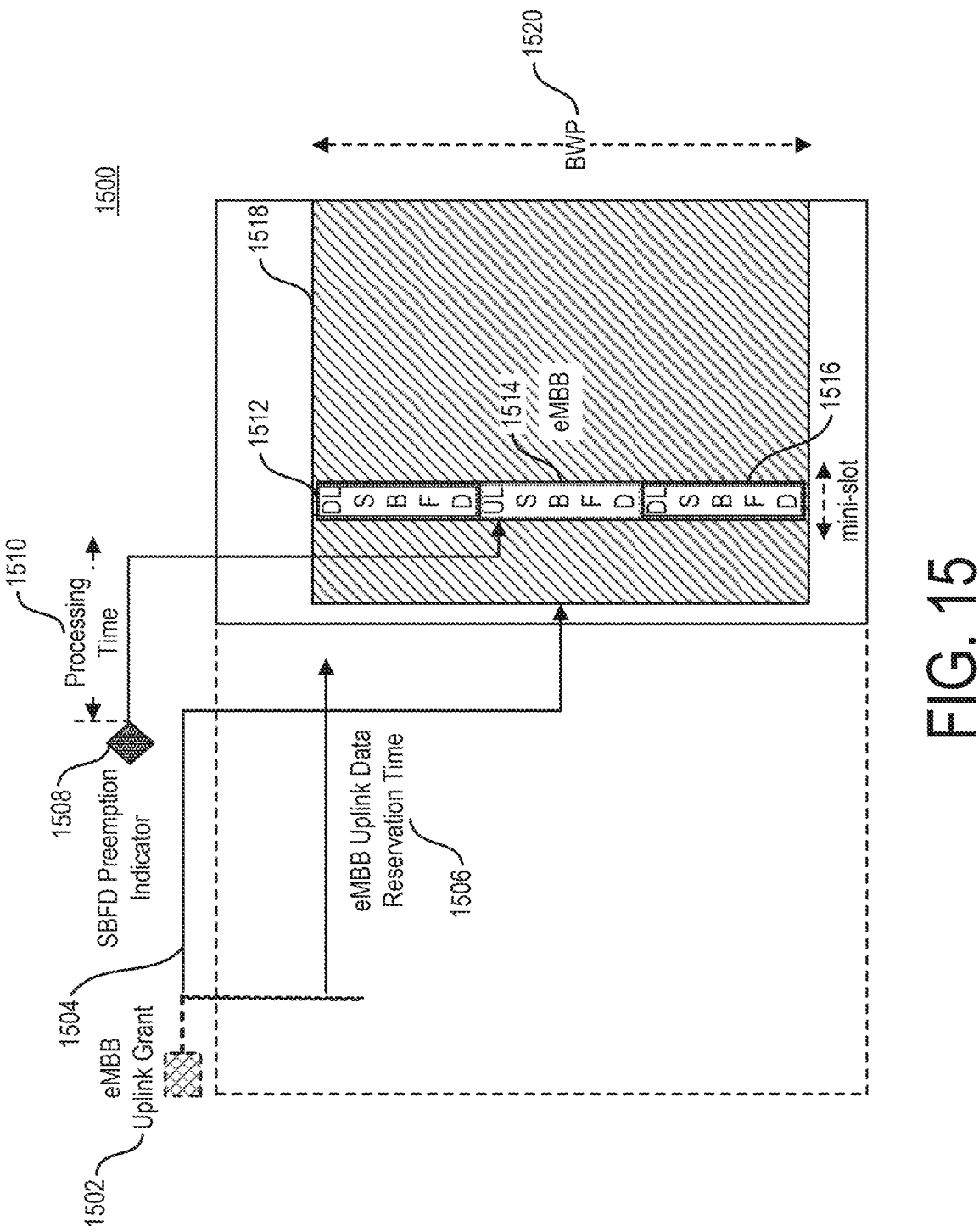
FIG. 15 shows an example of preemption for ultra low latency SBFD

FIG. 15 shows an example 1500 of Preemption for Ultra Low Latency SBFD. In the approach 1500 shown in FIG. 15, both the downlink and associated uplink SBFD resources may be reserved using a preemption indication. This preemption indicator may be referred to as a SBFD preemption indicator, or SBFDI. The downlink and uplink resources may utilize the same time resources within a mini-slot that punctures the eMBB resources. Specifically, an eMBB uplink grant 1502 may be provided that may reserve 1504 eMBB resources 1518. The grant 1502 may have a reservation time 1506. A SBFD preemption indicator 1508 may be provided assuming preemption is required and after a processing time 1510, a SBFD mini-slot comprised of DL SBFD 1512, UL SBFD 1514 and DL SBFD 1516, may pre-empt the eMBB resources 1518 on a BWP 1520. As shown in FIG. 15 many of the embodiments for URLLC and/or SBFD may utilize resources within a bandwidth part (BWP) 1520.

Cross-Link Interference

Figure 16:
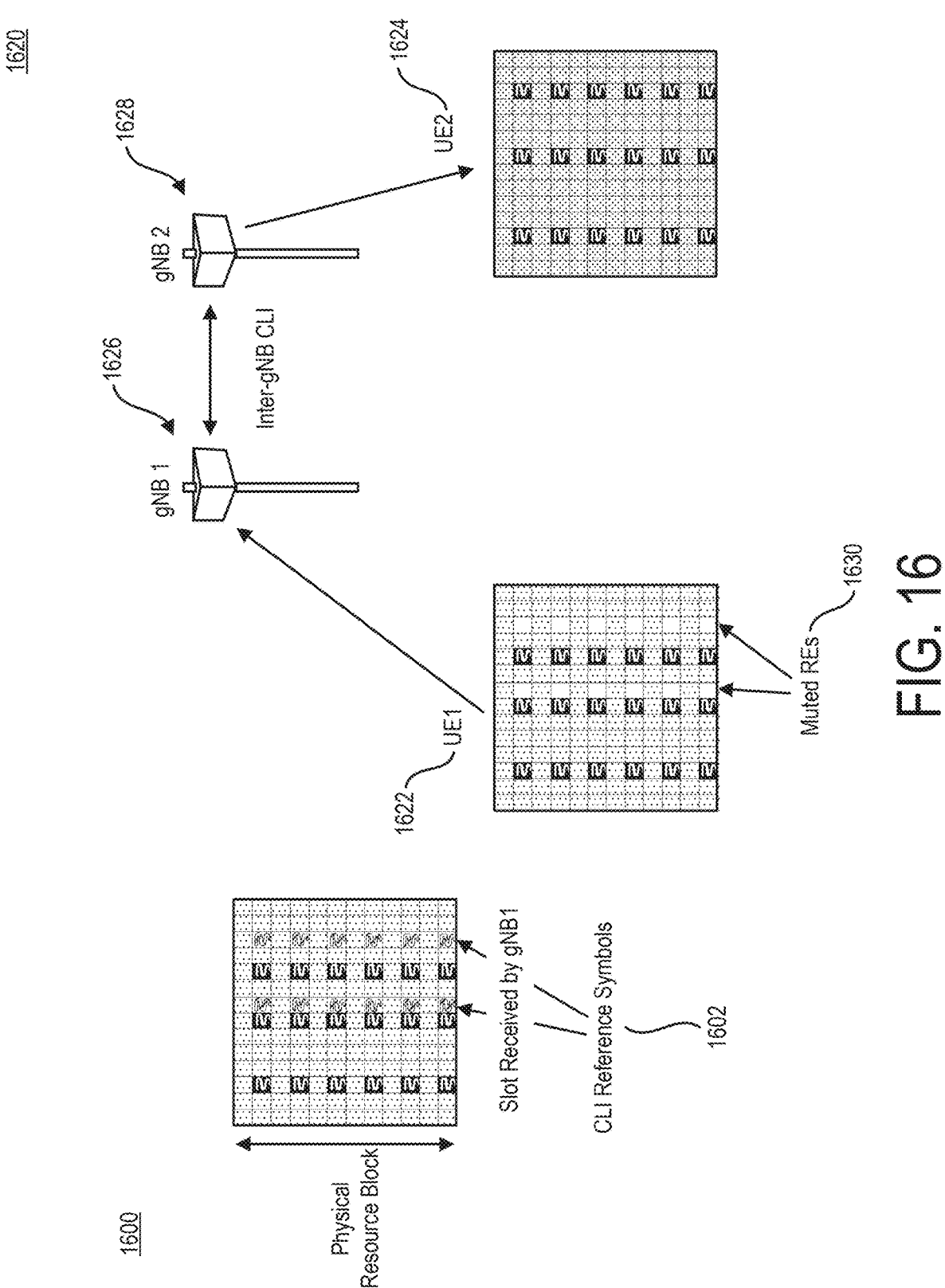
FIG. 16 shows an example for UL resource muting for gnb-to-gnb CLI measurements

FIG. 16 demonstrates an example for UL Resource Muting for gNB-to-gNB CLI Measurements. A full-duplex operation may necessarily imply that there will be Cross-Link Interference (CLI). CLI can come in several forms, including gNB-to-gNB, UE-to-UE, and gNB-to-UE interference. It may also be inter-band or intra-band interference. For the receiver to employ an effective interference cancelation or suppression method, it should accurately represent the nature of the interference, such as an estimate of the UL interference covariance matrix. By muting certain UL REs 1620, the receiver may measure the interference using CLI reference symbols, where the CLI REs may be 1600.

Specifically, referring to FIG. 16, a first UE 1622 may mute REs 1630 on an uplink transmission to a first gNB 1626 and a second gNB 1628 may transmit to a second UE 1624 using resources consistent with the REs which have been muted. A receiver, e.g. gNB 1626 may receive reference signals 1602 transmitted on the muted resources and may measure the interference thereof.

The following are tentative agreements for the allocation of UL resource muting. Semi-static configuration: UL resource muting is based on semi-static configurations, assuming the use of comb-2 for both DFT-S-OFDM and CP-OFDM in each allocated PRB and up to two symbols in the time domain. PUSCH resource mapping: When some resource elements (REs) are muted for gNB-to-gNB co-channel CLI measurements, rate matching around the muted resource elements (REs) should be performed for PUSCH resource mapping to ensure efficient data transmission. UCI resource determination in symbols with muted REs: In symbols with muted REs, UL control information (UCI) resources should be carefully managed to ensure reliable communication. No new DCI field or MAC CE: To simplify the integration of this feature within existing frameworks, it was decided that implementing UL resource muting does not require new downlink (DL) control information (DCI) fields or MAC control elements (CEs). Applicability: UL resource muting applies only to UEs in RRC_CONNECTED mode and excludes Msg A PUSCH and Msg 3 PUSCH, ensuring that critical initial communication stages are unaffected.

It should be noted that these agreements only account for SBFD CLI and do not consider other enhancements, such as simultaneous URLLC/SBFD operation. Also, there are several open issues with these agreements, including: Type and number of UL muting patterns; UL resource muting indication for PUSCH; Indication for zero-power SRS (ZP-SRS) resource(s) for PUSCH; How to address collisions of the measurement Res; Timing alignment between CLI-RS.

When considering simultaneous URLLC/SBFD there are some other aspects to addressing CLI to consider, including the following.

Muting of resources in the presence of intra-slot frequency hopping of URLLC, SBFD, or simultaneous URLLC/SBFD symbols.

Time-domain Block-based Multiple Slot (TBoMS) allocation was introduced in Release 17. There were also several agreements for how to handle TBoMS for SBFD in [11]. Methods that consider the configuration of SBFD symbols in the presence of TBoMS, and associated signaling are still TBD.

Extensions to support simultaneous URLLC/SBFD to support TBoMS

Semi-static configuration has been selected. However, dynamic sub-band resource selection has some important advantages. Semi-static signaling of (FD-)URLLC, SBFD, or simultaneous URLLC/SBFD resources. Consideration of these and other methods to enable Full-Duplex URLLC (FD-URLLC). Enhanced SSB symbols for configuration of (FD-)URLLC, SBFD, or simultaneous URLLC/SBFD symbols. Methods for enhanced UL power control for (FD-)URLLC, SBFD, or simultaneous URLLC/SBFD. Methods for allocation of SRS resources, including support for SRS frequency hopping for support of (FD-)URLLC, SBFD, or simultaneous URLLC/SBFD. CLI measurement and reporting methods for (FD-)URLLC, SBFD, or simultaneous URLLC/SBFD.

A UCI Report is new to SBFD, methods which further enable this for (FD-)URLLC, SBFD, or simultaneous URLLC/SBFD. Note: It is agreed that no specification changes are allowed on data and control multiplexing in section 6.2.7, TS 38.212.

Consideration of PUSCH Repetition Type A and B. Muting Pattern.

It should be noted that PUSCH (FD-)URLLC, SBFD, or simultaneous URLLC/SBFD symbols, or slots, may be collectively referred to as xFD symbols or slots. Also note that xFD may refer to either a full duplex symbol, or slot. Some examples are Sub-Band Full Duplex (SBFD), Full Duplex (FD)-URLLC, half duplex (HD)-FDD-xFD, and non-xFD.

A method for addressing CLI is the selective muting of UL symbols. The UL symbols that are muted may be defined by using a pattern. One, two, or more than two patterns may be used. The method used for configuring and signaling the location of the muting patterns may be different depending on the number of patterns that are supported.

Semi-static RRC signaling may be referred to wherein some time/frequency resources may need to be excluded. One method would be to include them in the user's PUSCH resources' resource configuration.

Assuming the PUSCH occurrence is periodic, the MAC-CE/DCI may be modified to support the indication of which resources may need to be excluded on a periodic basis. A periodic comb offset {0, 1, . . . . N} may be configured for the up to N UL muting symbols. If a UL resource muted symbol overlaps with a symbol containing a UL DMRS for a PUSCH, the DMRS is prioritized, for example, the UE does not apply UL resource muting in that symbol. UL resource muting is allowed on PUSCH symbols that carry UCI; assuming UCI is carried on a UL symbol, the UL resource muting should prioritize avoiding setting a UL muting symbol at that symbol. If a UL muting symbol overlaps with a symbol containing a PT-RS for a PUSCH occurrence, and transform precoding is not enabled for this PUSCH occurrence, the UE may not apply muting to those REs that are occupied by a PT-RS symbol.

A periodic comb offset may be defined in 3GPP TS 38.331 "NR Radio Resource Control (RRC) protocol specification," by the parameter "combOffsetHopping" in the RRC message "UL_muting_config" and/or "SBFD_muting_config" and/or, "xFD_muting_config" and/or, "ULRLLC_SBFD_muting_config". The following may be a description of "combOffsetHopping"; without restriction to a particular parameter name, all of these parameters may be equivalently referred to as "SBFD_muting_config" for this embodiment.

combOffsetHopping: Configures a UE with a UL comb offset hopping for periodic muting. The parameter SBFD-hoppingId may be used to initialize a pseudo random comb offset hopping pattern. If the UE is configured with both a comb offset and cyclic shift hopping, only one SBFDhoppingId is configured. The parameter SBFDhoppingWith-Repetition configures the time-domain hopping behavior for repetition factor R>1. The SBFDhoppingSubset indicates a set of comb offset(s) using a bit string (see TS 38.211). The i-th bit in the bit string is set to 1 to indicate the SBFDsSRScoht=i−1, where t is determined by its ordinary position among the positive bits in bit string, i.e., if the i-th bit is a first positive bit, t=0; if the i-th bit is a second positive bit, t=1, and so on.

The maximum number of schedulable PUSCHs/PDSCHs on the corresponding cell is determined by the TDRA table for the cell.

The time location of each of the N UL muting symbols may be semi-statically configured, and muting of all of the semi-statically configured time locations of UL muting symbol(s) may be dynamically turned ON/OFF by the TDRA field using a DCI parameter such as DCI Format 0_0 described previously.

Another method is to specify a muting pattern separately and mute those resources that conflict with the user's PUSCH resources. The method for muting the resources may be the configuration of a Zero-Power SRS (ZP-SRS) or, equivalently, a pattern of ZP-SRS occurrences.

Embodiments described herein address how the muting configuration is specified; specifically, a timing reference may be needed. In the case of TDD, the timing reference may be aligned with the sub-frame boundary; for example, it may be aligned with the first symbol adjacent to the starting boundary that is allocated within a sub-frame. Whatever special consideration may need to be given to PUSCH repetition types A and B. For these repetition types, the timing reference may be specified specifically to the repetition type. For these types, the muting repetition pattern may be specified as a part of the configuration for the repetition types A and B.

For a semi-static indication, as for example using RRC signaling, a slot may contain xFD symbols, preferably configured in a consecutive manner within a TDD-UL-DL pattern period. When two or more TDD-UL-DL patterns are configured, and xFD symbols are contained within all of the patterns, the symbols preferably are configured consecutively for all of the indicated patterns, however a configuration of non-consecutive muting patterns is possible. In this case the patterns may overlap one another either completely or partially.

DL and/or flexible DL symbols may be configured in TDD-UL-DL ConfigCommon. The configured DL symbols may start at a location indicated by semi-static signaling.

The field referenceSubcarrierSpacing in TDD-UL-DL-ConfigCommon is a reference SCS for the indicated TDD-UL-DL pattern. The transmission timing of PUSCH in the uplink is controlled by the time domain resource assignment field, which may be described in 38.214 section 5.1.2 in the downlink control information (DCI) transmitted in the physical downlink control channel (PDCCH). The DCI format that carries this information may be DCI format 0_0 for scheduling of a PUSCH. The TDRA field is used as an index into a radio resource control (RRC) configured table providing information on when the PUSCH should be transmitted relative to the reception of the PDCCH. The TDRA provides the timing for UL muting symbols, specifically, for a scheduling DCI received in downlink slot n, the uplink slot where the UE should transmit the PUSCH TDD UL muting pattern is determined as slot n+K2, where K2 is the slot offset relative to the downlink slot n, where the scheduling DCI is received. The value range of K2 may be {0, 1, . . . , 32}. A muting symbol may be a single symbol or a consecutive number of two or more symbol locations.

In the event of overlap between any of the xFD symbols, the reference subband symbol start location may be ignored in preference for assuming a legacy compatible operation.

For a DL slot or a Special slot configured by TDD-UL-DL-ConfigCommon with xFD symbols, it may be returned to a non-xFD traditional slot using a TDD-UL-DL-ConfigDedicated configuration [13]. In an alternative method, a DL slot or a Special slot that is configured by TDD-UL-DL-ConfigDedicated and contains xFD symbols may be released by the TDD-UL-DL-ConfigDedicated configuration.

In the event that either TDD-UL-DL-ConfigCommon or TDD-UL-DL-ConfigDedicated may be used to return a DL slot of a Special slot to its default non-URLLC/SBFD state, the associated timing for the slot, or slot pattern, may be released and may also return to its default state.

Figures 17, 18:
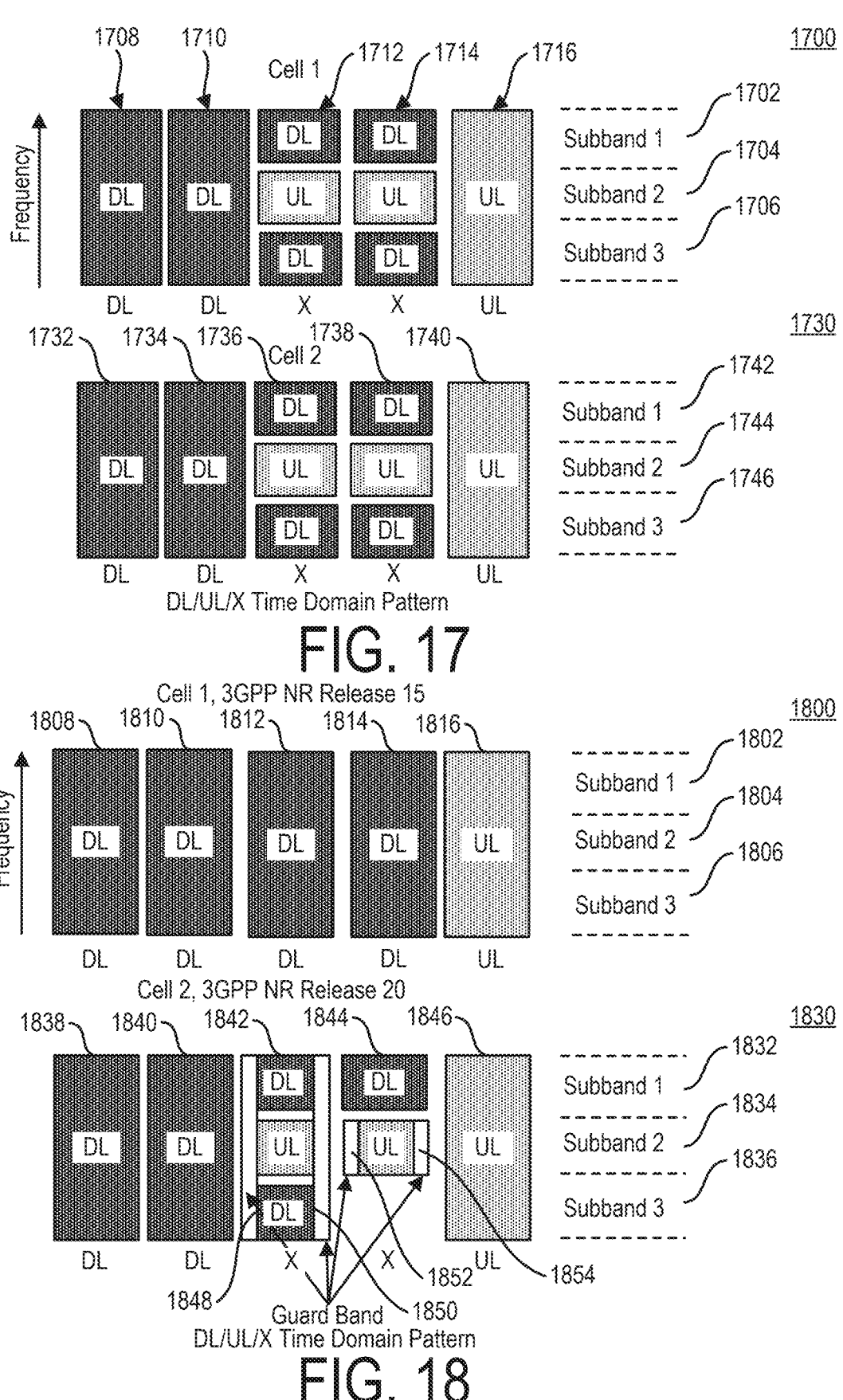
FIG. 17 shows semi-static resource allocation signaling for multiple cells.
FIG. 18 shows semi-static allocation signaling for cells belonging to different 3GPP releases.

FIG. 17 shows Semi-Static Resource Allocation Signaling for Multiple Cells 1700, 1730. Specifically, referring to cell 1 1700, three subbands 1702-1706 are demonstrated in frequency. In time, a first time interval 1708 is allocated to DL, second time interval is allocated 1710 for DL, third and fourth time intervals 1712 and 1714 are allocated for SBFD and a fifth time interval 1716 is allocated for UL. For multiple cells that are adjacent, semi-static RRC signaling may ensure that the same frame structure is used for a TDD-UL-DL configuration. Thus cell 2 1730 has matching time intervals, i.e. a first time interval 1732 is allocated to DL, second time interval is allocated 1734 for DL, third and fourth time intervals 1736 and 1738 are allocated for SBFD and a fifth time interval 1740 is allocated for UL. There may be different full duplex symbol types, however, in each cell and slot as long as the DL and UL subbands are aligned. For example, UL subband 2 1704 in cell 1 1700 may contain SBFD symbols, while UL subband 2 1744 in cell 2 may contain URLLC/SBFD symbols. Other subbands, e.g. subband 1 1742 and subband 3 1746 may be configured accordingly. It may be required to use a guard band at locations that are adjacent to the cell edge. This may be achieved by ensuring that only DL or UL symbol types are adjacent to one another at the cell edge and confining xFD symbol types to the interior of the cell plan.

It is further necessary to align the TDD-UL-DL pattern in adjacent cells; in the case of multiple patterns, it is only required that one pattern is aligned between adjacent cells; this may be referred to as a reference pattern.

These requirements may be confined to a common or Reference BandWidth Part (BWP) among the adjacent cells. Likewise, the timing requirement may be aligned to a Reference BWP.

In the event that an adjacent cell does not support any full-duplex (FD) operation, such as an earlier 3GPP NR release, a guard band adjacent to the edge of the FD configuration in the frame structure may be used. An example of this is shown in FIG. 18.

FIG. 18 shows Semi-Static Allocation Signaling for Cells 1800, 1830 Belonging to Different 3GPP Releases. Specifically cell 1 1800 is a 3GPP Release 15 cell having three subbands 1802-1806 and five time intervals 1808-1816, of which the first four 1808-1814 are DL and the last 1816 is UL.

Referring to a potential NR Release 20 cell 1830, guard bands 1848-1854 may only be adjacent to the UL portion of the subband or may extend the entire width of the frequency allocation. For instance, guard bands 1848-1843 may extend along subbands 1832-1836 in time intervals 1842-1844 and may not be placed in time intervals 1838-1840 and 1846. In an alternative approach, the subband configuration in adjacent cells may be coordinated semi-statically using RRC signaling. A further possibility is that the guard band is a special case of a muting pattern of symbols; thereby, it could be indicated in a similar manner to other symbols that may be muted.

A base station and/or UE may determine a neighboring cell's capability by querying its Access stratum release indicator. This is defined as the release of the UTRA layer 1, 2, and 3 specifications that are applicable for the UE, see for example "3GPP TS 25.306". This capabilities specification may also contain a section specifically for xFD measurement-related capabilities (TDD only) as well as an associated table that defines the numerical capabilities for xFD operation.

Although an assumption is that the UE assumes that the UL resource muting pattern does not overlap UL DMRS or PT-RS in the same symbol, it may also be possible to align the muting pattern for one configuration with the UL DMRS or PT-RS pattern of another configuration, for example, Configuration 1 and Configuration 2 in adjacent cells.

In the case of dynamic signaling of the PUSCH xFD subband location within a TDD carrier, it may be indicated using a UE specific RRC message, and/or a TDD-UL-DL-ConfigDedicated configuration. This would allow better scheduling flexibility but at the expense of higher overhead and complexity.

Dynamic signaling may be reserved for certain symbol types, for example "UL only" since the scheduling flexibility for UL PUSCH is more difficult. Alternatively, dynamic signaling may only apply to xFD symbols.

In the case of carrier aggregation, dynamic signaling may be controlled by the primary component carrier; it may control the xFD subband location of the primary and/or secondary carriers.

For a dynamically scheduled PUSCH for a particular BWP, the numbering of the RBs in the scheduling information starts with the lowest RB in the active UL BWP. The number of RBs is determined by the bandwidth of the FDRA field in the DL DCI; it also determines the size of the active UL BWP for either the Common Search Space or the UE Specific Search space. In the case of a fallback DCI for RBs that the FDRA cannot indicate for the BWP, it may be implicitly determined from the location of the BWP within the bandwidth of the resource allocation (e.g., 20, 40, 80 MHz).

The sounding reference Signal (SRS) is important in determining the CLI for the use of the PUSCH xFD transmissions at the gNB. The configuration of SRS may be for a specific BWP allocation. PUCCH may be used for the configuration of SRS. Since the channel and CLI conditions for xFD transmissions may be very different for xFD and non-xFD transmissions, separate PUCCH instances may be used for xFD and non-xFD configurations.

UE-to-UE CLI Measurements

For xFD aware UEs. CLI measurements may be performed within an active BWP. The following methods are examples: Method 1: UE measures RSSI within a DL subband; Method 2: UE measures RSRP of an aggressor UE within a UL subband; Method 3: UE measures RSSI within a UL subband; Method 4: UE measures RSSI within a guard band, if guard band exists; Method 5: A UE measures RSSI and/or RSRP of a secondary carrier DL or UL subband; Method 6: A UE measures RSSI and/or RSRP of an aggressor UE, of a secondary carrier DL or UL subband.

The L1-SRS-RSRP or L1-CLI-RSSI measurement may be made within a DL active BWP.

These may be periodic, semi-persistent, or aperiodic measurements, at least aperiodic measurements are supported.

UE-to-UE measurements may be dynamically signaled on a slot basis; in this case, it may be required to define an SRS specifically allocated to support dynamic signaling within a xFD slot and/or BWP.

For aperiodic SRS-RSRP reporting using aperiodic SRS-RSRP measurement resource set, the slot offset between the slot containing the DCI that triggers a set of aperiodic SRS-RSRP resources and the slot in which the SRS-RSRP resource set is measured is configured by higher layer parameter. A slot offset may be defined for the measurement, a slot offset list may be defined, or an explicit slot offset may be specified in a DCI message.

Figures 19, 20:
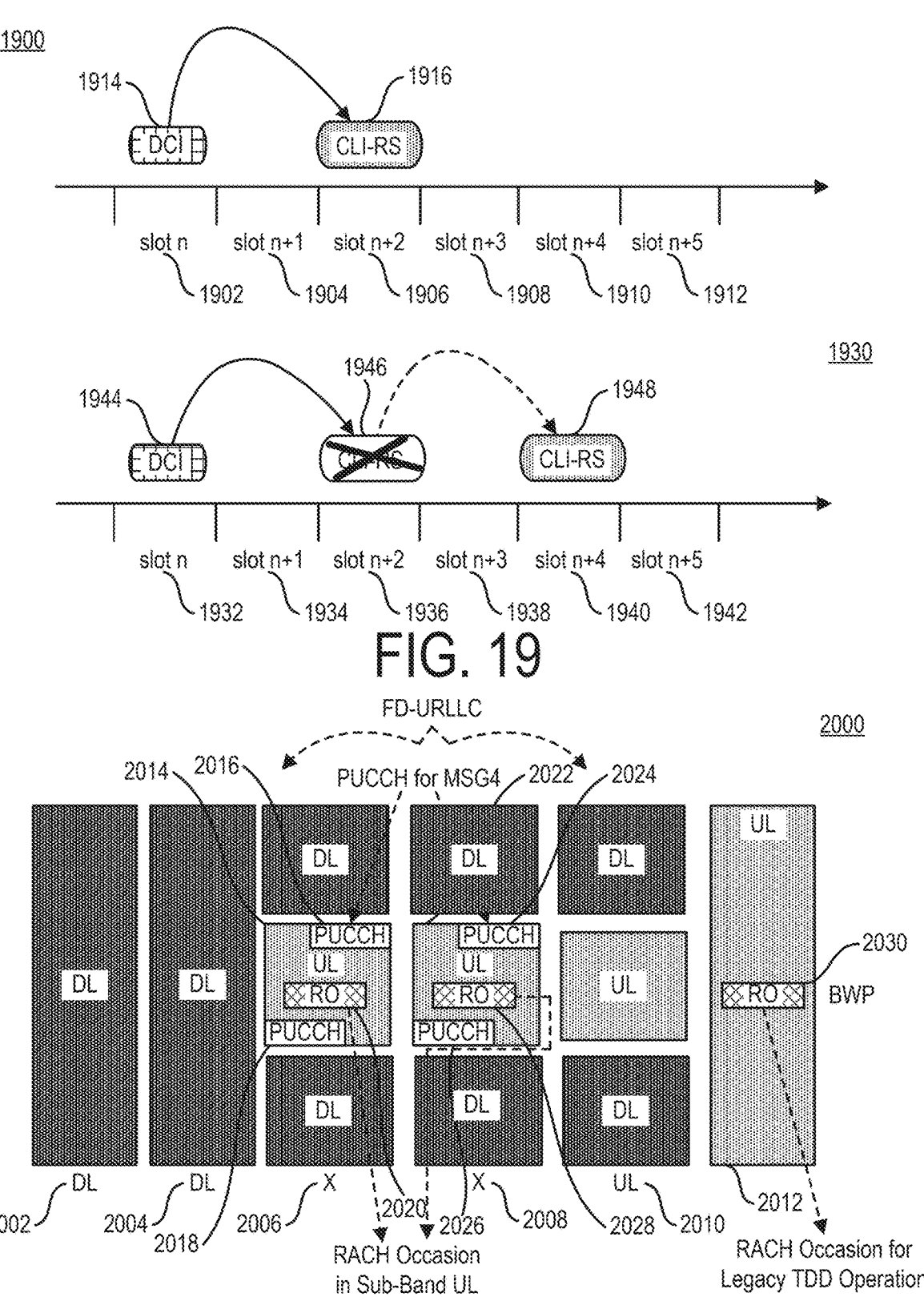
FIG. 19 shows examples of a DCI trigger for a CLI-RS measurement.
FIG. 20 shows sub-band full duplex RACH and RACH occasion example.

FIG. 19 shows examples 1900, 1930 of a DCI Trigger for a CLI-RS Measurement. Slot n+1 1904 and slots n+3 1908, n+4 1910 and n+5 1912 may be dedicated for other purposes.

An aperiodic CLI-RSSP or CLI-RS measurement resource set may be defined for an aperiodic CLI-RSSI measurement report as shown in example 1900. In the first example 1900, a DCI 1914 of slot n 1902 triggers CLI-RS 1916 in slot n+2 1906. The slot offset may be between the slot containing the DCI that triggers a set of aperiodic CLI-RSSI resources and the slot in which the CLI-RSSI resource set is measured, also this may be configured by a RRC message.

Example 1930 demonstrates a case where it may occur that the slot 1946 for which the slot offset defines a measurement is not a xFD enabled slot, in this case a specific behavior may be required. For example, in this case, a CLI-RS offset such as aperiodicTriggeringOffset may be defined in the DCI message 1944 for the measurement. Specifically, example 1930 shows slots n through n+5 1932-1942 of which a DCI 1944 provides an offset that overrides CLI-RS 1946 in slot n+2 1936 and instead CLI-RS is processed in slot n+4 1948.

For the L1 CLI measurement resource configuration, a new information element (IE) may be defined for UE-to-UE measurements. As an example, the definition may be specific to the xFD type, and likewise, the parameter range may be specific to the xFD type. There may be a L1 CLI reference resource definition that the trigger offset defaults to such that the measurement is always on a valid xFD resource.

For CLI-RSSI based measurements a measurement resource set may be defined. The resource set may contain one or more of the following: the start PRB and number of PRBs; the start symbol and number of symbols; the resource type: aperiodic, semi-persistent, or periodic; the periodicity and slot offset, if the resource type is semi-persistent or periodic.

A new MAC CE may be defined for the CLI-RSSI resource activation/deactivation. A spontaneous UE-to-UE CLI measurement may be required; in this case, the use of a dynamic measurement may be used. A special DCI and/or L1 signal may be defined for this measurement. Power control may be used to enhance the performance of SRS, the power control mechanism may be specific to the xFD symbol and/or slot type. It may be a periodic control, and/or a semi-static control. CLI-RSSI (TDD only) based measurements for xFD operation may be defined in 38.331 section 5.5 "Measurements".

The network may configure the UE to report the following CLI measurement information based on xFD-CLI-RSSI resources: measurement results per xFD-CLI-RSSI resource; xFD-CLI-RSSI resource(s) indexes. The initiation, addition, and removal of xFD CLI measurement entities, e.g. identifiers, is described herein.

UE-to-UE CLI Reporting

L1 UE-to-UE CLI measurement and reporting may occur within an active BWP. The measurement of RSSI and/or RSRP of an aggressor UE may occur within a DL or UL subband. It is also possible that the RSSI measurement occurs within the UL subband.

There may be a measurement report across two DL subbands. The CLI-RSSI measurement resource may be configured to support one or more subbands where the configured subbands are those that are active for the xFD operation. For a wideband report, there may be more than one CLI-RSSI resource defined within a subband.

A bitmap may be defined that corresponds to a set of SRS-RSRP or CLI-RSSI measurement resource indices indicating whether L1-SRS-RSRP or L1-CLI-RSSI is above a given threshold. The threshold may be stoically defined or may be specified in the trigger message.

DCI PRACH Message-A DCI message may indicate whether the additional PRACH resources are provided by semi-static signaling. As an example, PRACH may include resource opportunities for PUSCH occasions in MsgA. The slot configuration may also be defined. It may also be indicate whether semi-static signaling of additional PRACH resources is available or not such as: whether a subset of the additional PRACH resources provided by semi-static signalling are available or not; the maximum number of subsets of the additional PRACH resources. Such as [2 or 3 or 4 or 16]; whether the subset of the additional PRACH resources is in RO level per SSB, SSB-to-RO mapping cycle level, PRACH association period level, PRACH association pattern period level, system frame number (SFN) level, Network configured time period.

Methods that enable energy savings for full duplex operation are described.

A Synchronization Signal Block (SSB) is employed for synchronization. As the SSB is currently defined as being sent continuously, it is a candidate for evaluating energy savings. One such enhancement is a triggered SSB occurrence for an SCell.

An on-demand SSB may be signal using a DCI message and may be included in a schedule for a xFD SCell scheduling event. An on-demand SSB may be defined as either a Cell Defining SSB (CD-SSB) or a non-cell-defining SSB (non-CD-SSB). An on-demand SSB is an SSB that spans multiple Carrier Aggregation components within a cell; it may be defined as either an Overlapped Deployment SSB (OD-SSB) or a non-cell-defining SSB (non-OD-SSB). A MAC CE based initial indication for an on-demand SSB in a xFD enabled cell may be specified. More than one on-demand SSB configuration may be defined for a cell. The configuration of a on-demand SSB may be aligned with the resource configuration of a xFD BWP in a SCell. The following parameters may be defined for an on-demand SSB: Sub-carrier spacing of the on-demand SSB; Physical Cell ID of the on-demand SSB; Time domain location of on-demand SSB burst such as SFN offset and half frame index; Downlink transmit power of on-demand SSB; The number N of on-demand SSB bursts to be transmitted after on-demand SSB is indicated. An RRC message may be defined for these parameters.

An on-demand SIB1 for an SCell configuration is also possible. In this case, the on-demand SIB1 may indicate xFD resources and associated timing information. MIB, SIB1 and other SIBs may schedule or provide information as disclosed herein.

When an SBFD UL subband is available for UL transmissions from the UE, the opportunities for UL transmissions may also support UL RACH Occasion (RO). A UL RO is used for initial cell acquisition and synchronization purposes. Note that a RO is a designated time-frequency resource block where the network listens for PRACH preambles transmitted by UEs, which allows the UE to identify itself to the network. Unlike in LTE, the concept of a RACH Occasion in NR is more detailed due to the possible use of multiple spatial beams, this allows the mapping of Synchronization Signal Blocks (SSBs) to RACH Occasions (e.g. UEs). As noted previously in so far as there are differences between URLLC, which requires low latency/ultra-high reliability, and Sub-Band Full Duplex (SBFD), which is intended to address spectral efficiency for TDD, there is the potential for mutual benefits by leveraging the commonality in scheduling requirements. A special consideration of this needs to be given to random access for UL RO opportunities. It has been noted that using the SBFD UL subband for PRACH transmissions has the primary benefit that fragmentation of the UL scheduling BW in the legacy UL slot can now be avoided. This benefit may be extended to Full Duplex URLLC (FD-URLLC) services which may include any of PUSCH FD-URLLC, SBFD, or simultaneous URLLC/SBFD symbols, or slots, and may be collectively referred to as xFD symbols or slots. An example of RO for FD-URLLC is given in FIG. 20.

FIG. 20 shows an embodiment 2000 of Sub-Band Full Duplex RACH and RACH Occasion examples. Specifically, FIG. 20 shows six time intervals 2002-2012 including DL 2002 DL 2004 FD-URLLC 2006 FD-URLLC 2008 FD-URLLC 2010 and UL2012 time intervals. The UL portion of time interval 2006 include PUCCH for MSG4, a RACH Occasion and PUCCH. FD-URLLC 2006 includes an UL portion 2014 having PUCCH 2016, PUCCH 2018 and RACH occasion 2020. FD-URLLC 2008 has an UL portion 2022 having PUCCH 2024, PUCCH 2026 and a RACH occasion 2028. A legacy RACH occasion 2030 is included in UL portion 2012.

It should be noted that when PRACH ROs are configured in a UL slot, they can rarely be re-used for UL data scheduling and shared data/random access reception by the gNB, e.g., when configured, such resources are not available for UL data. However, since they may only occur during the initial access procedure this limitation is small. A significant benefit of using a SBFD arrangement for the FD-URLLC RO is a further reduction in latency relative to what is possible with the legacy URLLC design.

Figure 21:
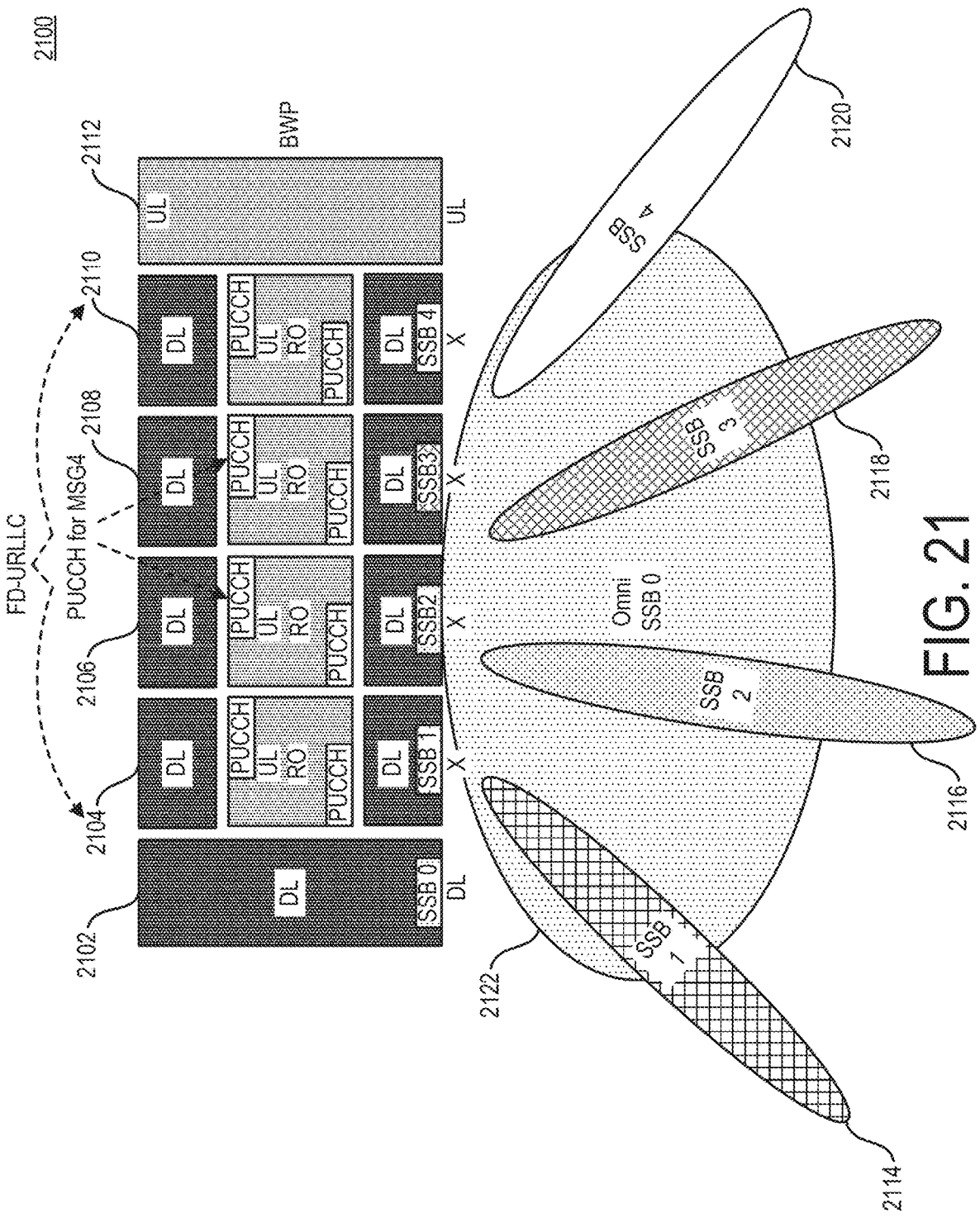
FIG. 21 shows FD-URLLC RACH occasions and beam identification by SSB.

This design may be extended to support beamforming in a similar fashion as that done in 3GPP Release 18/19. In this case an SSB has been used as an identifier for a specific UE/beam pair. This is illustrated in FIG. 21, where SSB 0 may be associated with an omni beam pattern. In a separate embodiment, by leveraging this association, a full duplex operation is possible on a per beam basis. SS/PBCH blocks transmitted with the same block index and associated to the same physical cell ID on the same center frequency location for each SSB/beam pair may be considered to be quasi co-located (QCL) with respect to Doppler spread, Doppler shift, average gain, average delay, and delay spread.

FIG. 21 shows an example 2100 FD-URLLC RACH occasion and beam identification by SSB. Specifically, FIG. 21 shows a timing and beam diagram 2100 wherein a first time interval 2102 is associated with SSB0, a second time interval 2104 is associated with SSB1, a third time interval 2106 is associated with SSB2, a fourth time interval 2108 is associated with SSB3, a fifth time interval 2110 is associated with SSB4 and a sixth time interval 2112 may be associated with one of the same or a different beam. SSB1 may use beam 2114, SSB2 may use beam 2116, SSB1 may use beam 2114, SSB3 may use beam 2118, SSB4 may use beam 2120 and an omni beam 2122 may be employed for SSB 0.

A Synchronization Signal Block (SSB) is required for synchronization. As the SSB is currently defined as being sent continuously, it is a candidate for evaluating energy savings. One such enhancement is a triggered SSB occurrence for a SCell.

An on-demand SSB may be signaled using a DCI message and may be included in a schedule for a xFD SCell scheduling event. This embodiment may be extended to support a per-beam on-demand RACH process and/or SSB procedure.

An on-demand SSB may be defined as either a cell-defining SSB (CD-SSB) or a non-cell-defining SSB (non-CD-SSB). In the event that an on-demand SSB is defined on a per-beam basis, it may additionally be specified as a part of the beam characteristics that are defined in the DCI message that sets up the beam. For example, in this scenario, it has been assumed that the beams are orthogonal to one another, but this is rarely completely true. In case the QCL degrades for an adjacent pair of beams the gNB may disable the SSB for a particular beam and merge the remaining SSB for the original adjacent beams. This would also be another form of potential energy savings.

For xFD-aware UEs, collisions between DL receptions in DL subband(s) and UL transmissions in UL subband(s) in a xFD slot/symbol may be addressed or alleviated with proper scheduling. However, this may not be possible in every case. Some examples of scenarios where scheduling may not help with collisions include, Case 1: Dynamically scheduled DL receptions vs. semi-statically configured UL transmissions, e.g., dynamic PDSCH or CSI-RS collides with configured SRS, PUCCH, or CG PUSCH.

Case 2: Semi-statically configured DL receptions vs. dynamically scheduled UL transmissions, e.g., PDCCH or SPS PDSCH collides with dynamic PUSCH or PUCCH.

Case 3: Semi-statically configured DL receptions vs. semi-statically configured UL transmissions.

Case 4: Dynamically scheduled DL receptions vs. dynamic scheduled UL transmissions.

Case 5: SSB vs. dynamically scheduled or configured UL transmissions, e.g., PUSCH, PUCCH, PRACH, SRS.

Case 6: Dynamic or semi-static DL vs. valid RO.

For these and similar cases, it is expected that the procedures for SBFD symbols/slots are the same as those for xFD symbols/slots. However, in those cases where latency may be adversely impacted for FD-URLLC symbols/slots, a priority may be given to FD-URLLC symbols/slots over that for semi-statically configured UL transmissions.

For Case 1 and Case 2, in the event of a DL xFD reception that has repetition, the default procedure may be to skip the DL xFD reception of those receptions that are a part of a repetition series and also cause a collision with a semi-statically scheduled UL transmission. It is also possible that individual repetitions may be subject to the same collision handling rules as those for overlapped SBFD symbols, xFD symbols, or slots.

If a link direction indication is not available for an xFD symbol or slot, a dynamically scheduled DL reception may be provided an indication in an, which may be a broadcast, SSB and/or SIB of a contention period after the symbol index of the reception.

For Case 5 it is the usual procedure to re-use the existing collision principles of 3GPP 38.331 v18.3.0 2024 Sep. 25 (e.g. those of for an NR TDD SSB which may be prioritized over configured UL transmissions and also dynamically scheduled UL transmissions. For xFD slots that have an SSB assigned for the entire slot, the SSB symbols may be considered as those for a full DL slot. For xFD slots that have an SSB assigned for each DL subband part, the SSB symbols for Part 1 and 2 may be assigned to their respective subband parts. In both cases, SSB subband symbols may be considered xFD symbols. Only DL receptions within DL usable PRBs are allowed for xFD aware UEs.

Figure 22:
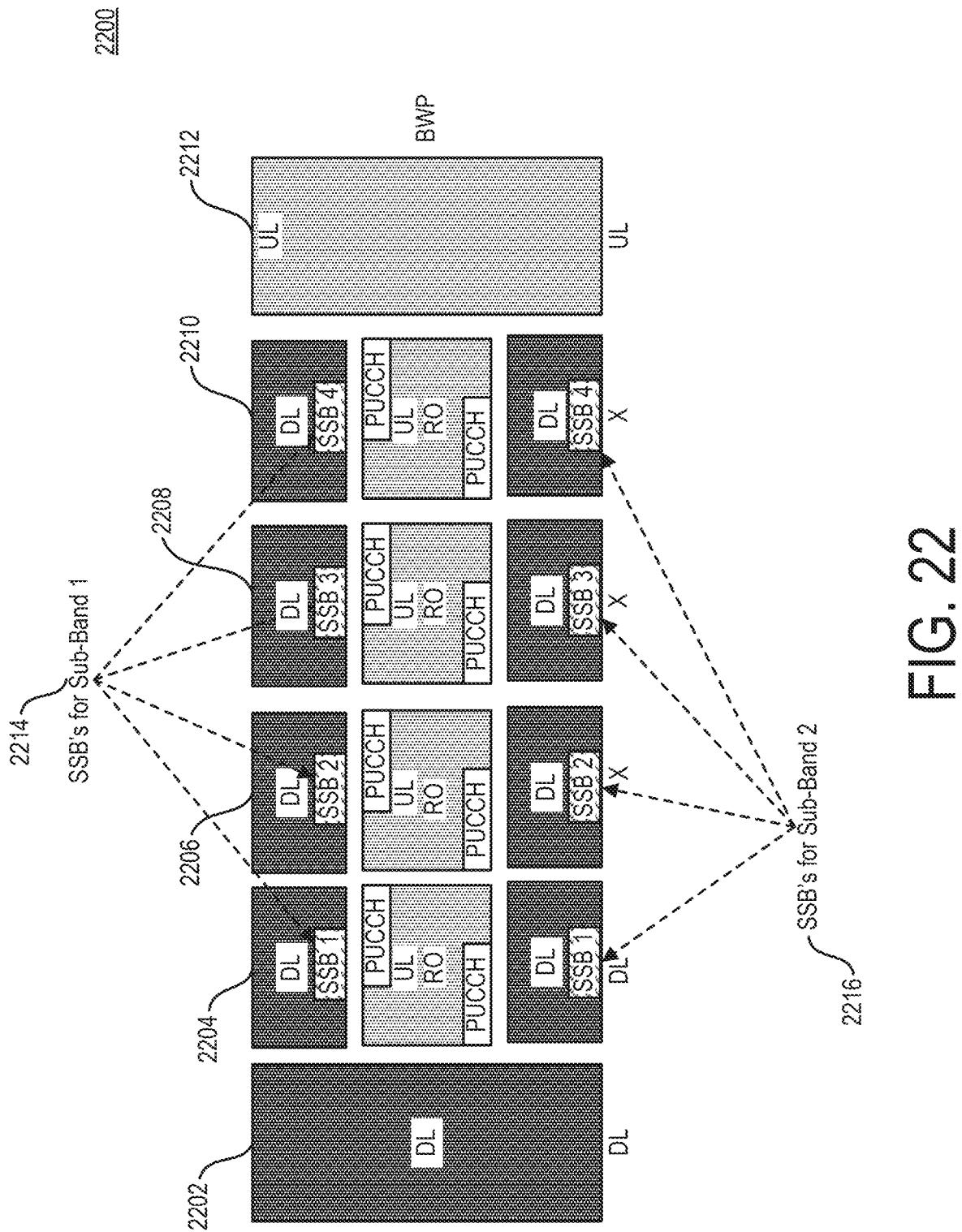
FIG. 22 shows SSB Sub-Band assignments.

FIG. 22 shows SSB Sub-Band Assignments 2200. For instance, SSBs for a first sub band may be located in DL portions of time intervals 2204-2210 and time intervals 2202 and 2212 may not contain SSB. Similarly, SSBs for a second sub band may be placed in the same time intervals.

For Case 6 where a link direction is not provided, it is possible to re-use the existing collision handling rules for the HD-FDD RedCap specification, 3GPP TR 38.865 V18.0.0 (2022-09) incorporated by reference herein.

Typically, it is not expected that there would be a collision between a RACH triggered by a PDCCH, or a dynamically scheduled DL reception; however, if necessary, a RACH may use a contention indication to the UE to ensure it takes priority, as noted in the following.

SSB/PRACH Contention Indication.

An embodiment that addresses most of these cases may be to use a contention-indication-based SSB/PRACH approach. This is not the same as contention-based RACH. A contention-based indication approach works by providing the UE a period of time after receiving either the SSB and/or RACH during which the UE should assume the medium is contended for further transmissions. The indication may be provided by the SSB, and/or a SIB. It may be broadcast, or it may be sent as a UE-specific indication. This may be in addition to other methods that have been described.

Figure 30:
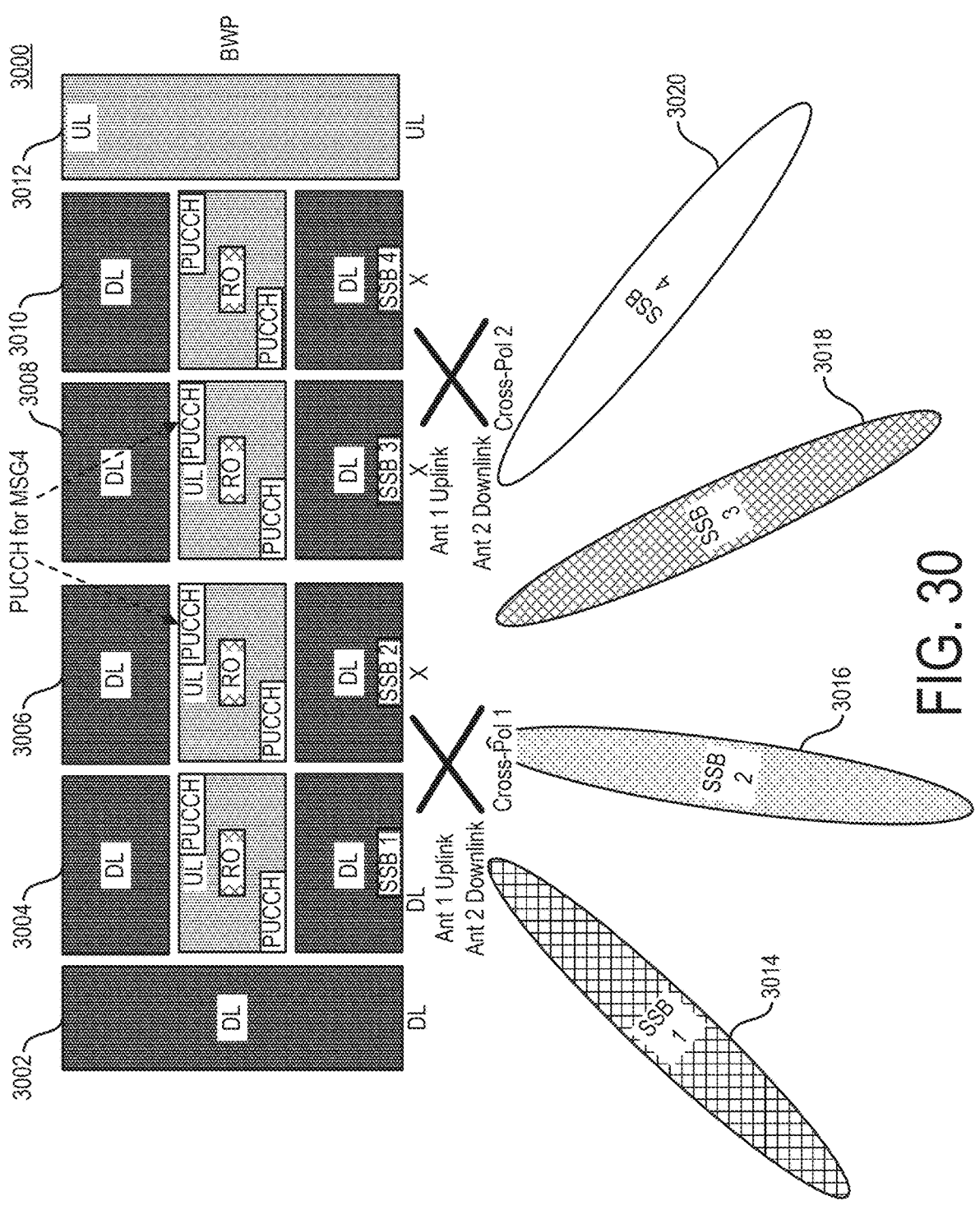
FIG. 30 shows an example of a cross-pol antenna configuration with xFD slots.

There may be cases when there are multiple simultaneous collisions, as shown in FIG. 30.

Figures 23, 24:
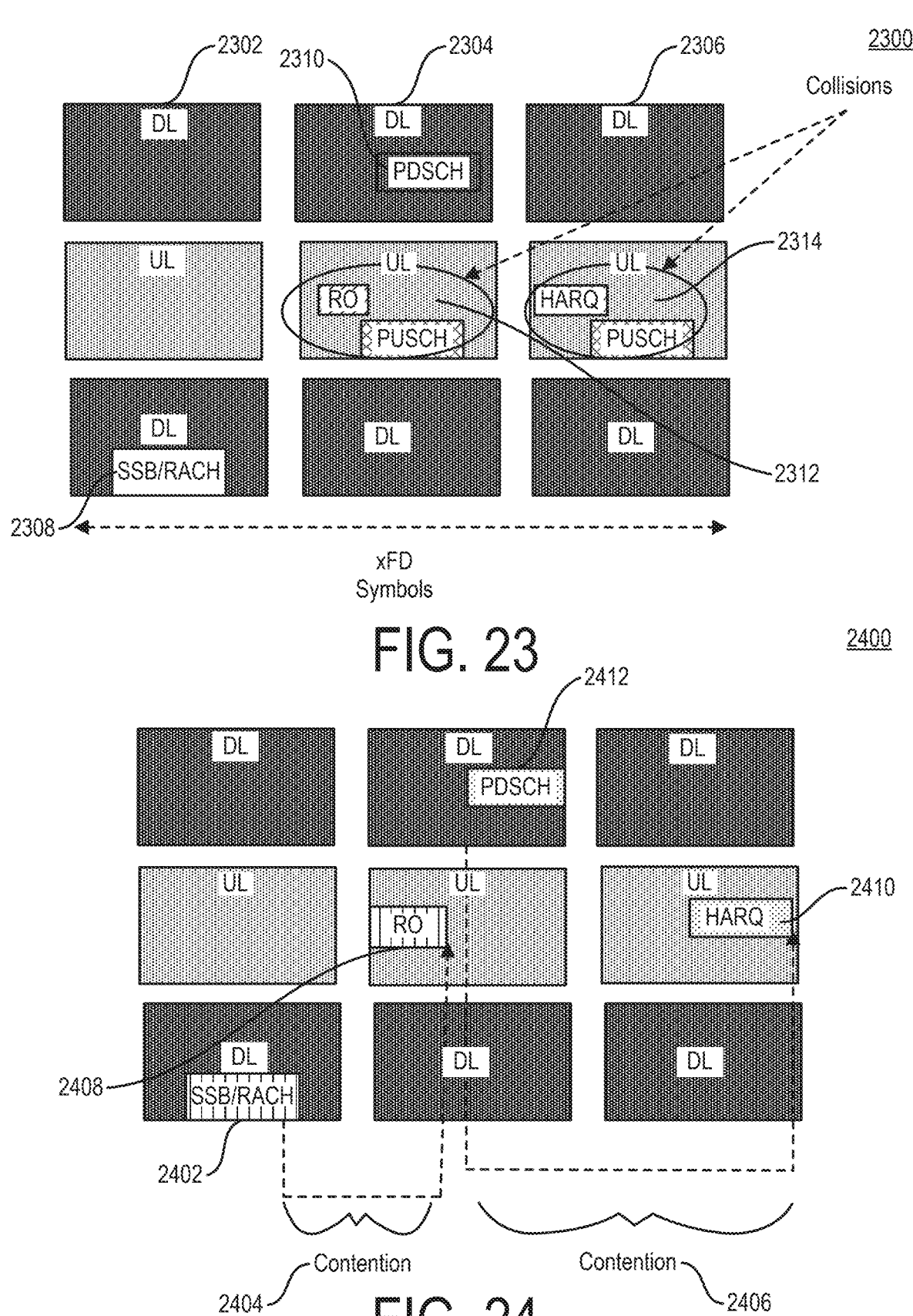
FIG. 23 is a time/frequency diagram showing Tx/Rx Collisions during an xFD Symbol or slot.
FIG. 24 shows that following SSB/RACH there may be contention indication region until the end of a RO.

FIG. 23 is a time/frequency diagram 2300 showing Tx/Rx Collisions During an xFD Symbol or Slot. Specifically three time intervals 2302-2306 are shown. In time interval 2302 SSB/RACH 2308 may be configured, in time interval 2304 PDSCH 2310 may be configured in DL and in uplink there may be a collision 2312 involving RO and PUSCH. In time interval 2306 there may be a collision 2314 involving HARQ and PUSCH.

There may be priorities assigned to UL transmissions that collide where the priorities may be: (1) RACH, (2) RO, (3) HARQ, (4) Configured Grant (CG) PUSCH, and (5) others.

In another embodiment, it may also be addressed using a contention indication, as in FIG. 24, which shows contention resolution 2400. A contention indication region following a RACH and/or HARQ procedure may indicate to the UE to wait before continuing with further UL and/or DL transmissions. The contention indication may be semi-statically or dynamically signaled using any SSB, RACH, or a DCI. The contention indication may be specific to a particular BWP, subband, signal type, or signal direction.

Specifically, FIG. 24 shows that following SSB/RACH 2402 there may be contention indication region 2404 until the end of a RO 2408. There may also be a contention region 2406 beginning with a PDSCH 2412 through HARQ 2410.

For 3GPP Release 19 and earlier, the PUSCH frequency hopping range is limited within the UL BWP. The starting RB of the first hop is indicated by the RB assignment information for the resource allocation type 1. The starting RB of the second hop is calculated based on the starting RB of the first hop, the frequency offset between two frequency hops, and BWP size. The formula for the legacy operation produces the output $$[0, N_{BWP}^{size}].$$

Using this, the PUSCH resource may overlap with the DL subband if the formula and frequency offset for the legacy procedure are reused.

For 3GPP Release 19/20; PUSCH intra-slot frequency hopping in SBFD symbols for the starting RB in each hop is given by:

$$RB_{start} = \begin{cases} RB_{start}, i = 0 \\ RB_{UL\,SB\,start} + (RB_{start} - RB_{UL\,SB\,start} + RB_{offset}) \bmod N_{UL\,SB}^{size}, i = 1 \end{cases}$$

Where the red entries are a modifications to the legacy formula. For PUSCH inter-slot frequency hopping in SBFD symbols and when pusch-DMRS-Bundling is not enabled, or for inter-slot frequency hopping for a PUSCH in SBFD symbols scheduled by RAR UL grant or DCI format 0_0 with CRC scrambled by TC-RNTI, the starting RB during slot $$n_s^\mu$$

is given by:

$$RB_{start}(n_s^\mu) = \begin{cases} RB_{start}, n_s^\mu \bmod 2 = 0 \\ RB_{UL\,SB\,start} + (RB_{start} - RB_{UL\,SB\,start} + RB_{offset}) \bmod N_{UL,SB}^{size}, n_s^\mu \bmod 2 = 1 \end{cases}$$

Where:

$RB_{UL\ SB\ start}$ is the starting PRB index of UL usable PRBs with reference to the start of UL active BWP.

$$N_{UL\ SB}^{size}$$

is the number of UL usable PRBs.

$RB_{start}$ is the starting PRB index of the first PUSCH hop with reference to the start of UL active BWP. For PUSCH transmissions with Configuration 2, RB_start is the starting PRB index with reference to the start of UL active BWP after applying RB offset between non-SBFD symbols and SBFD symbols.

RB offset is the frequency hopping offset for PUSCH in SBFD symbols.

Note: The definition of $$n_s^\mu$$

is unchanged from the Release 19 specification.

For PUSCH transmissions with Configuration 2, repetitions are counted separately for SBFD symbols and for non-SBFD symbols.

This formula and the PUSCH Frequency Hopping Illustration is disclosed in R1-2410692. "Summary #1 of SBFD TX/RX/measurement procedures," Agenda Item, 9.3.1, 3GPP TSG RAN WG1, #119, November 2024 and is reproduced by way of reference herein in its entirety.

Note that for 3GPP Release 19/20 for SBFD, two configurations are defined for an active BWP. For UL transmissions and DL receptions across SBFD symbols and non-SBFD symbols in different slots (each transmission/reception within a slot has either all SBFD or all non-SBFD symbols) for an SBFD aware UE, the SBFD-aware UE is provided with one of the configurations.

Configuration 1: The transmissions/receptions are restricted to SBFD symbols only or non-SBFD symbols only Configuration 2: The transmissions/receptions can be in SBFD symbols and non-SBFD symbols A xFD resource configuration may be semi-statically configured through RRC signaling, and/or it may be dynamically signaled via a PDCCH DCI configuration message on a per UE, and/or channel/signal basis. Preferably, this is done for a BWP configuration. In this embodiment, we consider Configuration 1 and Configuration 2 for 3GPP Release 19/20; however, this does not preclude other configuration possibilities, such as a ({DU}, {F}, {D}) pattern. Support for a configuration may also be defined for a specific UE capability.

For a UE that is intended for low complexity and/or low power applications, such as a UE that supports RedHat, the configuration it supports may be limited to a SBFD only configuration that is narrow band. In this way, the UE's configuration capability is implicit in the UE type.

Note that PUSCH (FD-)URLLC, SBFD, or simultaneous URLLC/SBFD symbols, or slots, may be collectively referred to as xFD symbols or slots. If xFD symbols or slots are considered, PUSCH frequency hopping requires new considerations.

For a configuration that contains both FD-URLLC symbols and SBFD symbols, the specification for PUSCH hopping may use any of the following: both may use the same RRC semi-static configuration for UL PUSCH hopping within an active BWP (e.g. the same periodicity, $$RB_{offset}^{xFD},$$

and $RB_{start}$); each may use individual RRC semi-static configurations; UE dedicated signaling may configure both FD-URLLC and SBFD symbols; UE dedicated signaling may have separate configurations for FD-URLLC and SBFD symbols.

PUSCH hopping may be intra-slot, or inter-slot. Inter-slot hopping carries the likelihood that the hopping pattern will span both xFD and non-xFD slots.

For each of the above, a hopping timing reference may be defined as a common reference within the xFD symbol allocation(s), or there may be a timing reference specific to each type of PUSCH hopping type. The hopping timing reference is assumed to only apply to either intra-slot or inter-slot pattern of a xFD type. A timing reference may be for a specific configuration, for example, either Configuration 1 or Configuration 2.

To ensure that PUSCH hopping is within the UL usable PRB resources, it may be necessary to specify a FH RB_offset value.

Figure 25:
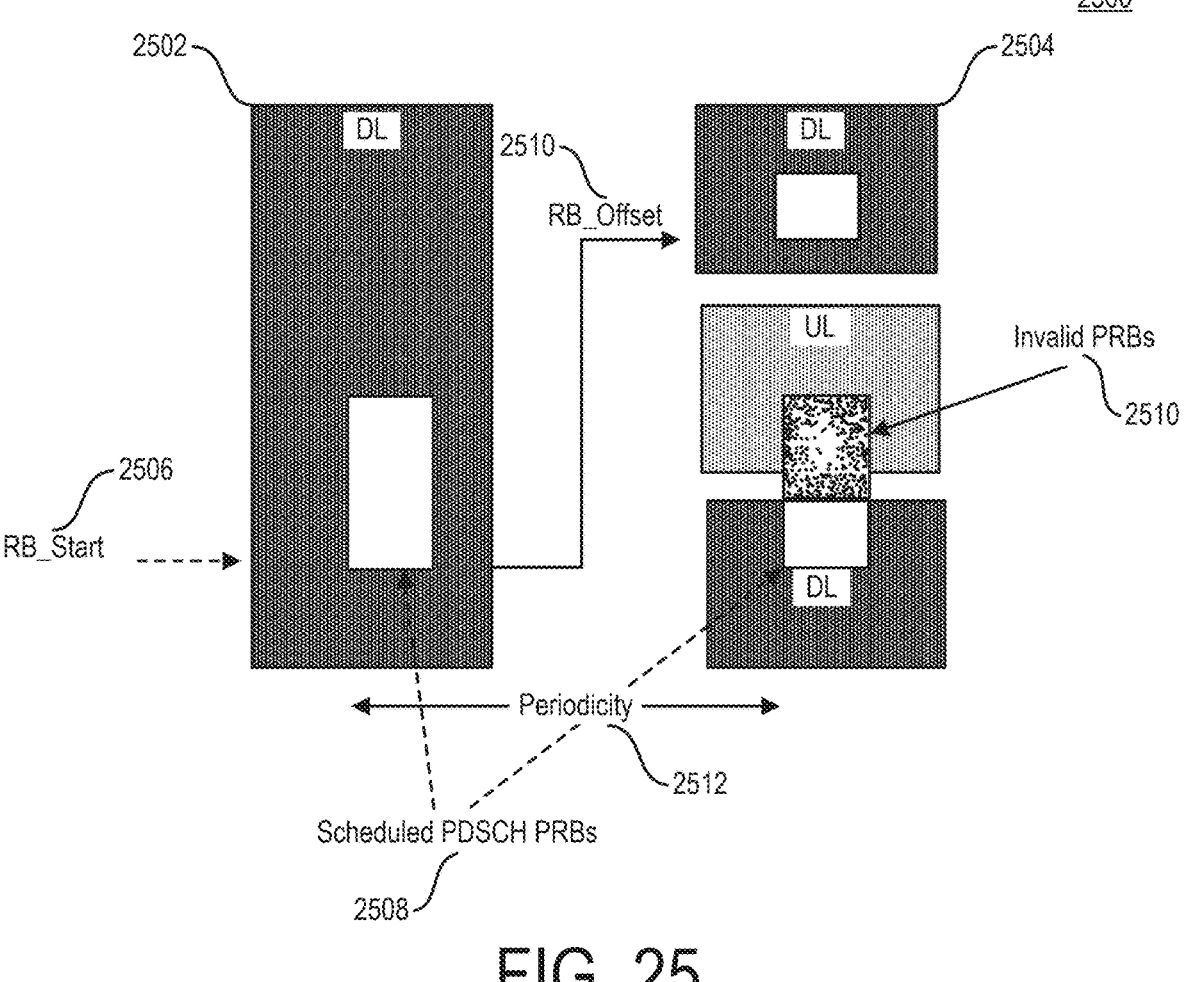
FIG. 25 is an illustration of an invalid PRB allocation.

FIG. 25 is an illustration 2500 of an Invalid PRB Allocation. FIG. 25 shows two time intervals 2502, 2504 which are configured according to a periodicity 2512. An RB-start 2506 which may specify a starting resource block index is associated with first time interval 2502 and an RB_offset 2510 which may specify a starting resource block index of a particular resource allocation relative to a specific reference point is associated with the second interval 2504. The first time interval 2502 and second time interval 2504 may schedule PDSCH 2508 and some portion of the scheduled PDSCH 2512 may be invalid 2510 for the reason that the invalid PDSCH 2510 falls within an UL portion and/or a gap portion.

This offset may also be dependent on the frame configuration type and xFD symbol/slot type.

Note that PUSCH hopping may be within the same spatial beam, or it may use inter-beam, hopping aligned with, but in addition to frequency hopping (FH).

A intra-slot hopping pattern may also be defined by periodicity and hopping frequency (e.g., every other slot or n slots may be skipped). The pattern may also be common and/or specified for each xFD type.

Punctured FD-URLLC Resource Allocation.

Figures 26, 27:
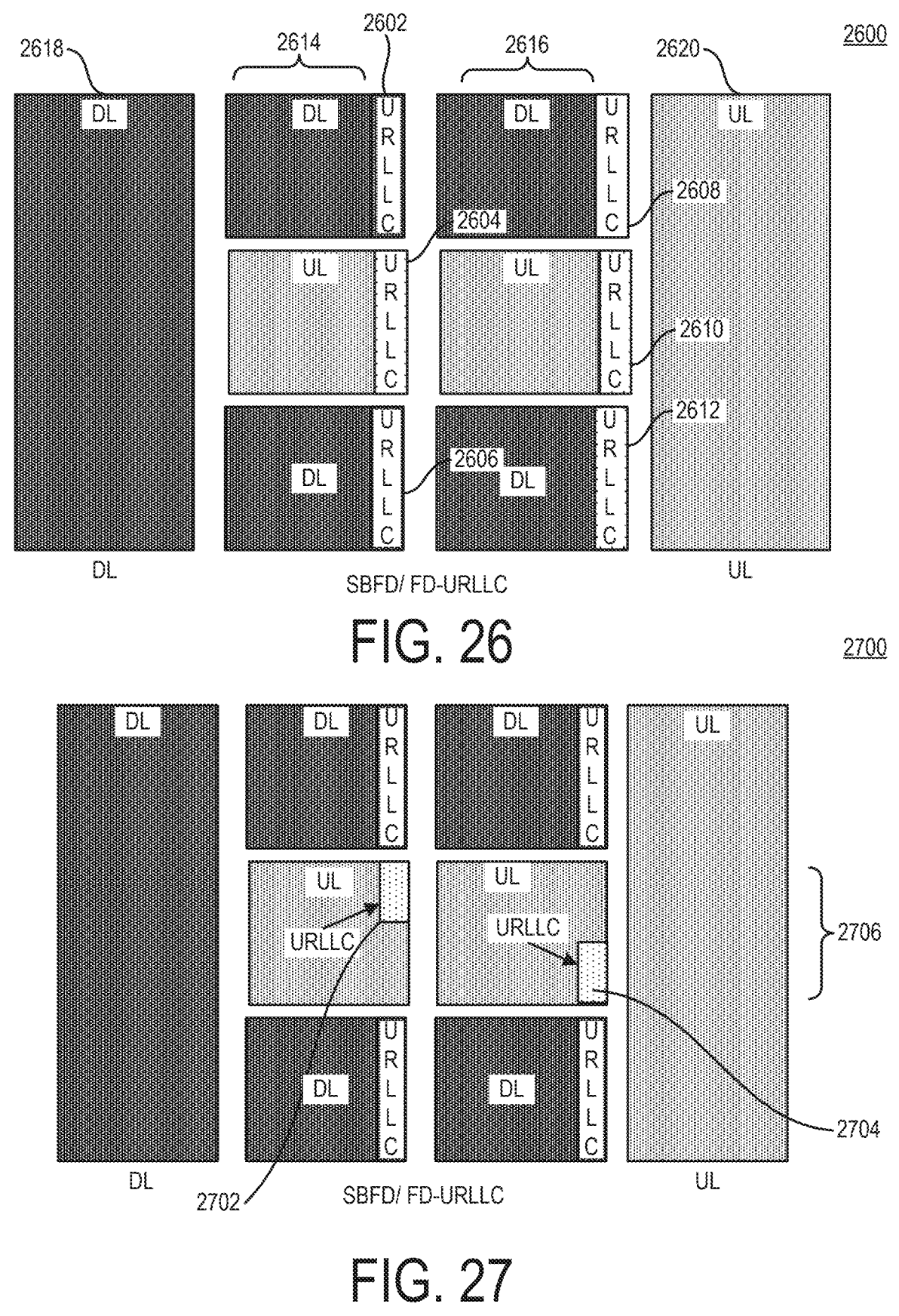

To enable FD-URLLC as well as enhance throughput for xFD communications, the resource allocation may be as shown in FIG. 26.

FIG. 26 shows a Punctured FD-URLLC Resource Allocation 2600. In this embodiment, FD-URLLC communications may be enabled by puncturing FD-URLLC symbols 2602-2612 within SBFD symbols 2614-2616. The procedure may or may not puncture DL 2618 and UL 2620 portions. The procedure for puncturing of FD-URLLC symbols may occur in a similar fashion as the legacy procedures for the puncturing of URLLC symbols within the legacy NR frame structure. The procedure for puncturing may change depending on the configuration type. The puncturing pattern may also be impacted by the requirement for PUSCH hopping. A modification to PUSCH hopping may be as shown in FIG. 27 and other variations of this concept are possible.

FIG. 27 shows an example 2700 of FD-URLLC PUSCH hopping wherein UL URLLC puncturing is performed. Specifically, URLLC symbols 2702, 2704 are dedicated in an UL sub band 2706 portion. It may be that last symbol(s) are punctured or other symbols.

The resource allocation for SRS is defined by the parameter 'SRS-ResourceSets'. Separate configurations are required for SBFD and non-SBFD symbols. The UE may be configured with a list of SRS resource sets where each SRS resource set configuration includes one or multiple SRS resources, time/frequency resources, a spatial relation, and power control settings that can be separately configured for each SRS resource. For beam management with SRS, a codebook, non-codebook, or antenna switching can be configured. In Rel-17, multi-TRP PUSCH repetition is supported with up to two SRS resource sets with usage set to 'codebook' or 'nonCodebook'.

To support SRS, the definition of separate parameters 'SRS-ResourceSets' may be used for xFD, and non-xFD symbols and/or slots. This requirement may be extended to support separate parameters for all of the symbol types FD-URLLC, SBFD, URLLC/SBFD, and non-SBFD since these all have different SRS and CLI requirements. A SRS-Resource type may have additional configuration requirements.

For a multi-Transmission Reception Point (TRP) scenario, it may be required to extend the definition of the above. Specifically the definition of the parameter 'SRS-ResourceSets' may be further restricted to use for a particular TRP, for example a new parameter 'SRS-ResourceSets-TRP' may be required. An alternative approach is to require a separate configuration for the symbol types xFD (FD-URLLC, SBFD, URLLC/SBFD, and non-SBFD), and non-xFD in the same SRS-Resource.

For both definitions of 'SRS-ResourceSets,' support is required for SRS frequency hopping. Supporting separate SRS frequency hopping configurations for the symbol types xFD and non-xFD is desirable. This may or may not be aligned with uplink PUSCH frequency hopping parameters. If separate SRS frequency hopping parameters are defined for each of the types FD-URLLC, SBFD, URLLC/SBFD, and non-SBFD the configuration overhead may be too high. A SRS frequency hopping parameter may then be defined per subband, as shown in FIG. 28.

Figure 28:
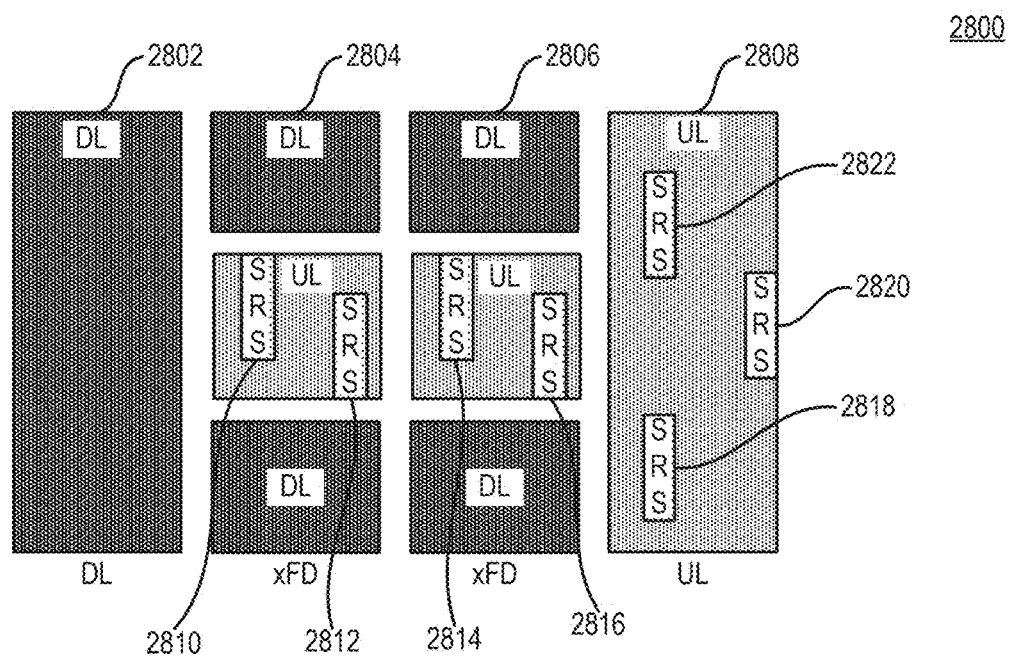
FIG. 28 shows an example of FD-URLLC PUSCH hopping.

FIG. 28 shows an example 2800 of FD-URLLC PUSCH Hopping. Specifically, four time intervals 2802-2808 are shown. In SBFD time interval 2804, SRS 2810-2816 is located in the UL sub band in both time intervals 2804, 2806. SRS 2818-2822 is also located in UL time interval 2808.

In this approach, there is not a distinction between the FD-URLLC and SBFD symbol types. This however, causes an issue if puncturing of the FD-URLLC symbols is used. If this is the case it may reuse the definition of 'SRS-ResourceSets,' for xFD symbols.

For the hopping specification, a SRS counter is required. The definition of the SRS counter hSRS may need to be modified to support the different types of 'SRS-ResourceSets'. The simplest embodiment may be to define a separate counter for xFD and non-xFD symbols, however this may increase the overhead. To address this, a modulus counter may be used; for example, a 28 modulus counter may be used.

Figure 29:
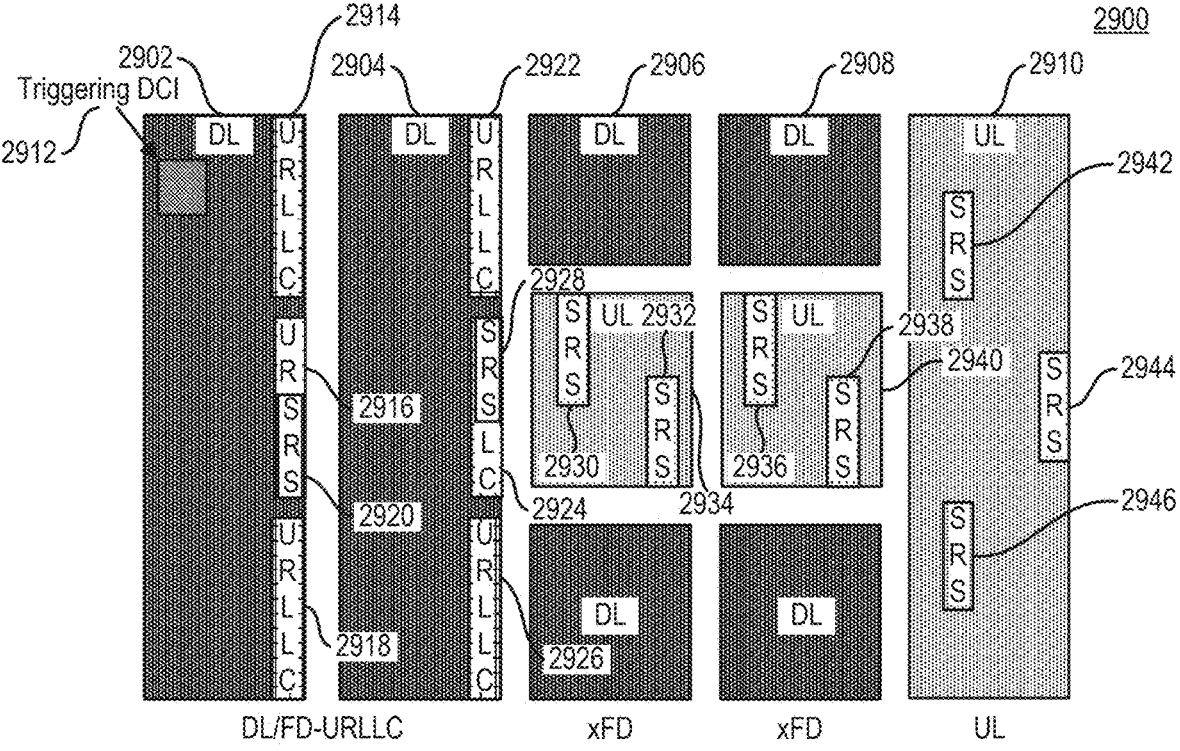
FIG. 29 shows an example of SRS hopping across symbol types.

Another method is to define the SRS resource set and associated counting method as a part of the triggering DCI message, as is shown in FIG. 29. An SRS resource hopping set may be defined by a reference slot and/or symbol index, slot and/or symbol offset, count modulus, and symbol type.

FIG. 29 shows an example 2900 of SRS Hopping Across Symbol Types. In the example 2900, five time intervals 2902-2910 are shown. Time interval 2902 may comprise a triggering DCI 2912 as well as three URLLC regions 2914-2918. URLLC region 2916 (or other regions) may comprise SRS 2920. Second time interval 2904 may also have three URLLC regions 2922-2926 of which SRS 2928 is located. Third time interval 2906 may locate SRS 2930, 2932 in different portions of an UL subband 2934. Fourth time interval 2908 may locate SRS 2936, 2938 in same or different frequency/time components of an UL subband 2940 as third time interval 2906. Fifth time interval 2910 may locate SRS 2942-2946 spread in various time/frequency locations.

It may also be useful to define a new SRS-ResourceSet-CLI parameter for a set of legacy SRS resources used for the purposes of L1-based SRS-RSRP measurements with only the relevant parameters needed for CLI measurement. This may also include an optional configuration of an available slot offset list in a set of SRS resources used for CLI measurement. Available slots may be defined as xFD slots. Also an SRS-RSRP measurement resource set may include a list of SRS-RSRP measurement resources. Initial Acquisition of a Cell.

An omni pattern may be available for one or more beams. This allows a UE to 'see' the gNB before a beam acquisition has taken place. An omni pattern may be setup for either a non-xFD type of slot or any other xFD type of slot. In the event an xFD type of slot is used for the omni pattern, it may initially use the omni pattern and then later change to a beam pattern such as that shown in FIG. 28 using a beam pattern configuration initially setup using the omni transmission of the RACH/SSB and SIB parameters.

It is further possible to use the beam configuration to improve the CLI of a xFD setup. An example of this is shown in FIG. 30.

FIG. 30 shows an example 3000 of a Cross-Pol antenna configuration with xFD slots. In the example 3000, five time slots 3002-3012 are shown. Time slot 3004 employs a first beam for SSB 3014, time slot 3006 employs a second beam for SSB 2016, time slot 3008 employs a third beam for SSB and time slot 3010 employs a fourth beam for SSB.

The spatial correlation matrix for two pairs of cross-polarized antenna elements may be expressed as:

$$R_{UE} = \begin{pmatrix} 1 & \beta \\ \beta^* & 1 \end{pmatrix}$$

Eq 1 where $\beta$ is the correlation coefficient. The correlation coefficient may be significantly small, thus improving the CLI between the DL and UL transmission paths using full duplex operation. It may also be observed that only one SSB/RACH procedure is required for each cross-polarized antenna pair. However, by retaining the SSB/RACH procedure for each branch of the cross-polarized antenna, the probability of detection of the SSB/RACH procedure can be improved relative to that for only a single branch. These concepts may be extended to multiple even combinations of cross-polarized antennas. In LTE or NR systems, either, Hybrid-ARQ (HARQ) using CC (Chase-Combining), or IR (Incremental Redundancy) is performed to increase efficiency and reliability. The HARQ is based on the use of a stop-and-wait procedure; for example, once a packet is transmitted from the gNB, the UE may decode it and provide feedback in the PUCCH, for a negative acknowledgment (NACK) the gNB may send a retransmission. The UE may combine the retransmission with the original transmission and may run channel decoding again. Upon successful decoding (based on a CRC check) the UE may send a positive acknowledgment (ACK). After that, the gNB may send a new packet for that HARQ process. Due to the stop-and-wait operation, one should have multiple HARQ processes to enable a continuous data flow. For NR FDD, the maximum number of processes is 32 for both the uplink and downlink, whereas for NR TDD the maximum number of processes is 4. TDD has a reciprocal channel. An example of a single user's continuous transmission is illustrated in "Improve the performance of LTE system using HARQ with MISO technique" to Firas Sami Alsharbaty et al., June 2013, reproduced by reference in its entirety herein. For multiple users, it is dependent on the gNB scheduler when a retransmission is sent in the uplink and/or downlink direction, as a retransmission also requires that resources are previously allocated.

The HARQ operation may support either soft combining or incremental redundancy. The use of soft combining may imply that a retransmission has exactly the same rate-matching parameters as the original transmission, and thus exactly the same symbols are retransmitted. For incremental redundancy (IR), the retransmission has different rate-matching parameters; consequently, a retransmission uses a different set of bits than the prior packet that are defined by a redundancy value (RV). As may be observed, the use of HARQ introduces a delay, which is the cost for achieving a higher QoS.

Hybrid Acknowledgement and Repeat Request (HARQ) feedback and retransmission enable a system reliability improvement against channel variations and fading. If, at the receiver, the data block contains no errors, the block may be accepted, and an acknowledgment (ACK) is sent to the transmitter to confirm the data reception. However, if the block does contain errors, HARQ supports different methods to correct the errors through channel feedback and error correction, if all errors are corrected, then the block is accepted, and an ACK is sent to the transmitter, otherwise, the if block is not accepted, and a non-acknowledgment (NACK) is sent to the transmitter indicating that the block hasn't been received correctly and requesting a data retransmission.

ARQ uses feedback, which incurs delays; HARQ leverages ARQ to improve reliability by using parallel HARQ process buffers, also called processes. Because it relies on feedback, delays may be incurred due to the propagation delay. The retransmission transmission time (RTT) is the time for the HARQ retransmission, driven primarily by the propagation delay $T_{prop}$. A HARQ timer is defined which is the time a receiver is to wait before a retransmission of the same packet may be expected, the retransmission time plus the time for the number of processes is determined by, $$N_{Min,HARQ} = \frac{T_{HARQ}}{TTI}$$

$$T_{HARQ} = 2T_{prop} + 2T_{slot} + T_{proc,UE} + T_{proc,BS}$$

where $N_{Min, HARQ}$ is the minimum number of parallel processes, $T_{slot}$ is the block transmission time, and $T_{HARQ}$ is the total time for the HARQ RTT.

xFD creates new issues for collisions using HARQ, Ack/Nack, SRS, and PUSCH resources. The Redundancy Value (RV) indication may also be impacted by the xFD slot configuration(s). There are some methods that may help resolve collisions for the resource allocation algorithm. Some methods include: guard band frequency, time locations within a subband and/or slot; indication of symbol direction (e.g. D/U/F) where F represents a flexible location that may need additional information to determine its direction; xFD versus non-xFD slot and/or symbol restrictions; slot configuration restrictions and/or extensions.

Explicit indication of the guard band frequency and time locations may be needed to enable the gNB to enable a switch between xFD and non-xFD symbols, or xFD idle (e.g. DRX) and/or muted symbols.

Figure 31:
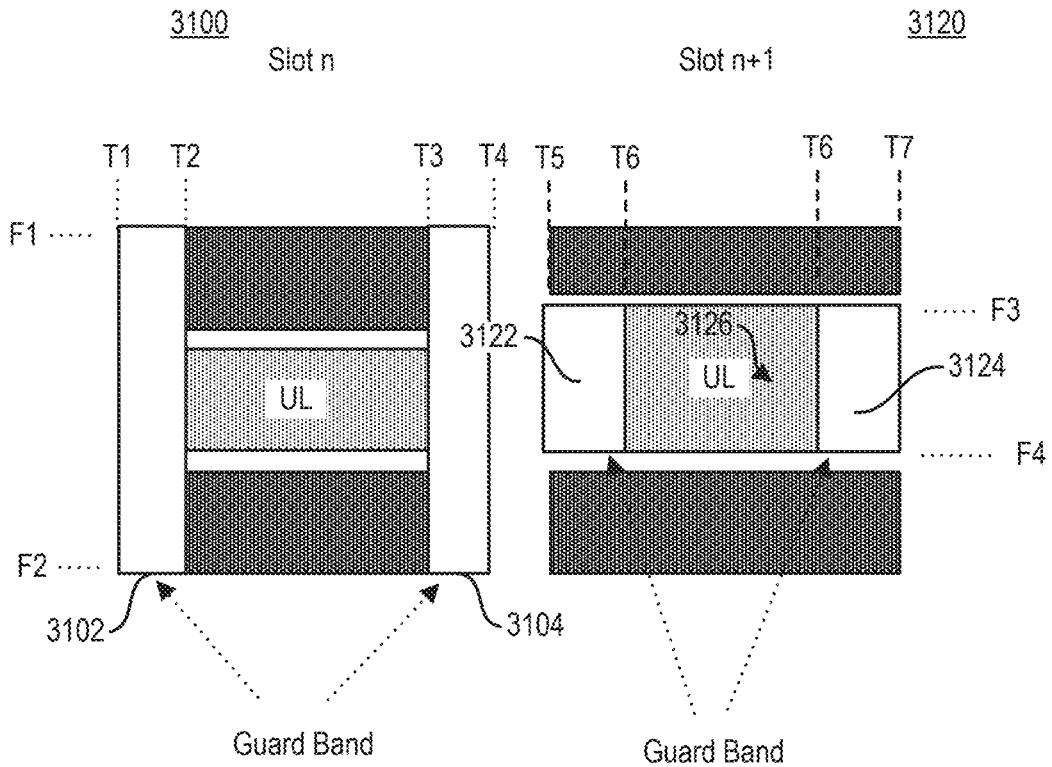
FIG. 31 shows examples of indicated of guard band locations.

FIG. 31 shows examples 3100, 3120 of indicated of guard band locations. Specifically, FIG. 31 shows an illustration of the explicit indication of the guard band frequency and time locations, where the frequency and time locations may be supplemented with the slot number information (e.g. slot_n_F1, Slot_(n+1)_T5, etc.). Slot n 3100 comprises guard bands 3102, 3104. Guard band 3102 spans from T1 to T2. Guard band 3104 spans from T3 to T4. Guard bands 3102, 3104 span from F1 to F2. Slot n+1 3120 includes guards 3122, 3124 adjacent UL portion 3126. Guards 3122, 3124 are located between F3 and F4 and are not shown to be located along the entire frequency region.

Figure 32:
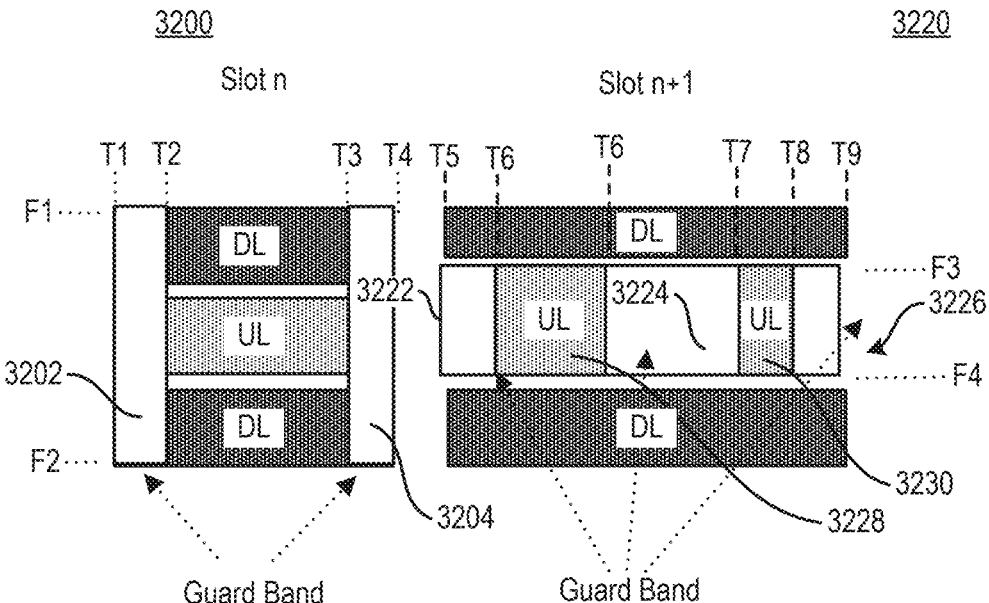
FIG. 32 shows an example slot indication of multipart uplink subband segments in slot n and slot n+1.

FIG. 32 shows an example slot indication of multipart uplink subband segments in slot n 3200 and slot n+1 3220. Slot n 3200 comprises guard bands 3202, 3204. Guard band 3202 spans from T1 to T2. Guard band 3204 spans from T3 to T4. Slot n+1 3220 employs three guard bands 3222, 3224, 3226 placed adjacent in time to two UL portions 3228, 3230.

For a collision between a PRACH triggered by a PDCCH and a dynamically scheduled DL reception, the UE may decide whether to receive the DL reception or transmit the PRACH. It may also determine a reference behavior from an indication in "TDD-UL-DL-ConfigCommon" which specifies a default behavior. A default behavior for the UE may also be determined by a behavior specified in "TDD-UL-DL-ConfigDedicated" which, if specified, takes precedence over any defined in "TDD-UL-DL-ConfigCommon" for the BWP that it is defined for.

xFD Subband Frequency and Subband Location Indication. An indication of the xFD guard band frequency and time locations may be semi-static and may also be indicated by the RRC in "TDD-UL-DL-ConfigCommon" and/or "TDD-UL-DL-ConfigDedicated.". The period may be the same as TDD-UL-DL pattern period configured by dl-UL-TransmissionPeriodicity in TDD-UL-DL-ConfigCommon.

Although the default reference SCS may be defined by the "referenceSubcarrierSpacing" in "TDD-UL-DL-Config-Common", the SCS may be specific to the BWP that the xFD configuration is present in.

For the configuration of xFD symbols within a TDD-UL-DL-(Common and/or Dedicated) pattern period, some or all of the following parameters may be supported: Symbol and/or Slot Type (SBFD, FD-URLLC, non-xFD); Symbol and/or slot direction (D/U/F); Reference BWP indication; A starting slot index; A starting symbol index within the starting slot; An ending slot index; An ending symbol index within the ending slot; A starting Guard Band (GB) slot index; A starting symbol Guard Band (GB) index within the starting slot; An ending slot Guard Band (GB) index; An ending symbol Guard Band (GB) index within the ending slot.

Guard band periods may be configured outside the xFD time location(s) to provide an indication that resources cannot be mapped there.

xFD aware UE behaviors in xFD symbols with interaction with legacy TDD slot configuration indications may be indicated using "TDD-UL-DL-ConfigDedicated" and SFI in DCI format 2_0.

The symbol and/or slot link direction may either be explicitly indicated to the UE, and/or determined from the configuration of transmissions/receptions and/or collision handling within the resource allocation (e.g. BWP) for the xFD operation. Similarly, the link direction may also be explicitly indicated in a DCI message.

During a RACH procedure, the symbol and/or slot link direction may be unique to the RACH operation.

If a "TDD-UL-DL-ConfigDedicated" configuration indicates a link direction for a legacy UE, the gNB may not indicate a xFD symbol as DL symbol, and/or slot, or UL symbol and/or slot.

For a UE in RRC connected mode, at least a cell-specific configuration of time/frequency subband locations may be supported.

For a UE-specific configuration, the configuration of time locations for DL/UL xFD subbands may differentiate between SBFD, FD-URLLC, and non-xFD time locations.

It should be noted that procedures for partial or full PRG support may account for DL and/or UL subband xFD resource allocations. If a PRG is determined to be wideband only, contiguous DL subband resources can be supported. If a partial PRG can be supported, the partial PRG may be dedicated to a particular symbol type, for an exemplary embodiment, one or both of SBFD and FD-URLLC may be supported.

Figure 33:
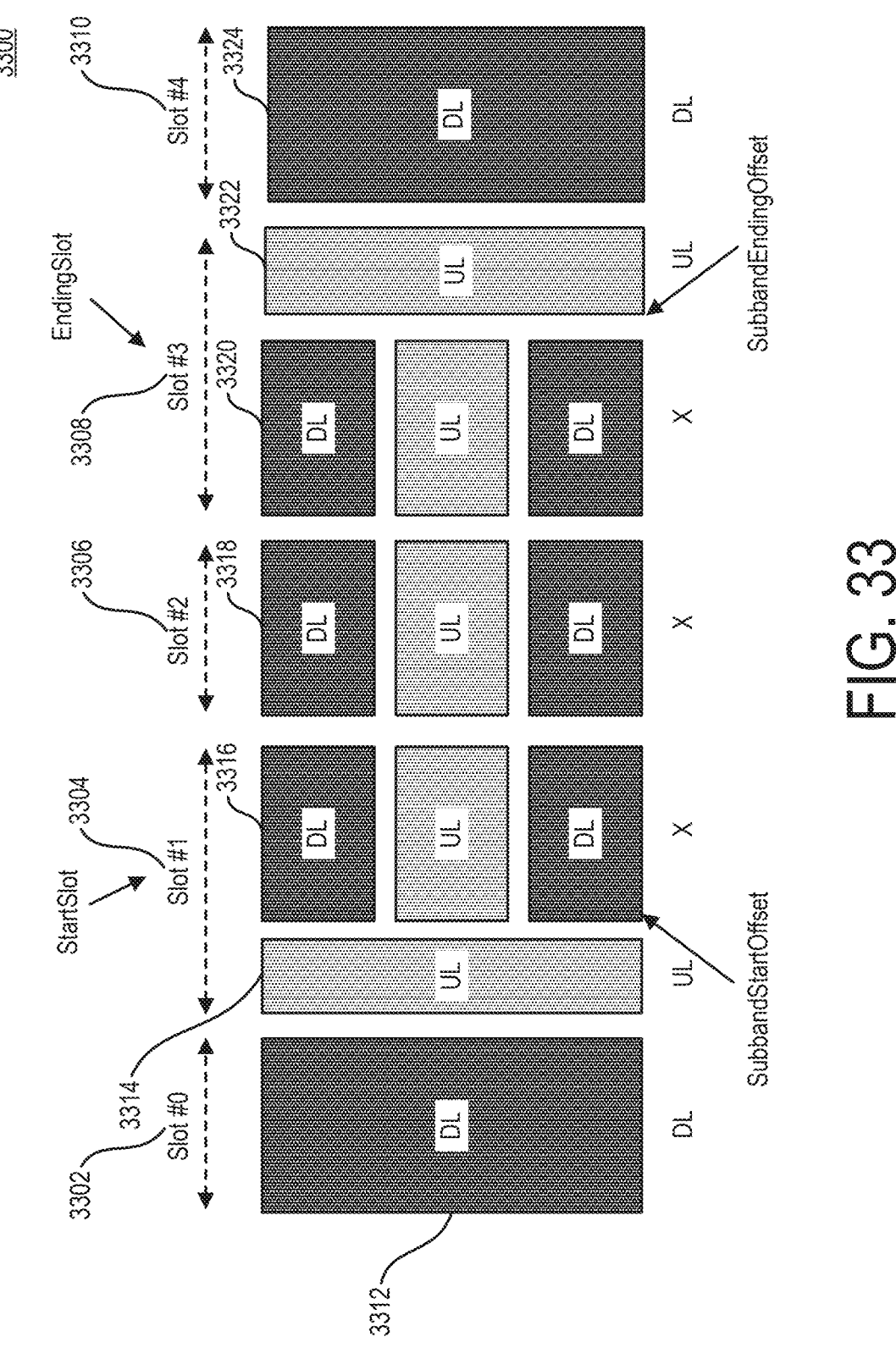
FIG. 33 shows a subband slot allocation indication.

A subband may be allocated to only a portion of a slot as shown in FIG. 33. FIG. 33 shows a subband slot allocation indication. In the example 3300, slot 0 3202 comprises DL 3312, slot 1 3304 comprises an UL time portion 3314 followed by a SBFD portion 3316, slot 2 3306 comprises a SBFD portion 3318, slot 3 3308 comprises a SBFD portion 3320 and an UL portion 3322 and slot 4 3310 comprises a DL portion 3324.

The "startSlot", and "endingSlot", may be cell-specific and semi-statically indicated by the RRC in "TDD-UL-DL-ConfigCommon" and/or "TDD-UL-DL-ConfigDedicated" for a particular BWP identity, or in general if a BWP is not used. In the case that a subband is offset from either the beginning or the end of a slot, a "subbandStartOffset" and/or a "subbandEndingOffset" may be defined in a similar manner. For a cell specific configuration these parameters may be included in either "ServingCellConfigCommonSIB" and/or "ServingCellConfigCommon".

UE Restrictions on xFD Scheduling for HARQ. For HARQ there is an inherent switching delay for a UE to switch from receiving a DL packet to responding with a HARQ response in a UL resource. The switching delay is exacerbated when receiving on a non-xFD slot/symbol to a response on a xFD slot/symbol. This is true specifically for incremental redundancy (IR) HARQ (IR-HARQ).

In an embodiment, the switching delay may be mitigated by using the redundancy value, or redundancy version (RV) procedure. The redundancy values are labeled RV0 through RV3 where RV0 and RV3 may be self-decodable. RV1 and RV2 use different incremental redundancy combinations of coded bits. Incremental redundancy is typically implemented in a circular buffer as is described in "Physical Layer Processing Supporting Technologies" and "Key 5G/5G-

Advanced Physical Layer Technologies" Third Edition 2024 to Douglas H. Morais reproduced herein by way of reference in its entirety.

To mitigate the inherent inefficiency of switching delays, the self-decodable bits may be sent in non-xFD slots, and the transmission of the RV IR bits is sent using one or more xFD subband slots. In this case, the xFD slots available to participate in an IR HARQ process for a particular UE may be identified semi-statically in an RRC message and/or dynamically in a DCI message.

Figure 34:
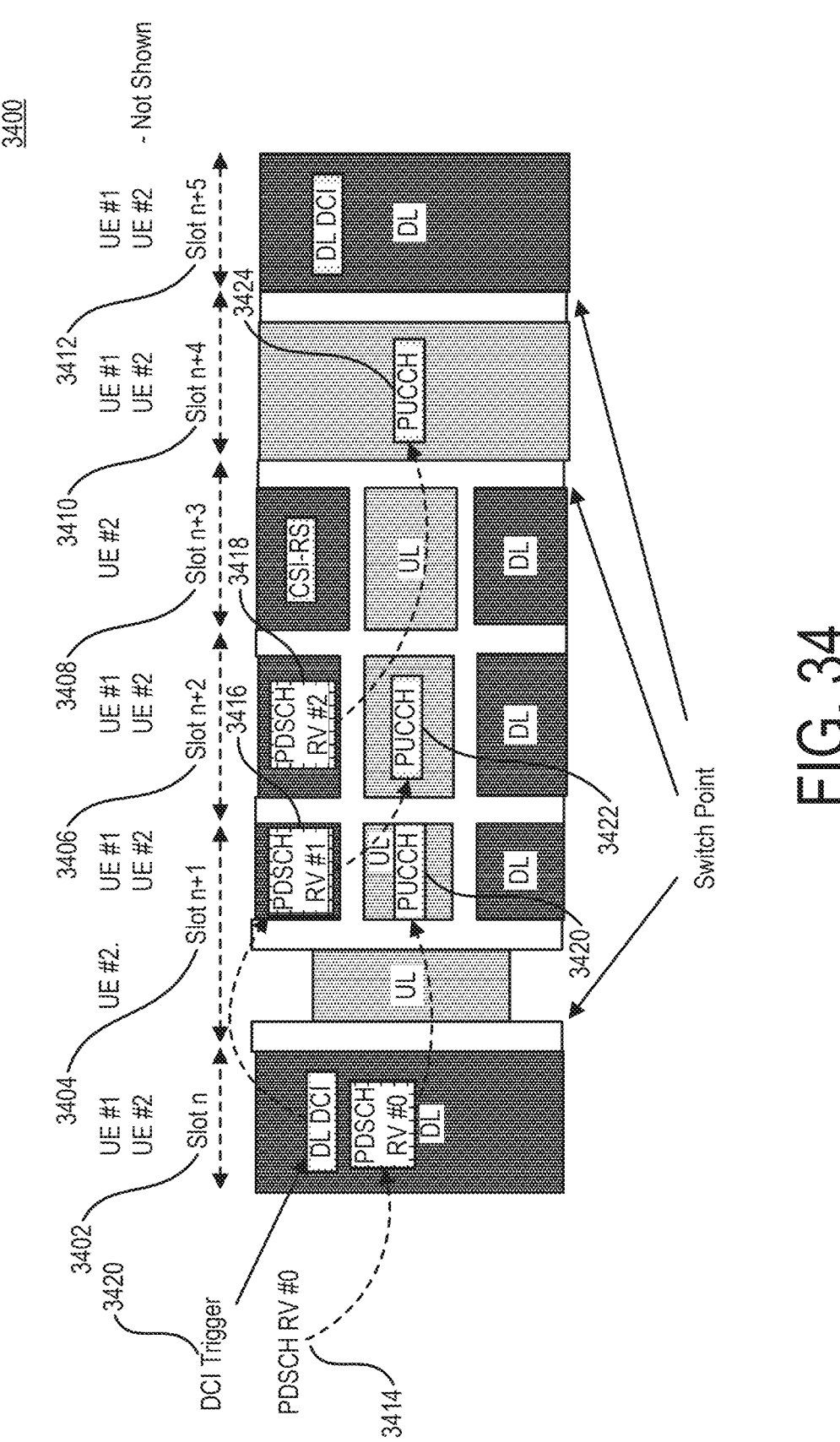
FIG. 34 shows an xFD schedule and switching point delays.

FIG. 34 shows an xFD schedule and switching point delays. An example of the switch points that may incur delay is given in FIG. 34 where the IR HARQ process 3400 for two UEs is shown. FIG. 34 also shows the resource allocation for one of two UEs, where UE #1 may only be capable of accommodating one switch point pair for an IR HARQ process. However, UE #2 may be more capable and may accommodate more than one pair of switch points.

Figure 45:
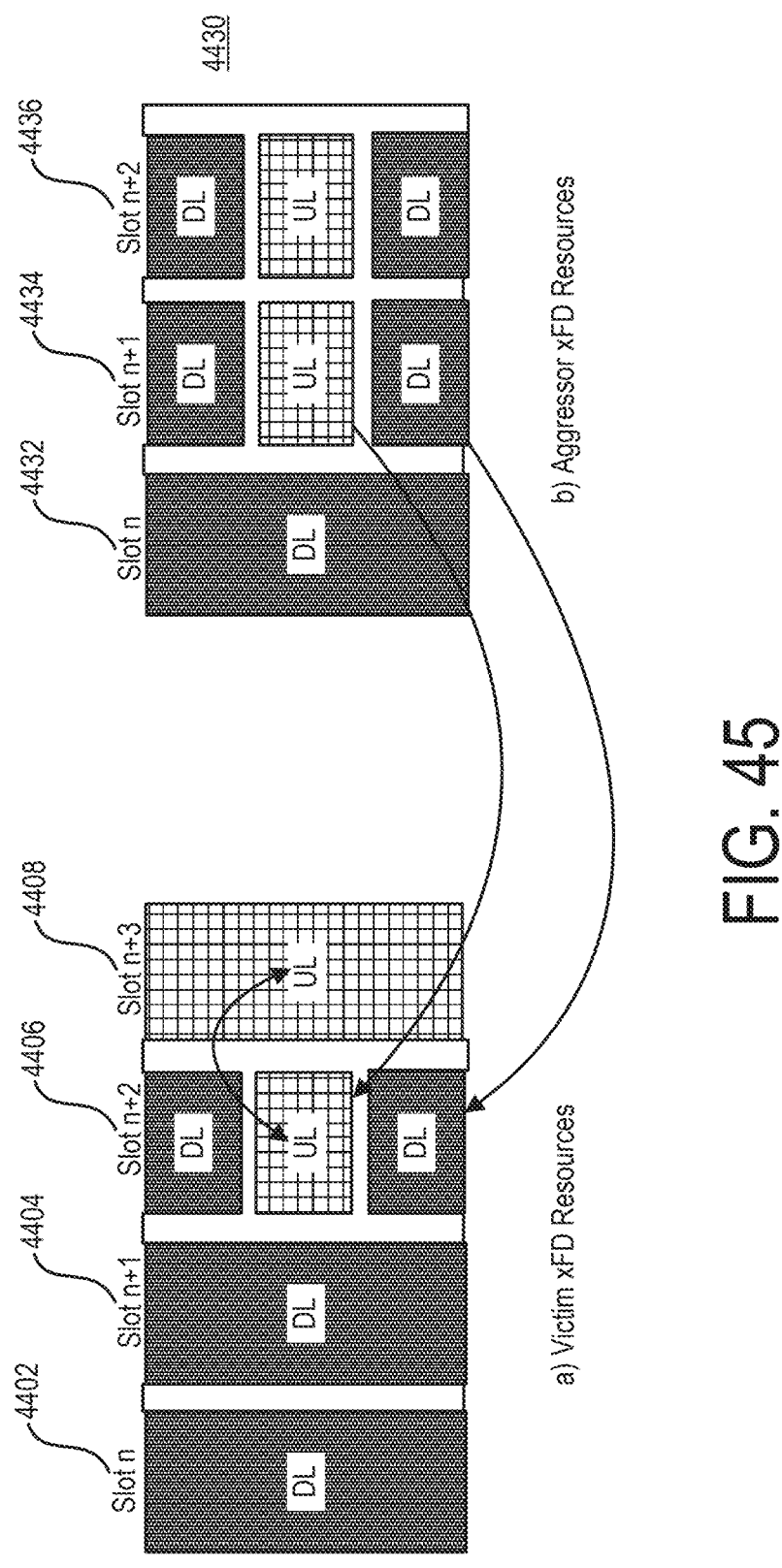
FIG. 45 shows inter-subband, intra-subband co-channel Interference.

Specifically, FIG. 34 shows six slots n to n+5 3402-3412. The transmission for UE #1 may begin with RV 0 3414 in Slot n 3402, and an incremental retransmission of RV 1 3416 may occur in slots n+1 3404 and RV 2 3418 n+2 3406. This suggests that for each non-xFD downlink slot, it may be tagged with an identifier in a DCI message 3420 that identifies it as belonging to a particular IR-HARQ process for a specific UE. The flow chart for UE #1 is shown in FIG. 45, which includes the PDSCH grant and the UL PUCCH ACKs. PUCCH 3420 may be associated with RV 0 3414. PUCCH 3422 may be associated with RV 1 3416. PUCCH 3424 may be associated with RV 2 3418.

Figure 35:
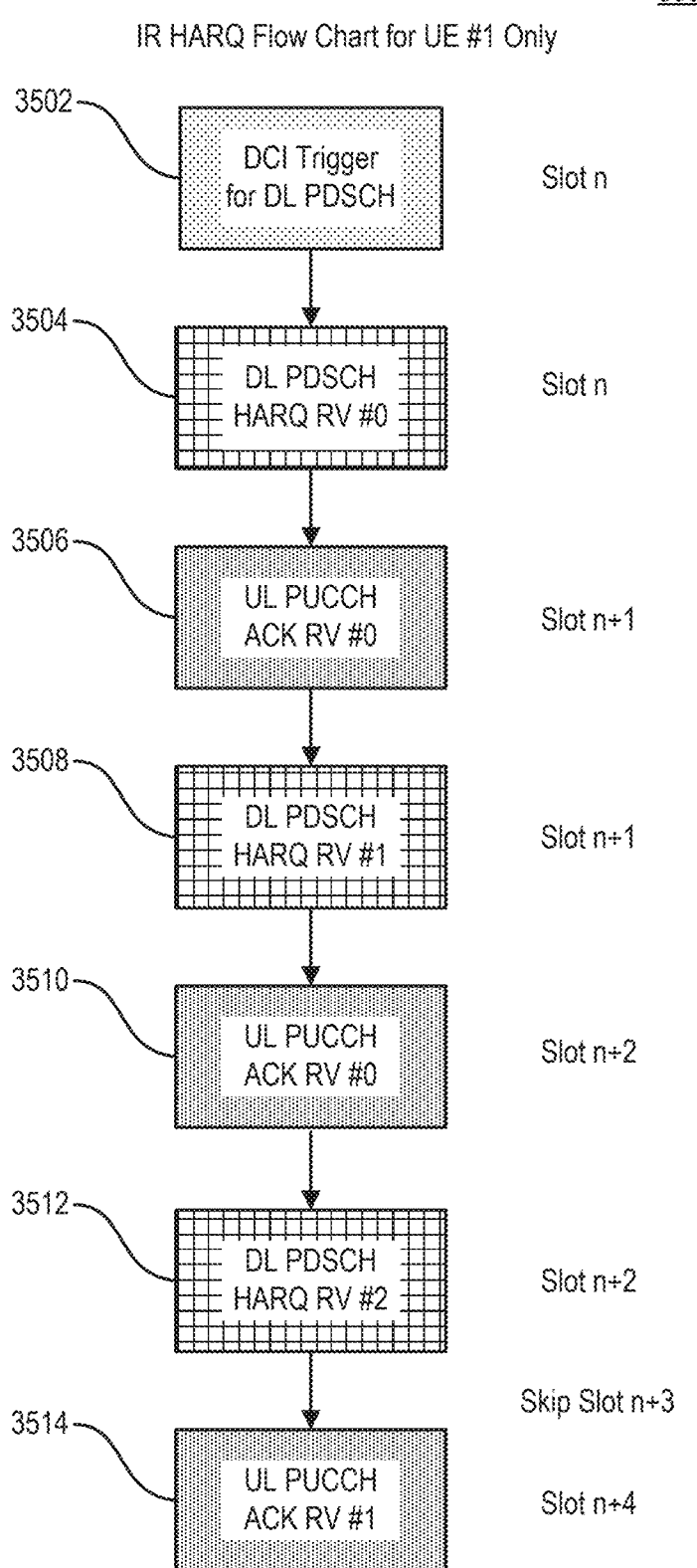
FIG. 35 shows an IR HARQ process flow chart for UE #1.

FIG. 35 shows an IR HARQ process flow chart 3500 for UE #1. Specifically, a DCI trigger for DL PDSCH 3502 may be received in slot n as well as a DL PDSCH HARQ RV 0 3504. Slot n+1 may comprise an UL PUCCH ACK RV 0 3506 and a DL PDSCH HARQ RV 1 3508. Slot n+2 may comprise an UL PUCCH ACK RV 0 3510 and a DL PDSCH HARQ RV 2 3512. Slot n+3 may be dedicated to something unrelated. Slot n+4 may comprise an UL PUCCH ACK for RV 1.

The capability of the UE may also include the maximum number of xFD subband slots that a UE can use for IR HARQ. This may depend on the SCS used; for example, a larger SCS, such as 120 kHz, may support a smaller number of xFD subband slots or possibly only one xFD subband slot. The UE capability may also include the minimum required guard band between UL and DL subbands in the unit of frequency, BWP index, or number of PRBs for each tone spacing and SCS.

Figures 36, 37:
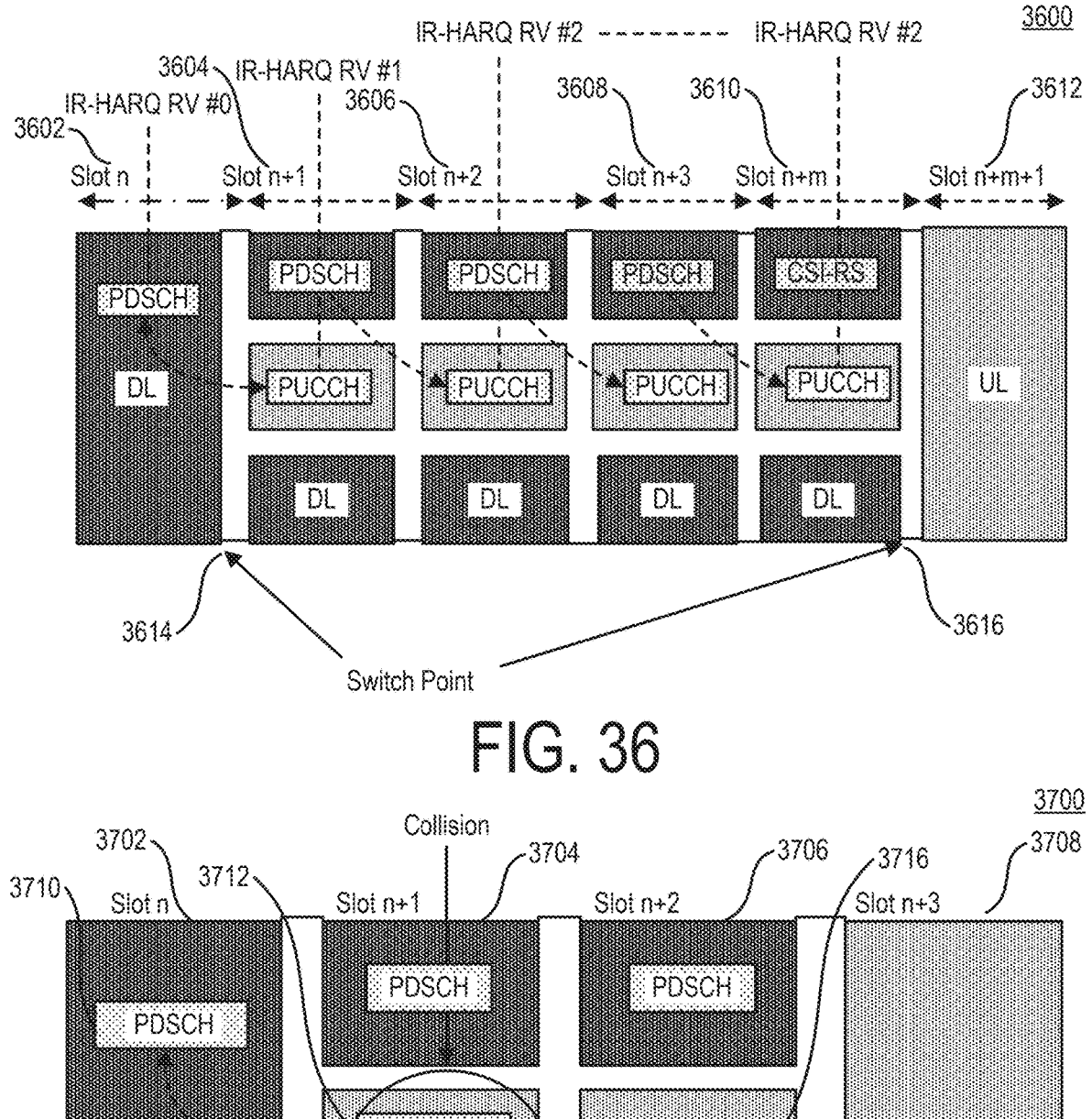
FIG. 36 shows an example of reduction of IR-HARQ RV DL/UL switch points.
FIG. 37 shows an example of a PUSCH+HARQ-ACK collision.

To reduce the occurrence of DL/UL switching points, which introduce delay, for an IR-HARQ process, it may be preferred that the retransmission of RV n+1 to RV n+m, where m is the maximum RV process count, may only consist of xFD subbands as shown in FIG. 36.

FIG. 36 shows an example 3600 of reduction of IR-HARQ RV DL/UL switch points. Specifically, in the example 3600, six slots 3602-3612 are shown, labeled slot n 3602 to slot n+m+1 3612. In the example, there may be a switch point 3614 from DL slot n 3602 to SBFD slot n+1 3601 and another switch point 3616 from SBFD slot n+m 3610 to slot n+m+1 3612.

HARQ-ACK Collision Handling. A HARQ-ACK may be carried on a PUCCH either in a non-xFD slot, or with a PUCCH in a Uplink Subband. If a PUSCH is scheduled for the UL xFD subband, a collision may occur as shown in slot n+1 of FIG. 37.

FIG. 37 shows an example 3700 of a PUSCH+HARQ-ACK collision. Specifically, FIG. 37 shows four slots, including slot n 3702 through slot n+3 3708. Slot n 3702 is dedicated to DL for which a PDSCH 3710 is received. In slot n+1 3704 a HARQ-ACK 3712 of PDSCH 3710 collides with PUSCH. In slot n+2, PUSCH and HARQ-ACK transmission 3716 may be provided in an UL sub band. Slot n+3 3708 may be dedicated to UL.

To mitigate the collision of a HARQ-ACK/NACK with other uplink services in a UL xFD subband, the UL transmissions can be piggybacked on a xFD PUSCH transmission. An example is shown in slot n+2 in FIG. 37. The piggyback of the HARQ-ACK/NACK may be scheduled using an indication in "TDD-UL-DL-ConfigCommon" which specifies a default behavior for the cell and/or BWP. A default behavior for a specific UE may also be determined by a schedule specified in "TDD-UL-DL-ConfigDedicated" which, if specified, takes precedence over any associated schedule that is defined in "TDD-UL-DL-ConfigCommon" for the BWP. The piggybacked HARQ-ACK/NACK may be scheduled for configuration 2 for a CG PUSCH, PUSCH repetitions, or a multi-PUSCH, or PUSCH TBoMS, specification by a single DCI message.

In the event that a PUSCH allocation is dynamically scheduled with repetition for a xFD uplink subband, if a HARQ-ACK/NACK is semi-statically scheduled in the same time/request resource, a dynamically scheduled allocation may always take precedence.

If a PRACH triggered by a PDCCH order collides with a PDCCH order for HARQ-ACK/NACK scheduled uplink transmission, the HARQ-ACK/NACK uplink transmission should be delayed to the next earliest uplink xFD subband that is available.

If a flexible symbol and/or slot conflicts with an earlier scheduled xFD transmission, the earlier scheduled xFD transmission may take precedence.

A previously configured xFD symbol, and/or slot, cannot be changed to another non-xFD, or xFD type definition for a particular session. Only a new system configuration by the AP can initially set the configuration type of symbols and/or slots.

For a cell-specific configuration of frequency locations of a uplink xFD subband, for each SCS configuration in a SCS-SpecificCarrierList for the uplink, the starting RB and bandwidth of the uplink xFD subband are indicated by an RIV-based indication.

For a cell-specific configuration of frequency locations of downlink xFD subband(s), for each SCS configuration in SCS-SpecificCarrierList for downlink, the starting RB and bandwidth of each downlink xFD subband are indicated by a RIV-based indication.

In the event that more than one BWP part is allocated, the protocol for collision resolution for one of the allocated BWPs, a primary BWP, should take precedence over the others. In this case the primary BWP should take precedence for the resolution of collision cases. It may be expected that an SSB may only be allocated to the primary BWP.

For RRC connected mode UEs, xFD subband time locations are configured within a period. At least when only one TDD-UL-DL pattern is configured, the period may be the same as TDD-UL-DL pattern period configured by "dl-ULTransmissionPeriodicity" in "TDD-UL-DL-ConfigCommon".

The period may also be an integer multiple of the TDD-UL-DL pattern period configured by "dl-ULTransmissionPeriodicity" in "TDD-UL-DL-ConfigCommon".

When two or more periods are available for use, the period defined for use by the primary BWP should take precedence.

A slot can consist of xFD symbols and non-xFD symbols. When only one TDD-UL-DL pattern is configured, the xFD symbols may be configured in a consecutive manner within a TDD-UL-DL pattern period. When two TDD-UL-DL patterns are configured and if xFD symbols are configured for only one of the patterns, the xFD symbols are configured in a consecutive manner within the TDD-UL-DL pattern period. In the event that both FD-URLLC and SBFD symbols are configured, the period for each should be set independently of the other; however, the configuration of the primary BWP still takes precedence.

xFD symbols can start in any symbol of the same type (e.g. SBFD, FD-URLLD, half duplex (HD)-FDD-xFD) within the slot and can end in any symbol of the same type.

A xFD symbol of any type cannot be allocated to a muted symbol and/or slot location.

Figure 38:
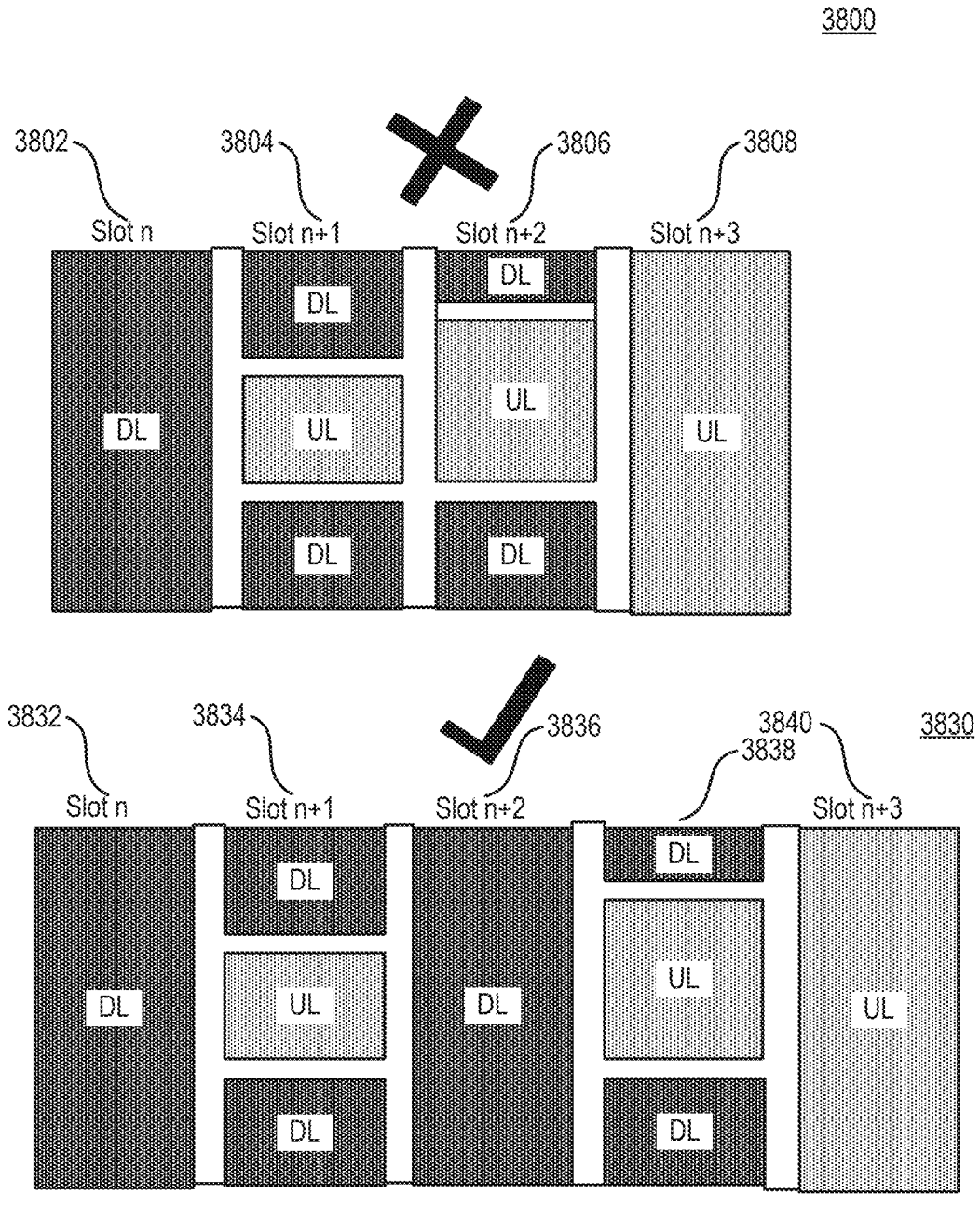
FIG. 38 shows alignment of xFD types that may follow one another.

FIG. 38 shows alignment of xFD types that may follow one another.

If two xFD type slots follow one another, the subband locations should be aligned; for example, scenario 3800 in FIG. 38 may not be allowed, while scenario 3830 in FIG. 38 may be allowed. Specifically, in the disallowed combination, SBFD slot 3804 is disallowed to precede SBFD slot 3806 because slot 3804 and slot 3806 have different UL frequency allocations absent a full UL or DL slot falling inbetween them. Instead, example 3800 demonstrates DL 3802 and UL 3808 slots bookending SBFD slots 3804, 3806. In example 3830, a full DL slot 3836 is included inbetween SBFD slots 3834 and 3838, thus those slots may be of varied frequency allocation. Slots 3832 and 3840 may be DL or UL slots.

Methods are provided for xFD Cross-Link Interference Management.

For 3GPP NR SBFD, the deployment is assumed at the gNB side, with the TDD UE in half-duplex mode. xFD operations on a time-domain resource may be limited to FDM in non-overlapping DL and UL subbands. An xFD symbol or slot can refer to any SBFD, FD-URLLC, HD-FDD-xFD, or non-xFD symbols and slots.

xFD enhancements assume operation within a single NR carrier in either FR1 or FR2-1. An xFD-aware UE operates within a designated pair of downlink (DL) and uplink (UL) bandwidth parts (BWPs) that have matched center frequencies. For an indication of the xFD subbands' frequency/time locations to SBFD-aware UEs during a legacy DL or F symbol/slot, it is assumed that one UL subband is designated as a reference subband operation within an xFD symbol and/or slot.

Configuration and Indication of Muting. Time-domain configuration and indication of muted UL symbol positions are required to facilitate the measurement of interference. For NR, two types of PUSCH repetition are defined: Type A and Type B. For Type A, the UE can transmit small PUSCH allocations in several repetitions without feedback scheduled by a UL grant or RRC in consecutive available slots, as shown in FIG. 1 of T.-K. Le, U. Salim and F. Kaltenberger, "An Overview of Physical Layer Design for Ultra-Reliable Low-Latency Communications in 3GPP Releases 15, 16, and 17," in IEEE Access, vol. 9, pp. 433-444, 2021, doi: 10.1109/ACCESS.2020.3046773, reproduced herein by way of reference in its entirety.

PUSCH repetition Type B was developed to eliminate time gaps among repetitions and ensure that the configured number of repetitions is available in the time constraint of the slot. The repetitions are scheduled in consecutive sub-slots, so one slot may contain more than one repetition of a particular transport block. Examples are shown in FIG. 2 of T.-K. Le, U. Salim and F. Kaltenberger, "An Overview of Physical Layer Design for Ultra-Reliable Low-Latency Communications in 3GPP Releases 15, 16, and 17," in IEEE Access, vol. 9, pp. 433-444, 2021, doi: 10.1109/AC-CESS.2020.3046773, reproduced herein by way of reference in its entirety.

PUSCH repetitions can straddle a slot boundary without interrupting the PUSCH time constraints. This allows the tight time constraints of URLLC transmissions to be met. The indication of the repetitions may be either semi-statically indicated in an RRC message and/or dynamically indicated in a DCI message and/or uplink grant. In 3GPP Release 17, the Type B repetitions are indicated in the Time Domain Resource Assignment table, which is jointly encoded with the start and length indication by an index in the table.

In 3GPP Release 18 the TDRA look-up table includes up to 16 rows and defines the slot offset ($K_2$), the PUSCH Mapping Type, the starting symbol(S), and the number of allocated symbols the length (L) for the time domain resource allocation. The current definitions for the TDRA tables are defined in 3GPP TS 38.214 V18.4.0 (2024-09), Sections 6.1.2, and 6.1.2.2, which is reproduced by way of reference in its entirety herein.

Enhancing the operation and procedures for the TDRA resource assignment table is required to facilitate UL resource muting. As noted, the TDRA table provides a time/frequency resource location of each of the (e.g. one or two) UL muting symbols. The UL muting symbols may be scheduled semi-statically or semi-persistently by the RRC, and/or dynamically signaled in SIB1 and/or a DCI.

Since the Configured Grant (CG) PUSCH repetition Type A is semi-statically configured, the indication of the UL muting symbols may also be semi-statically indicated, which may be provided by the RRC parameter repK. The time/period that the muting configuration is valid may be aligned with the period indicated in the UL grant; that is, the UL grant provides a sequence of time slots for which the configuration is valid, during which feedback is not expected. The period indicated for the UL muting symbols may align with this period.

Since the dynamic indication through a DCI message may include specific parameters such as repetition, there may be separate TDRA tables for semi-static and dynamic configurations. The parameters for a semi-static RRC configuration may include the following: K2—slot offset, L—length in symbols, P/S—Primary/Secondary, S—starting symbol, H—PUSCH hopping on/off.

During the UL grant configuration, it may be possible to dynamically indicate one or more locations that can turn UL symbol muting on or off using a TDRA field in a DCI. Although the CG PUSCH repetition Type A is semi-statically configured, there may be some flexibility in determining which symbol's muting can be turned on or off. Specifically, for a dynamic indication, Table 3 may be specified.

TABLE 3

| Dynamic Indication of Time Domain Resource Allocation | | | | | | | | |
|---|---|---|---|---|---|---|---|---|
| Row Index | PUSCH Mapping Type | $K_2$ | S | L | (P)rimary or (S)econdary | (H)opping | Number of Repetitions | Muting | Number of Slots |
| 1 | Type B | J | 0 | 14 | P | On | 0 | On | 2 |
| 2 | Type B | J | 0 | 12 | P | Off | 1 | Off | 2 |
| 3 | Type B | J + 1 | 2 | 14 | S | Off | 0 | Off | 1 |
| 4 | Type B | J + 1 | 2 | 12 | S | Off | 2 | Off | 1 |
| 5 | Type A | J | 0 | 6 | P | On | 0 | On | 1 |
| 6 | Type A | J | 0 | 7 | P | Off | 0 | On | 2 |
| 7 | Type A | J + 3 | 4 | 12 | S | Off | 0 | Off | 1 |

There are two PUSCH repetition types, Type A and Type B. The indication of the UL muting symbols may be different depending on the PUSCH repetition type. The TDRA table provides specific allocations for each.

In an alternative embodiment, the TDRA table for a dynamic indication may indicate the number of slots by repeating the K2, S, and L, parameters for each slot as shown in Table 4. In this case, UL PUSCH hopping may be semi-statically indicated by the RRC.

TABLE 4

| Dynamic Indication of Multi-Slot TDRA | | | | | | | | | |
|---|---|---|---|---|---|---|---|---|---|
| Row Index | PUSCH Mapping Type | $K_2$ | S | L | K2 | S | L | (H)opping | Number of Repetitions | Muting |
| 1 | Type B | J | 0 | 14 | J + 1 | 2 | 14 | On | 0 | On |
| 2 | Type B | J | 0 | 12 | J + 1 | 2 | 12 | Off | 1 | Off |
| 5 | Type A | J | 0 | 16 | J + 1 | 0 | 7 | On | 0 | On |

The configuration may also depend on the UL subband configuration. It may be possible to configure two UL subband locations, a primary and a secondary. In this case, the primary subband may indicate the UL muting symbols for both the primary and secondary UL subbands. Restrictions on the applicability of UL muting, for example, UL muting of Msg A PUSCH and Msg 3 PUSCH, may only apply to the primary UL subband(s). In the event PUSCH UL subband hopping is used, a specific configuration for hopping of the UL PUSCH symbols may be needed.

A possible Element ID (EI) for the semi-static indication of UL muting symbols in the RRC may be as shown in the following PUSCH-ULMuitngResources IE.

PUSCH-ULMutingResources::=SEQUENCE {
    symbolPos SEQUENCE (SIZE(1 . . . maxNrOfULMutingSymbols)) OF INTEGER(0 . . . 13) OPTIONAL,
    combOffset ENUMERATED {0, 1, TBD} OPTIONAL, dynamicBitmap ENUMERATED {0,1,1,1, . . . }-Bit-
map of symbols that may be dynamically muted on
or off
maxNrOfULMutingSymbols INTEGER::=TBD (2),—
Maximum number of UL muting symbols for
PUSCH within a slot
Subband-ID INTEGER::=TBD (0,1, TBD)
OPTIONAL,—Primary, Secondary indication
}

A dynamic indication of UL muting symbols may apply
to a Dynamic Grant (DG) PUSCH repetition Type B. A
dynamic indication of the UL muting symbols using Table 3
and/or Table 4 may be a part of a DCI message in the
preceding PDCCH control channel. A dedicated DCI mes-
sage for muting UL subband symbols may also be used. A
possible representation of this is shown in FIG. 39.

Figure 39:
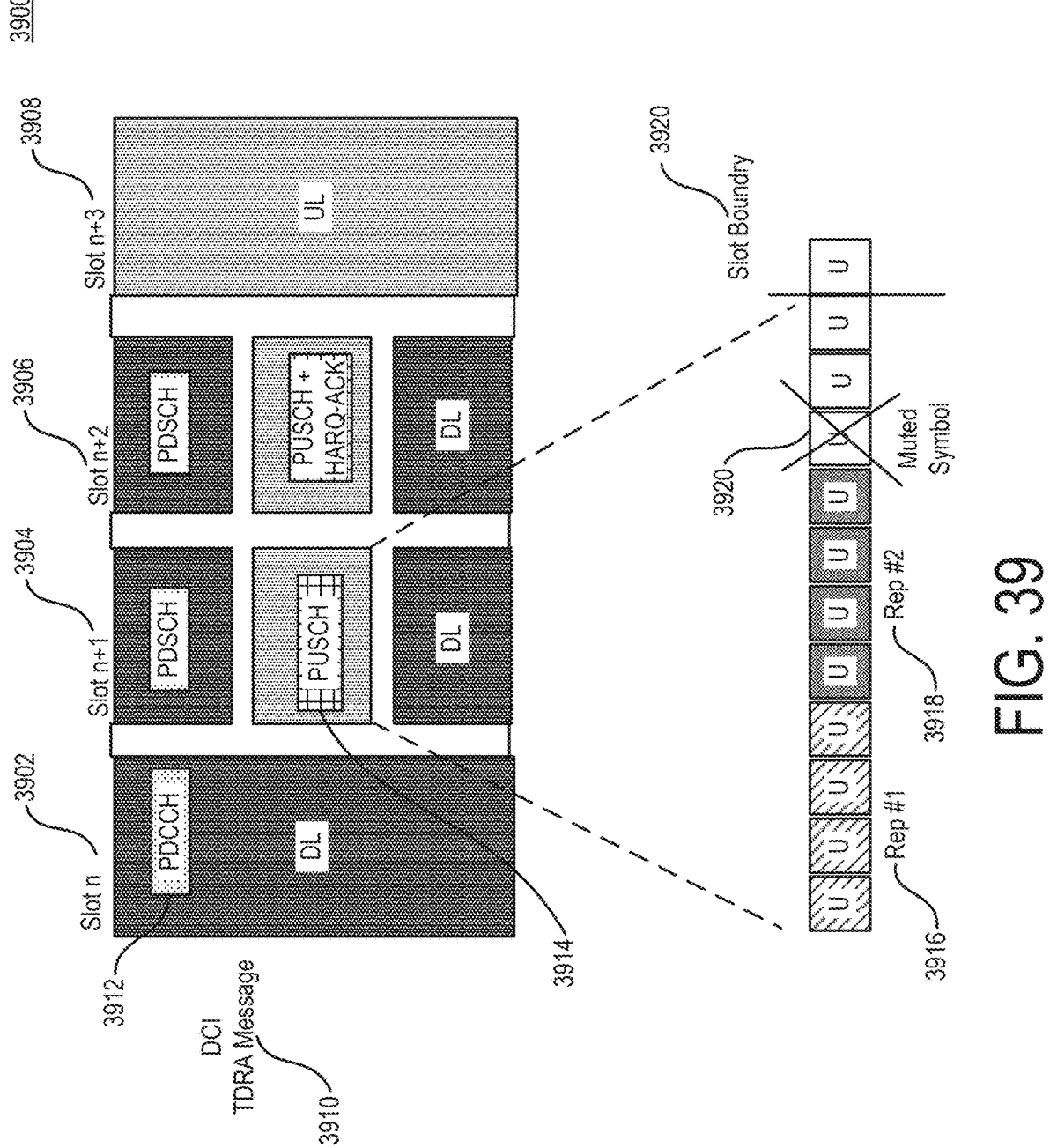
FIG. 39 shows an example of a PDCCH DCI message for UL muting symbols.

FIG. 39 shows an example 3900 of a PDCCH DCI
message for UL muting symbols. In the example 3900, a
DCI message 3910 is provided in slot n 3902 in a PDCCH
region 3912. In slot n+1 3904 an UL portion comprises
PUSCH 3914 scheduled by the DCI 3910. The DCI 3910
indicates symbols used for a first repletion 3916 and sym-
bols used for a second repetition 3918. One or more muted
symbol(s) 3918 may or may not be indicated. After a slot
boundary 3920 of slot n+1 2904, slot n+2 3906 and slot n+3
3908 may follow.

As noted, the dynamic indication may be included in a
TDRA table and/or may indicate one or more slots for which
it may be applicable. It may also have special criteria for
symbols that are adjacent to a slot boundary or the non-
xFD/xFD slot boundary.

A UL muting pattern may also be configured separately
for Type 1 CG PUSCH, Type 2 CG PUSCH, and/or DG
PUSCH.

The UL grant may explicitly indicate whether semi-static
and/or dynamic UL muting symbols are supported or
enabled. This indication may also be made in the rrc-
ConfiguredUplinkGrant.

Figure 40:
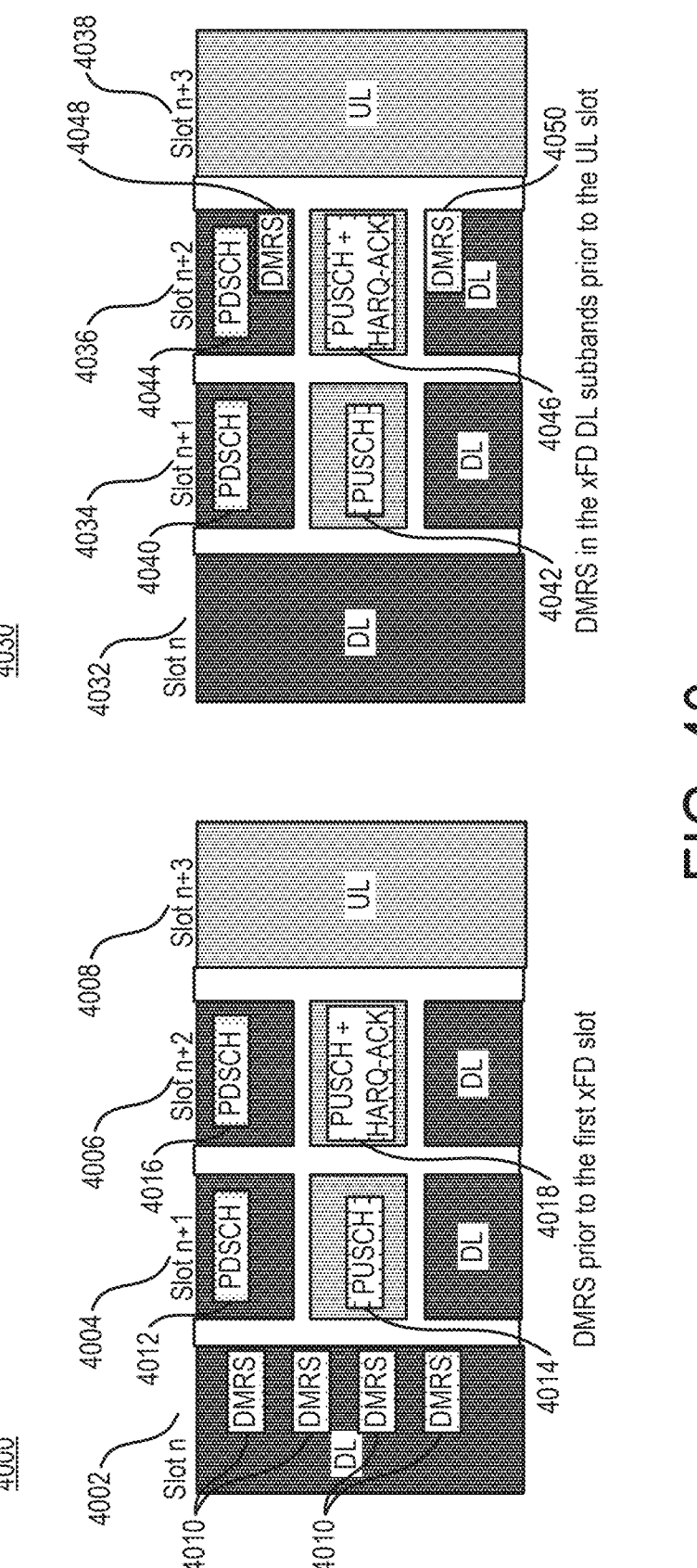
FIG. 40 shows examples of locations of DMRS's for xFD operation.

FIG. 40 shows examples 4000, 4030 of locations of
DMRS's for xFD Operation.

A zero power (ZP) SRS and/or ZP-DMRS reference
symbol location may be used for the UL muting symbol in
another embodiment. The preferred location for a DMRS is
the boundary of the downlink slot and uplink slot, as shown
in the example on the left 4000; it may also be included in
the DL subbands of the downlink subbands either in the last
slot or adjacent to the last non-xFD slot as shown in the
example on the right 4030. The CSI-RS and/or SRS may use
a similar location.

Specifically, in the example 4000 demonstrating DMRS
in a non-xFD slot, four slots 4002-4008 are shown. In the
first non-xFD slot 4002, DMRS 4010 are located. In the next
FD slot 4004, PDSCH 4012 and PUSCH 4014 are included.
In slot 4006, PDSCH 4016 and PUSCH+HARQ-ACK 4018
are included. The last UL slot 4008 may be used for similar
or other purposes.

In the example 4030 demonstrating DMRS in xFD slots,
a first slot 4032 may be a DL slot, a next slot 4034 may
include PDSCH 4040 and PUSCH 4042, a next slot 4036
may include PDSCH 4044 and PUSCH+HARQ-ACK 4046.
Slot 4036 may also include DMRS 4048, 4050.

The DMRS, CSI-RS, PT-RS, or a similar reference sym-
bol may implicitly indicate the presence of an uplink sub-
band and/or uplink slot that follows it.

UL resource muting for a multi-PUSCH scheduled by a
single DCI may apply in the same configuration for all the
scheduled PUSCH transmissions. This may only apply to
xFD symbols and/or slots.

If a UL resource muting symbol overlaps with a symbol
containing a PT-RS, the PT-RS shall take precedence over
the insertion of a UL muting symbol.

To support the multiplexing of FD-URLLC transmissions
in an xFD slot configuration, a design is required to support
the mitigation of cross-link interference. Two methods are
available in 3GPP Release 18 for scheduling a URLLC data
transmission: preemptive and non-preemptive scheduling.
Preemptive scheduling is facilitated by a preemption/punc-
tured allocation (PI) IE carried in the PDCCH DCI of the
preceding slot.

Figure 41:
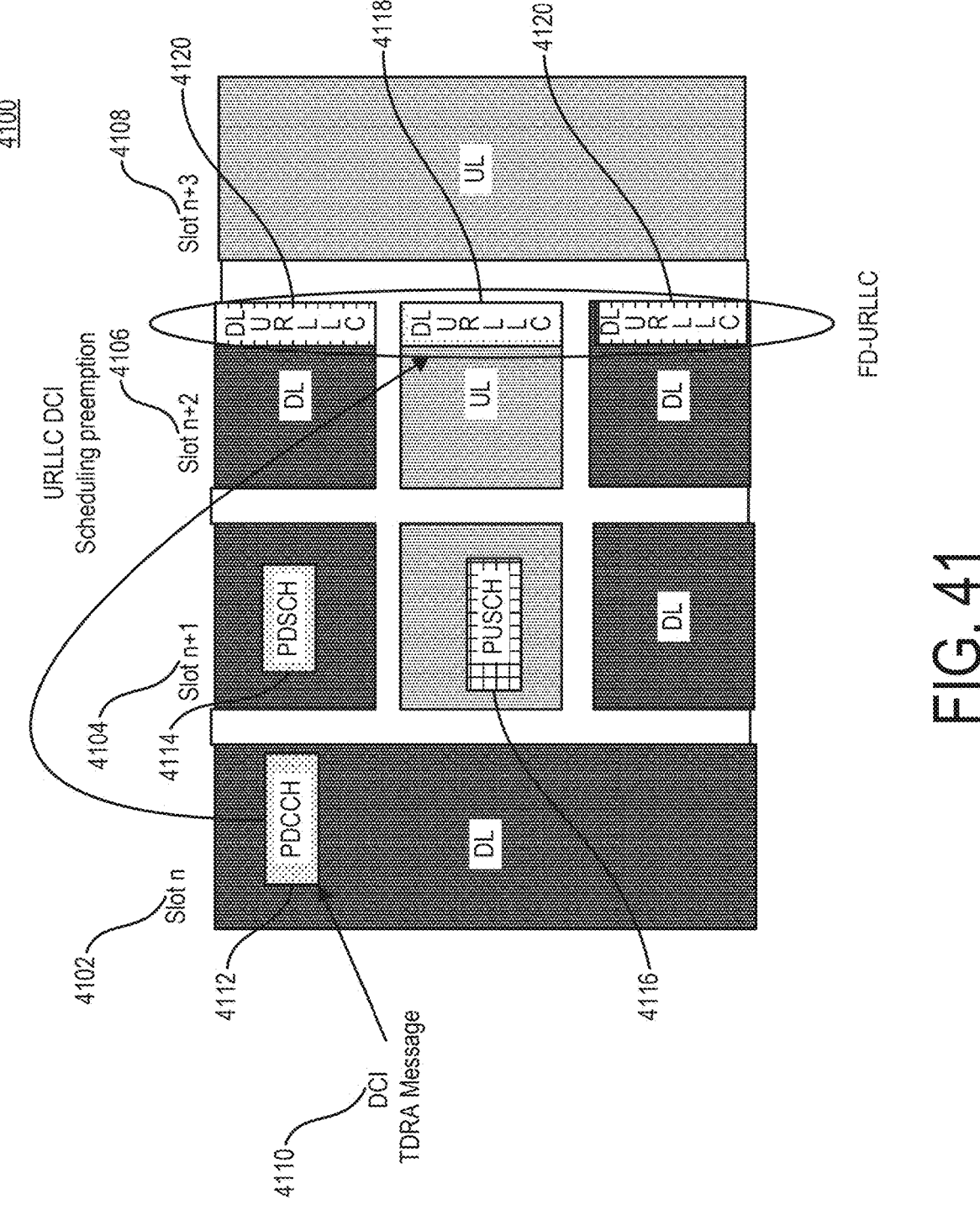
FIG. 41 shows FD-URLLC scheduling preemption.

FIG. 41 shows this embodiment for FD-URLLC, where
the preceding PDCCH carries a PI IE in a DCI message. The
preemption indication may also be carried in a UL Grant that
schedules the FD-URLLC resource(s); in this case, it may be
a semi-static schedule indicated in an RRC message.

FIG. 41 shows FD-URLLC scheduling preemption 4100.
Specifically, a DCI TDRA message 4110 may be included in
a PDCCH 4112 of a DL slot 4102. The next slot 4104 may
have PDSCH 4114 and PUSCH 4116, the next slot 4106
may be used for UL URLLC 4118 based on the DCI 4110
and/or slot 4106 may comprise DL URLLC 4120. The next
slot 4108 may be dedicated to UL.

Figure 42:
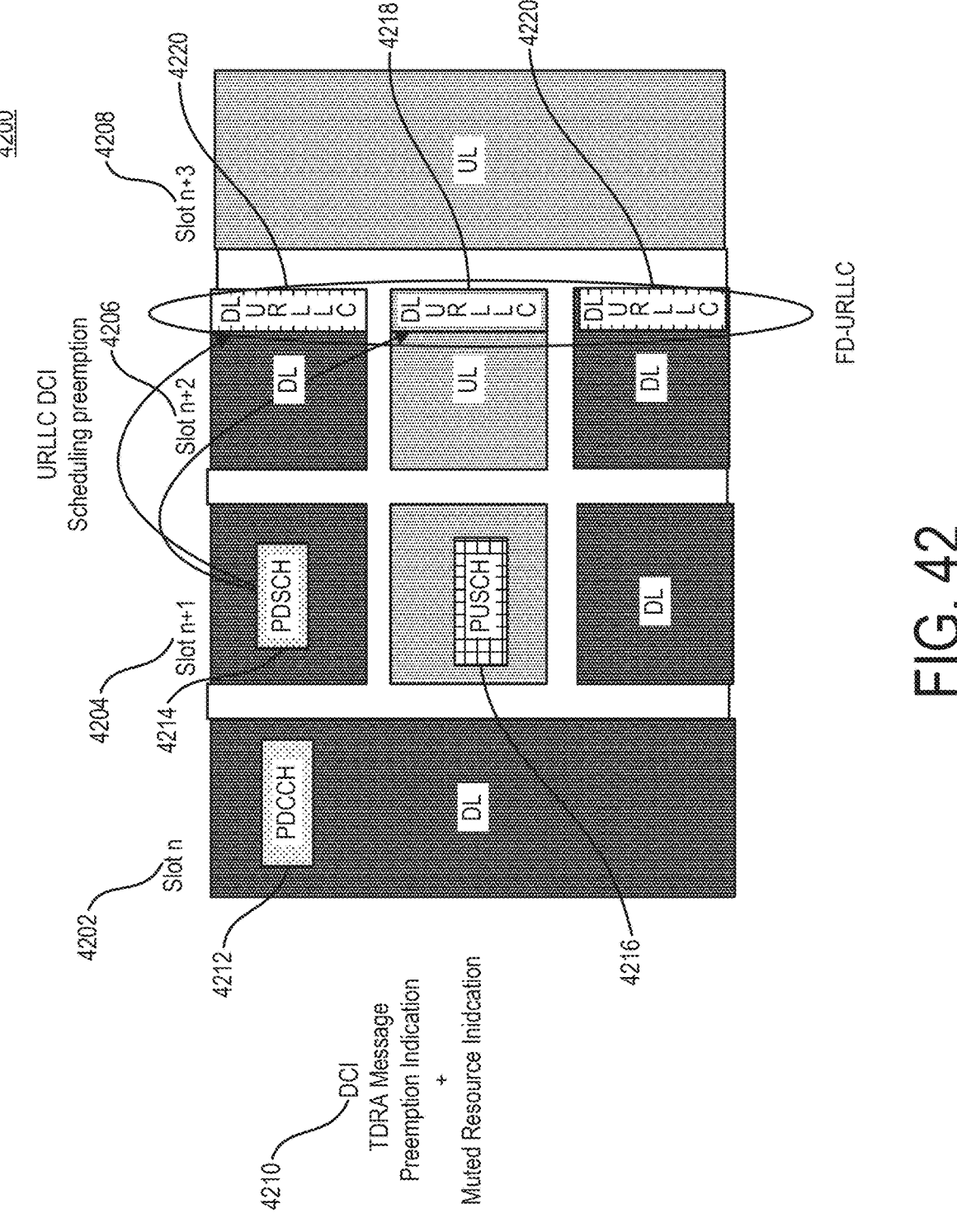
FIG. 42 shows an example of FD-URLLC subband scheduling preemption.

The preemption indication may also be on a subband basis
where a preemption may be indicated in a DL subband in
slot n+1 for a FD-URLLC in slot n+2, as shown in another
example 4200 in FIG. 42.

FIG. 42 shows an example 4200 of FD-URLLC Subband
Scheduling Preemption. In example 4200, a DCI 4210
includes a TDRA message preemption indication and a
muted resource indication. A first slot, slot n 4202, carries
PDCCH 4212. The next slot, slot n+1 4204 includes PDSCH
4214 and PUSCH 4216. The PDSCH 4214 is used to
indicate DL URLLC resources 4220 and UL URLLC
resources 4218. The DCI 4210 may include a muted
resource indication.

When one considers xFD Cross-Link Interference Man-
agement, where a UL resource muting may have been
previously scheduled, the dynamic preemption PI may have
to consider this issue. In an embodiment, the indication of UL
resource muting and the preemption PI may be combined in
the TDRA table in a DCI message. In this case, the UL
resource muting may be scheduled within the same slot as
the FD-URLLC resources but prior to their occurrence, as
shown in FIG. 43.

Figure 43:
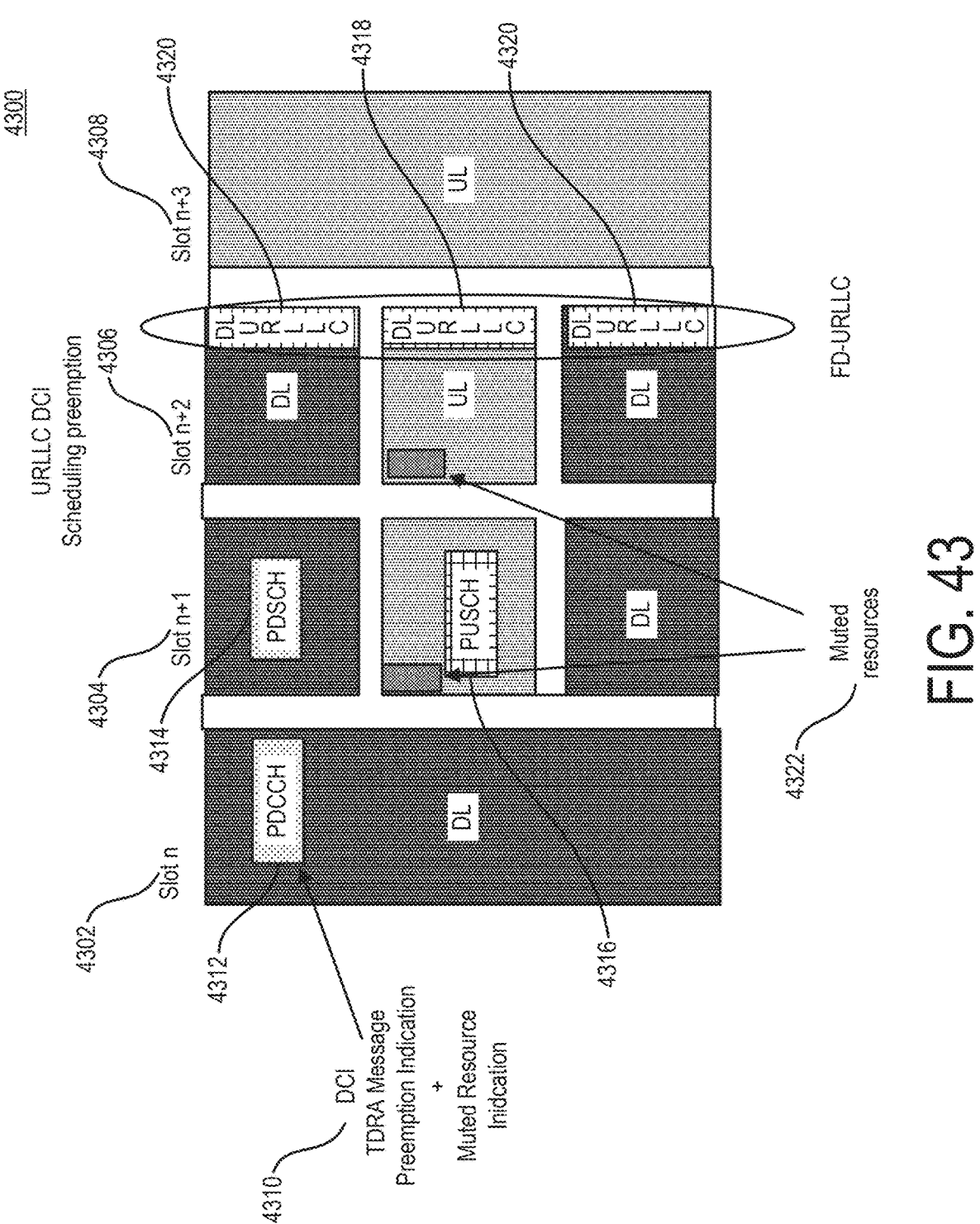
FIG. 43 shows muted resources prior to FD-URLLC preemption.

FIG. 43 shows muted resources prior to FD-URLLC
preemption. In example 4300, a DCI 4310 includes a TDRA
message preemption indication and a muted resource indi-
cation. A first slot, slot n 4302, carries PDCCH 4312. The
next slot, slot n+1 4304 includes PDSCH 4314 and PUSCH
4316. The PDSCH 4314 is used to indicate DL URLLC
resources 4320 and UL URLLC resources 4318. The DCI
4310 may include a muted resource indication. For instance,
the DCI 4310 may indicate muted resources 4322.

The scheduling of an FD-URLLC resource should con-
sider the presence of a previously allocated UL muting
symbol. When scheduling the FD-URLLC resource(s) the
UL Grant may refer to the TDRA allocation table and
allocate the resource on resources that are not muted. In an
alternative embodiment, the FD-URLLC resources may take
override the muting symbols.

gNB-gNB Information Exchange and Cross-Link Interference Mitigation. The exchange of inter-gNB channel link interference (CLI) information from the aggressor gNB to the victim gNB is necessary to improve CLI handling.

Figure 44:
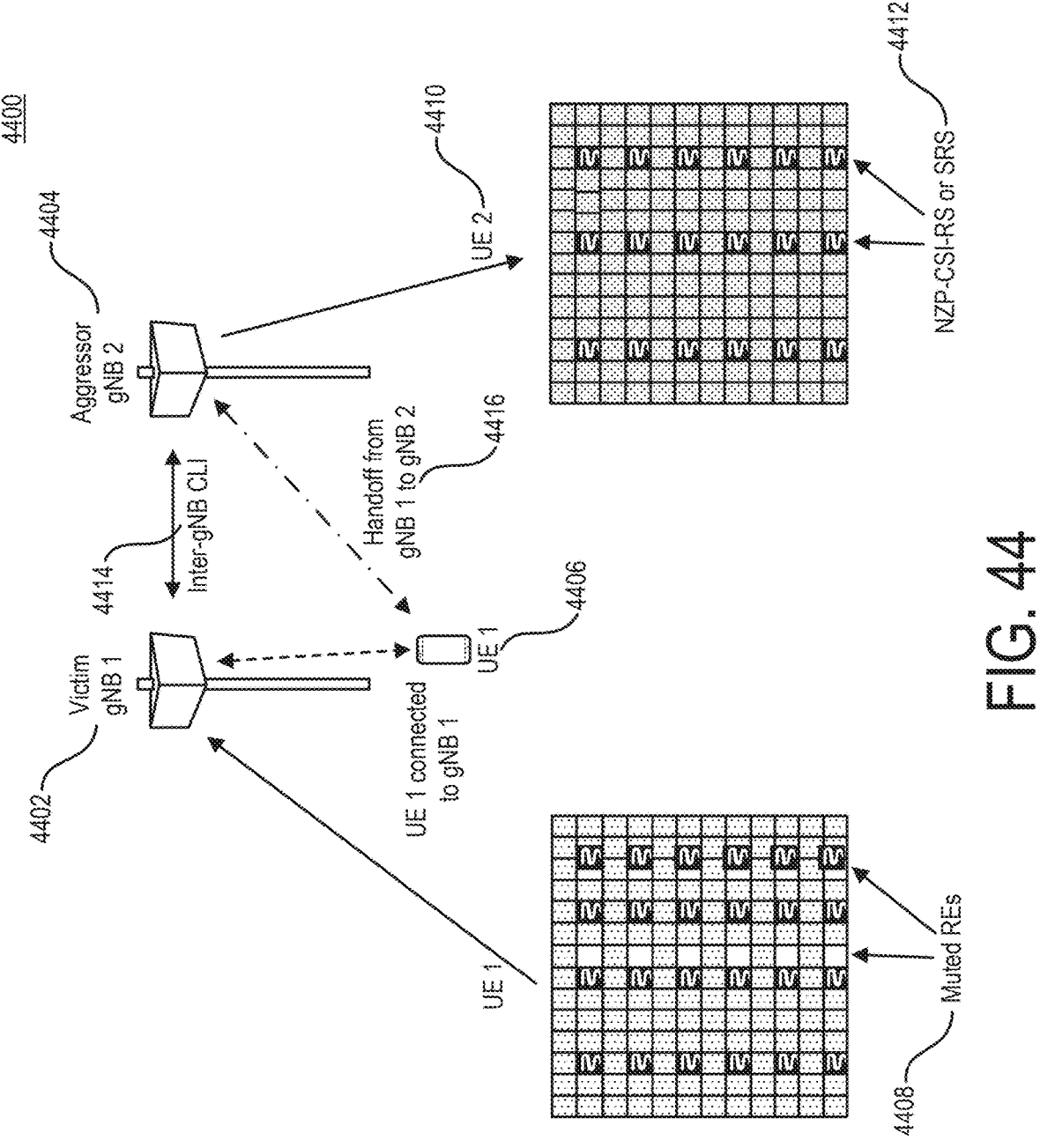
FIG. 44 shows a gNB-gNB CLI information exchange.

FIG. 44 shows a gNB-gNB CLI Information Exchange. A victim gNB 4402 and aggressor gNB 4404 may be in range of one another. A first UE 4406 may be connected to victim gNB 4402 and a second UE 4410 may be connected to aggressor gNB 4404. The victim gNB may mute REs 4408 which coincide with NZP-CSI-RS or SRS 4412 4412. Because the victim gNB experiences inter-gNB CLI 4414 there may be communication among the gNBs as to which resources to mute or transmit on. Muting may refer to no transmission or significantly reduced transmission. The UE may perform a handoff 4416 from victim gNB 4402 to aggressor gNB 4404 based on signaling received from either base station regarding the CLI or otherwise.

The victim's non-xFD and xFD frequency and time resources may be nulled to facilitate this information exchange, as shown in FIG. 44.

Parameters that may be exchanged include: Semi-static cell-specific xFD time and frequency location configuration; Measurement resource configuration, i.e., SSB and/or periodic NZP CSI-RS; Strongest DL beam information; CLI-mitigation request; and/or TDD and xFD configuration.

FIG. 45 shows Inter-Subband, Intra-Subband Co-Channel Interference. Sources of interference include inter-subband and intra-subband cross-link interference, as shown in FIG. 45. Specifically, aggressor xFD resources 4500 may interfere with victim xFD resources 440. Of the four slots 4502-4508 of victim xFD resources 4508, slot n+2 4506 experiences interference from UL portion of slot n+1 4534 of aggressor xFD resources 4530. Victim slot n+2 4506 experiences interference in the DL portion from the DL portion of slot n+1 4534. Aggressor slot 4532 and slot n+2 4536 may or may not cause interference. Slot n+2 4506 and n+3 4508 may interfere in the DL only, for example, for the reason that the slots are near in time.

To facilitate gNB-gNB CLI mitigation, the preferred approach is to use periodic NZP-CSI-RS reference signal measurements. Since a gNB may utilize MIMO and beamforming, a multi-port (e.g., 32, 64, 128 port) NZP-CSI-RS enables an aggressor gNB to estimate the channel to a victim gNB, thereby allowing Tx beam nulling toward the victim gNB. The configuration info for a set of one or more periodic multi-port NZP-CSI-RS resources is defined by the relevant IE in 38.331 which is NZP-CSI-RS-Resource. The configuration of the mobility CSI-RS(s) is exchanged between a pair of gNBs through the "Measurement Timing Configuration" field of the IE "Served Cell Information NR" within messages such as the XN SETUP REQUEST and XN SETUP RESPONSE (see Xn Setup procedure in Section 8.4.1 of TS 38.423).

In a similar approach, mobility CSI-RS resources may enable an aggressor gNB to estimate the channel to a victim gNB. It should be noted that CSI-RS-CellMobility is defined within the IE CSI-RS-ResourceConfigMobility of TS 38.331. This specification defines the CSI-RS configurations, including a CSI-RS index, measurement frequency locations within the carrier (start PRB, number of PRBs), density (REs/PRB), symbol locations within a slot, a period (in a number of slots), and a slot offset.

There are several potential issues with the exchange of NZP-CSI-RS and/or CSI_RS information and also the TDD configuration information. These issues notwithstanding, it is understood that the gNB-gNB exchange of information assumes that both the aggressor gNB and the victim gNB share the same measurement frequency locations within BWP's and the BWP's use the same resource configuration.

For cases where UL muting of PUSCH xFD symbols occurs, the muting patterns of the aggressor gNB and the victim gNB may differ. Additionally, it is understood that the presence of UL muting of PUSCH symbols may be accompanied by power boosting when PTRS and/or CSI-RS symbols are present.

To enable the benefit of sharing gNB-gNB CLI, several requirements are necessary. A few of these requirements and potential solutions are described herein.

Information sharing for gNB-gNB CLI may be semi-static, semi-persistent, and/or periodic. A victim gNB may initiate the schedule with one or more aggressor gNB(s). A UE may also request the victim gNB to which it is associated to initiate a gNB-gNB CLI one-time and/or periodic exchange.

While the muting pattern can be shared, differences in the power spectral density between the victim gNB and the aggressor gNB may lead to a deterioration in interference mitigation performance. One way to address this issue is by sharing the power spectral density of the BWP UL subband(s).

If the muting patterns differ, the index of a specific symbol resource location may also be shared. Since the muted UL PUSCH symbols should preferably align with the aggressor's gNB-gNB CLI reference signal(s), it is required that the muted UL PUSCH symbols consistently align with this reference signal. However, in the case of beamforming and/or MIMO, the alignment of the aggressor's gNB-gNB CLI reference signal(s) should correspond with the multi-port definition (e.g., 32, 64, 128 ports).

In the case of beamforming and/or MIMO, if the aggressor's gNB and the victim's gNB port definitions differ, aligning their multi-port definitions may not be feasible. In this situation, an omni-based reference signal that is consistently available may be preferable, such as the CD/NCD-SSB and/or RACH. Alternatively, a new omni-based reference signal may be explicitly defined for gNB-gNB CLI information exchange.

For a unique gNB-gNB CLI reference signal, its definition and location may be signaled by the RRC using an El such as cli-ResourceFor-gNB-gNB-LInkInterference.

The exchange of information on the strongest beam from the victim's gNB to the aggressor's gNB may not be sufficient for optimal mitigation of interference. This is particularly true in the case of locally present Doppler spread. It may be preferable to exchange information on the strongest, next strongest, and perhaps several of the strongest beams (e.g., ports). The aggressor may then coordinate with the victim gNB on which port(s) to use for the anticipation of the next occurrence(s) of interference (e.g., the anticipated next UL PUSCH subband slot).

gNB-gNB FD-URLLC Cross-Link Interference.

Figure 46:
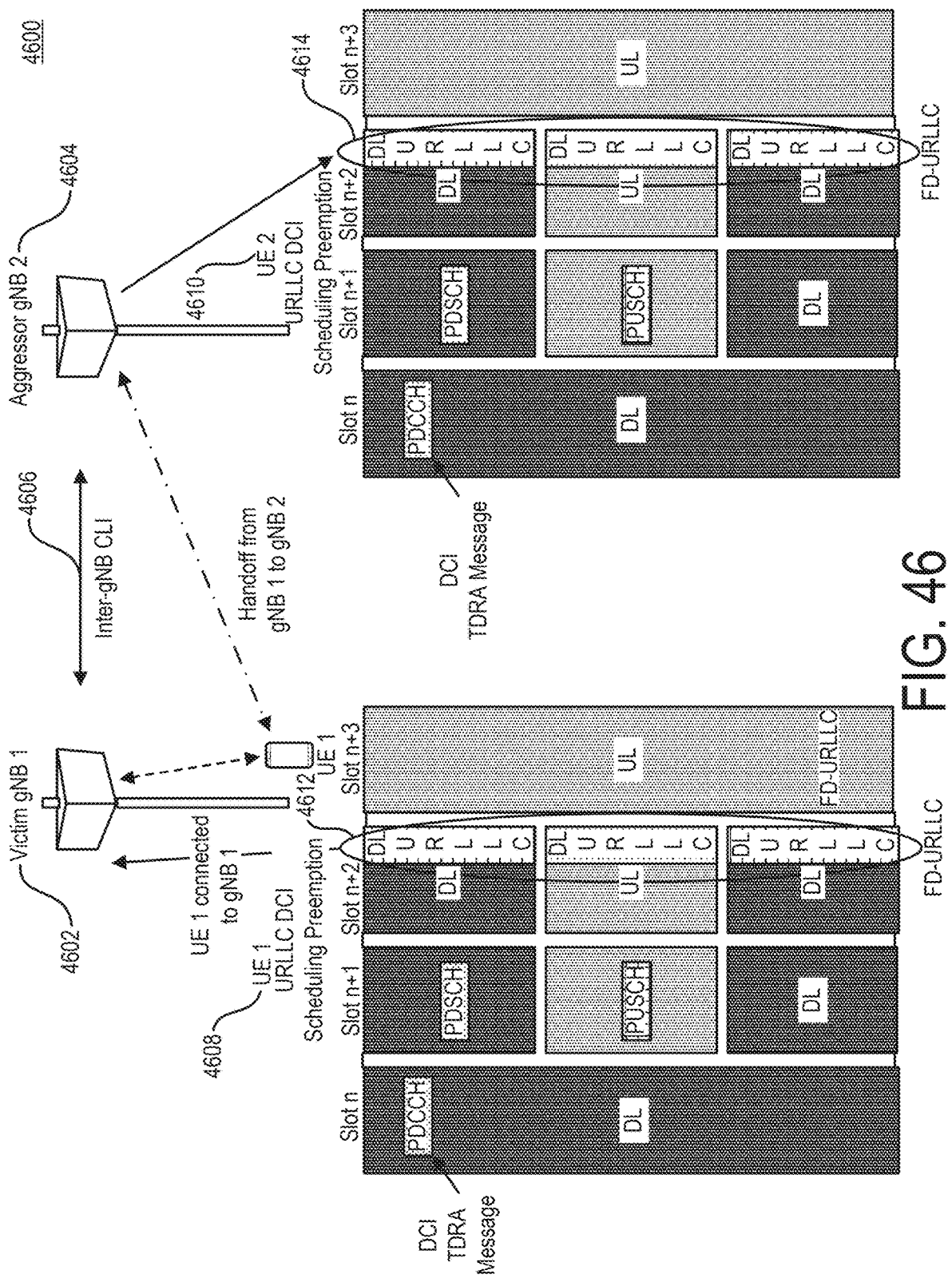
FIG. 46 shows an example of gNB-gNB FD-URLLC cross link interference.

The scheduling of FD-URLLC resources introduces its own CLI issues. An example is shown in FIG. 46 where the FD-URLLC resources for UE1 in Cell 1 and UE 2 in Cell 2 overlap with one another. Since URLLC communication necessitates high reliability and low-latency communications, the characteristics of the wireless channel become potentially more severe.

Specifically, FIG. 46 shows an example 4600 of gNB-gNB FD-URLLC Cross Link Interference. A victim gNB 4602 may experience inter-gNB CLI 4606 from an aggressor gNB 4604. A first UE 4608 may have URLLC resources

4612 scheduled in an overlapping region with URLLC resources 4614 of a second UE 4610. In this case, UE1 may be victimized.

A simple solution is to schedule the FD-URLLC resources at different times for the two UEs. Although this would work, in the case of a high load, it may become more difficult to find suitable resources for this to be possible. In another embodiment, the exchange of gNB-gNB CLI information may take place prior to the allocation of the FD-URLLC resources. However the allocation of UL muting symbols would need to take into account the eventual location of the FD-URLLC resources; specifically, it would be preferable that the UL muting symbol locations be close to or the same as the eventual FD-URLLC resource locations. A possible solution is to reserve some resource locations in the TDRA table for the possible location of FD-URLLC resources. Using this, the reservation of UL muting symbols can account for the mitigation of CLI for the FD-URLLC resources.

Timing Misalignment

To accurately measure the interference covariance matrix, a CLI-RS or another reference signal should be obtained from the aggressor gNB. However, due to the physical distance between the victim gNB and the aggressor gNB, the propagation delay may lead to a timing misalignment in which the delay exceeds the cyclic prefix (CP). An example of this is shown in FIG. 47.

Figure 47:
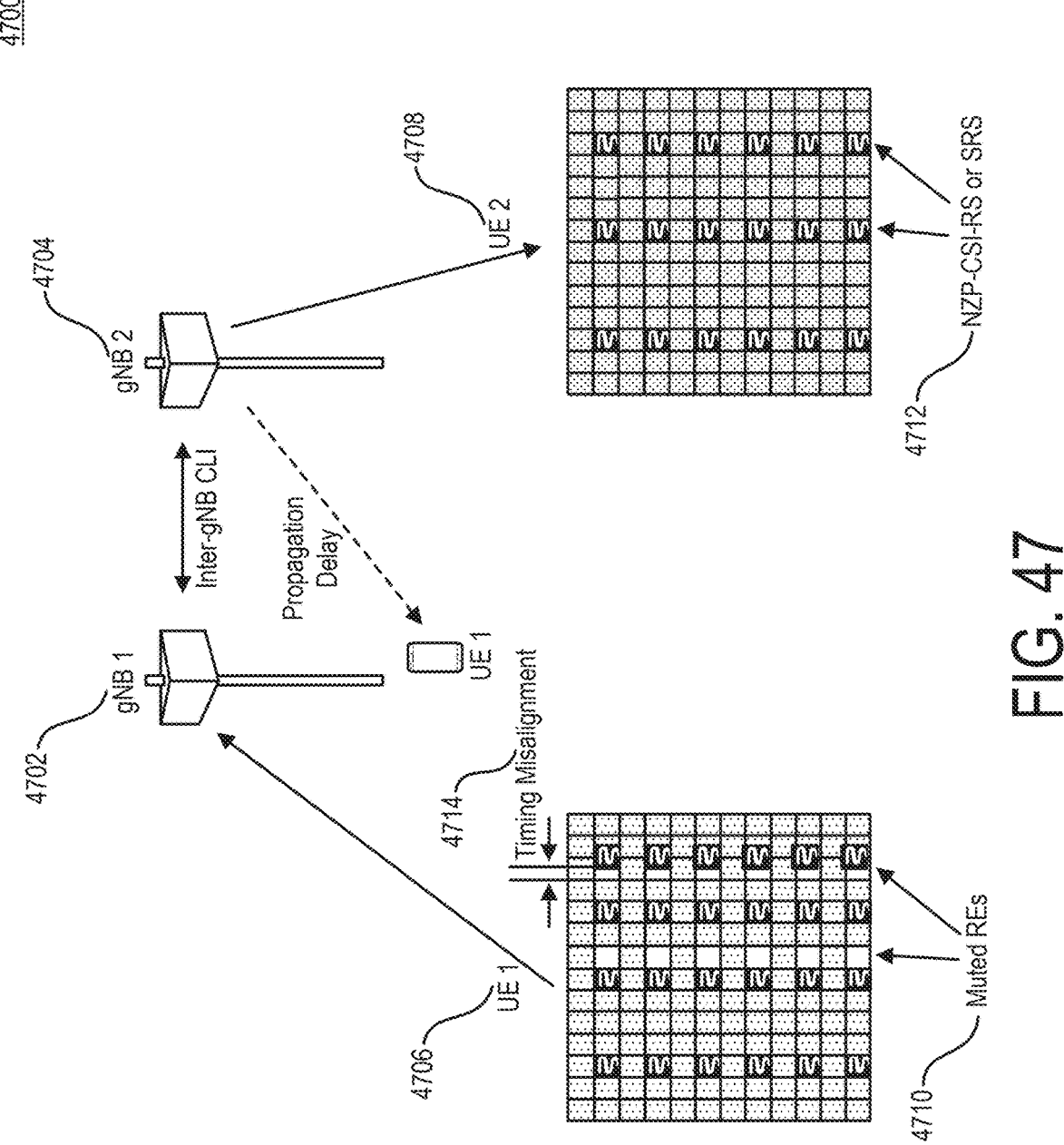
FIG. 47 shows an example of a misalignment due to propagation delay.

FIG. 47 shows an example 4700 of a misalignment due to propagation delay. In the example 4700, a first gNB 4702 may experience CLI from an aggressor gNB 4704. A first UE 4706 may mute REs 4710 to allow NZP-CSI-RS or SRS transmission 4712 of a second UE 4708. There may be a timing misalignment 4714 experienced that should be corrected for due to a propagation delay between the aggressor gNB 4704 and the first UE 4706.

In a non-xFD TDD system, a UE is provided with a timing advance offset NTA, offset for the serving cell. It is used to reserve enough time for the uplink to downlink switching in the gNB (as well as for the UE). Downlink to uplink switching is additionally considered by the requirement for a guard period, as for example the gap portions shown. In xFD slots, timing advance offset misalignment results in inter-slot interference between the uplink subband and downlink slots.

Figure 48:
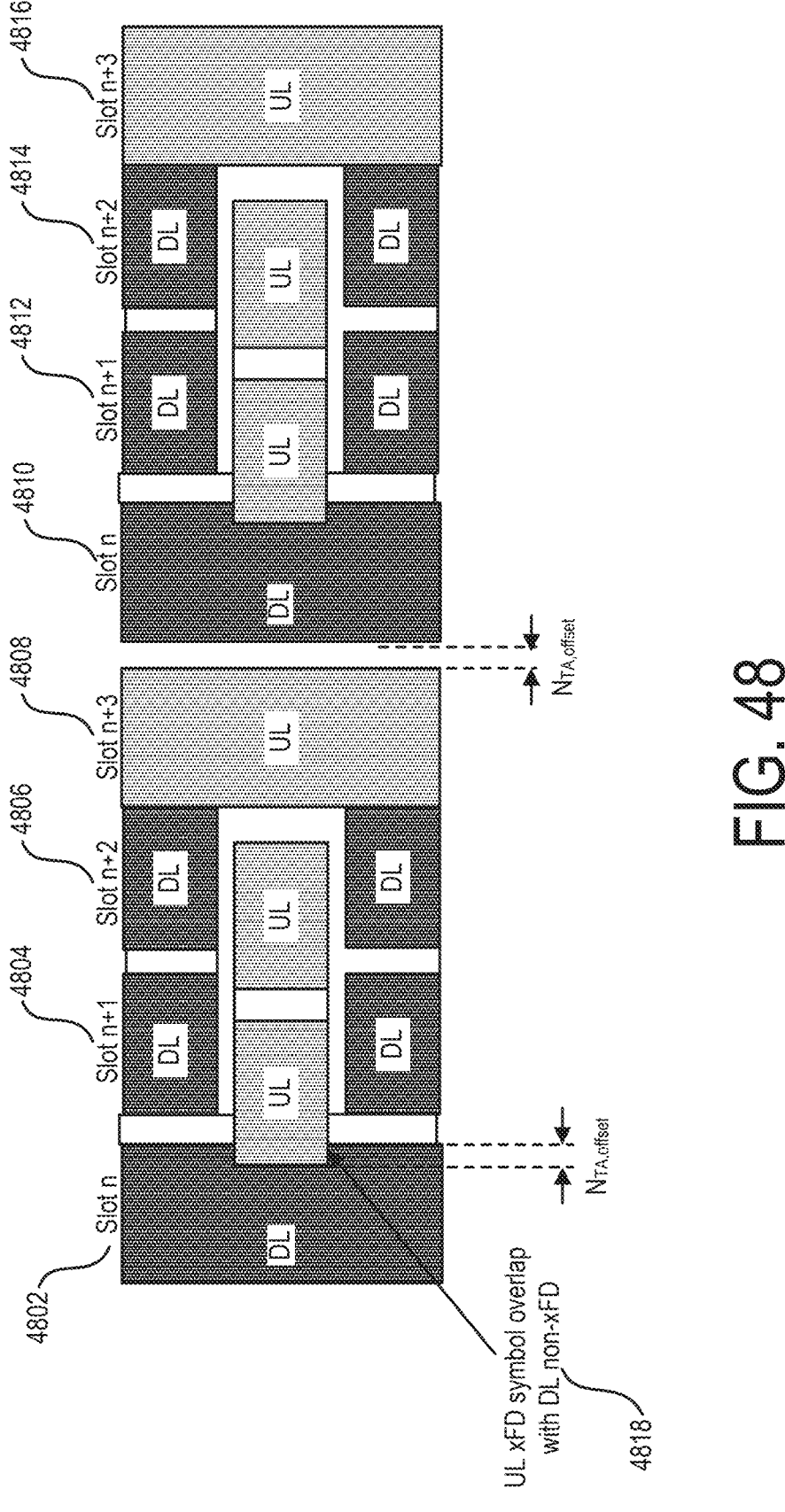
FIG. 48 shows an example of xFD slot timing offset misalignment.

FIG. 48 shows an example 4800 of xFD Slot Timing Offset Misalignment. For instance, slots 4802-4816 include DL skits 4802, 4810, xFD slots 4804-4806, 4812-4814 and UL slots 4808, 4816. There may be an UL xFD symbol overlap 4818 between DL slot 4802 and xFD slot 4804.

A method that allows the timing offset to be measured at the time of the CLI measurement and corrected. The slot timing may address this requirement, but as noted, it can vary.

Figure 49:
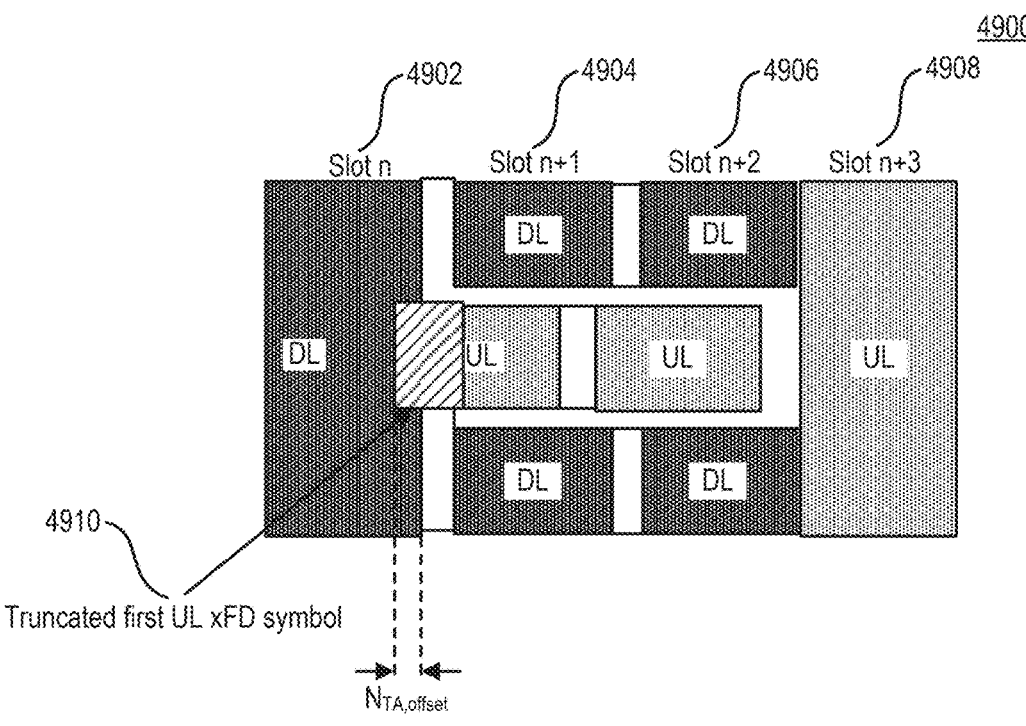
FIG. 49 shows a truncated first UL xFD subband example.

An embodiment to address the timing misalignment may be to introduce a guard period only in the first xFD UL subband such that the UL subband does not interfere with the preceding non-xFD slot as shown in FIG. 49.

FIG. 49 shows a Truncated First UL xFD Subband example 4900. In the example 4900, slots 4902-4908 include DL 4902, xFD 4904-4906 and UL 908. The DL slot 4902 may overlap with slot 4904 and therefore UL portion of slot 4904 may have truncated first UL xFD symbol 4910. A base station may provide signaling to adjust this truncation time/frequency.

The number of symbols that would need to be truncated would depend on several factors, including the timing offset, SCS, center frequency, and BWP bandwidth. This may be semi-statically indicated using a RRC message. Alternatively, the first non-xFD DL slot may be shortened by an equivalent amount. This may be preferable since the impact on the resource schedule for the xFD slots is reduced. However, with both of these solutions, the intra-subband DL-UL interference may be exaggerated.

Figure 50:
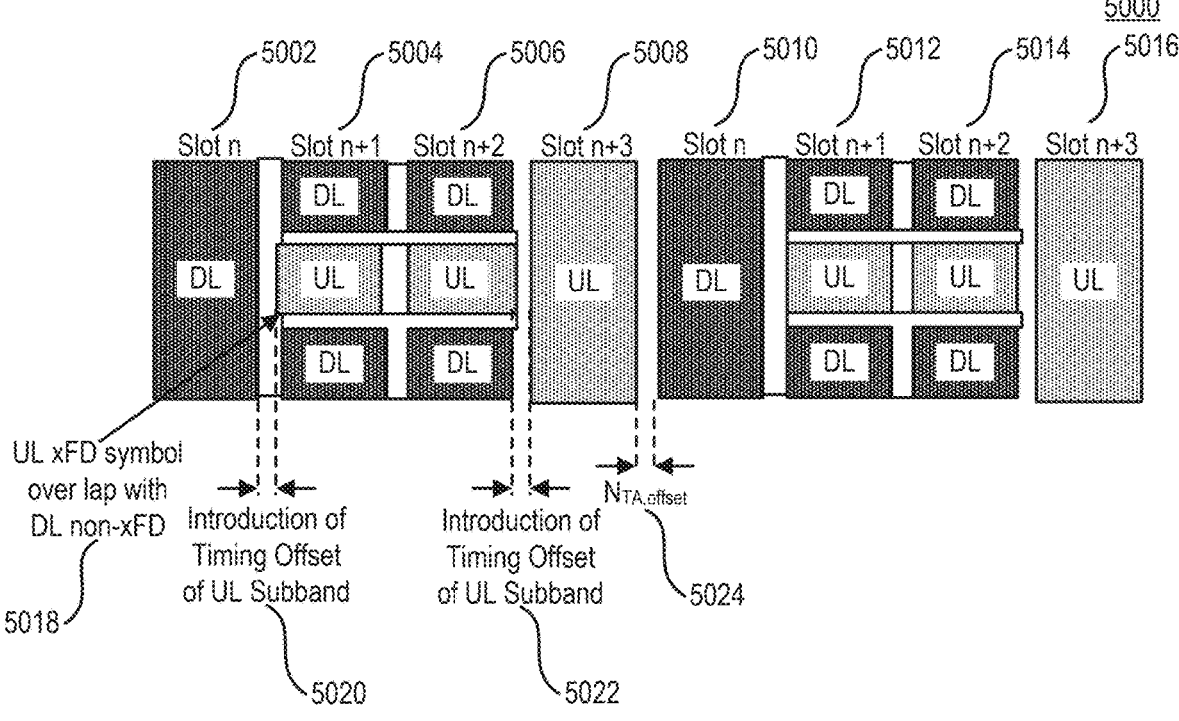
FIG. 50 shows the introduction of a timing offset to UL xFD subband and following UL non-xFD slot.

Another embodiment may introduce a timing offset specifically for the UL xFD subband. This may be enabled by also introducing a timing offset to the non-xFD UL slot that follows the xFD subbands as shown in FIG. 50. In this case, two timing offset RRC messages, one for each of the non-xFD and xFD slots, may be required.

FIG. 50 shows the introduction 5000 of a timing offset to UL xFD subband and following UL non-xFD slot. Specifically, slots 5002, 5010 are DL slots, slots 5004, 5006, 5012, 5014 are xFD slots and slots 5008, 5016 are UL slots. Slots 5002, 5004 may have an UL xFD symbol overlap 5018 and a timing offset 5020 may be introduced on the UL subband. Similarly, a timing offset 5022 may be introduced on the uplink subband between slots 5006, 5008. An offset 5024 may be used between UL slot 5008 and DL slot 5010.

In an embodiment, beam management may be used to address timing offset issues. The method can be enabled by staggering the beam directions of subsequent UL xFD subbands, thus alleviating the potential for inter-slot interference. In addition, a timing offset may be specified for each set of beam directions and/or port definitions.

Figure 51:
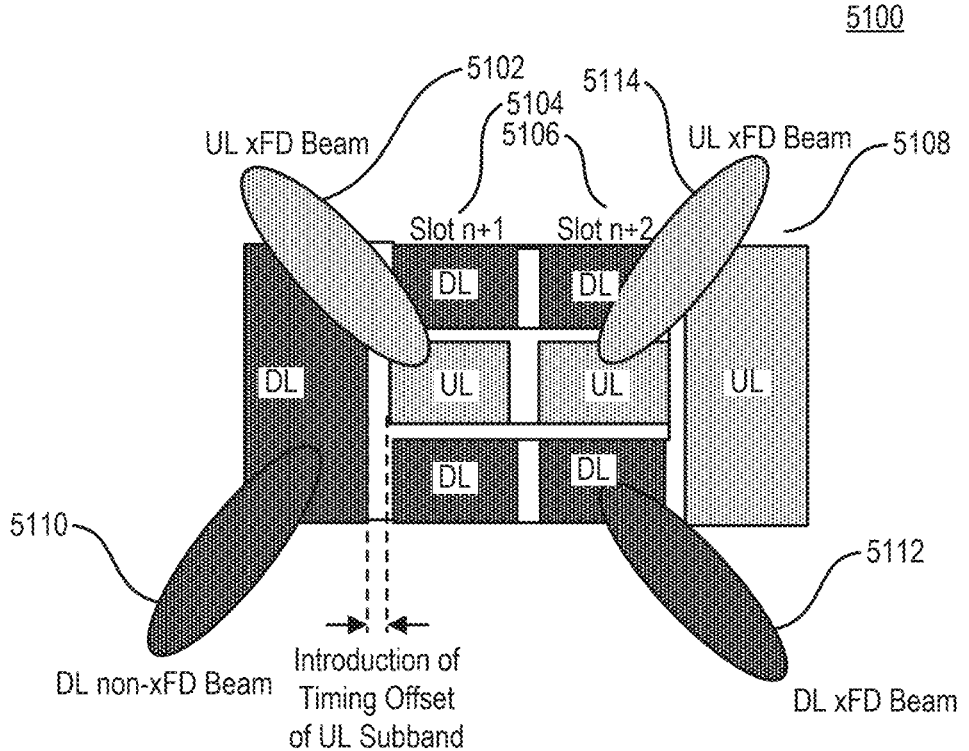
FIG. 51 shows non-xFD, and xFD beam directions.

FIG. 51 shows non-xFD, and xFD beam directions. In the example 5100, four slots 5102-5018 are shown. A first DL slot 5102 uses a DL beam 5110 which is different than an UL beam 5102 used for slot n+1 5104. Similarly, UL beam 5114 used in slot n+2 5106 may be different than DL xFD beam 5112. A timing offset may or may not be introduced.

Figure 52:
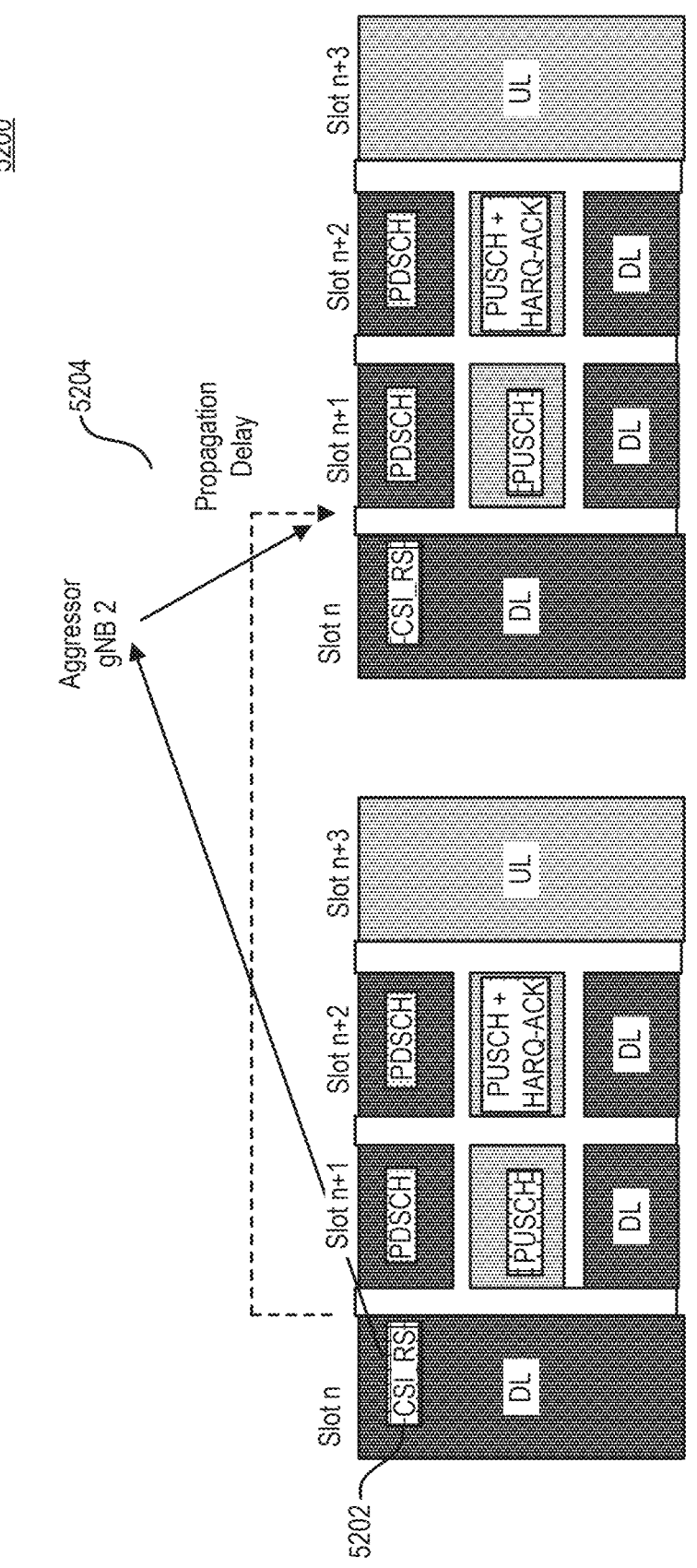
FIG. 52 shows a propagation delay timing difference.

An embodiment for a timing alignment measurement may be to use one or more reference symbols (e.g., CSI-RS, SRS, PTRS) from the full bandwidth BWP just prior to the subband slots as a reference for the timing difference, as shown in FIG. 52.

FIG. 52 shows an example 5200 of a propagation delay timing difference. Specifically, FIG. 52 shows that a CSI-RS 5202 may be used to determine a propagation delay timing difference 5204. Base stations may exchange information for calculating the timing difference, in embodiments.

PUSCH Repetition Type B is akin to the one employed for URLLC operation in an unlicensed band. However, in an unlicensed band, PUSCH repetitions are prohibited from spanning a slot boundary or overlapping DL or invalid symbols. Unlike the licensed band, which may necessitate a UL Grant, the UE is permitted to initiate its own Channel Occupancy Time (COT) to transmit UL data. This is due in part to the necessity that the UE use Listen Before Talk (LBT) for its transmissions, which is similar to the contention-based access in WiFi.

For the unlicensed band, the UE's Fixed Frame Period (FFP) should not prevent the gNB from starting its own COT. This is achieved by setting the offset and periodicity of the UE's FFP to differ from those of the gNB.

To ensure that the UE transmits in its own COT instead of the gNB's COT, the gNB should indicate this through a UL grant or semi-statically using the RRC when scheduling a PUSCH transmission.

Another approach involves preconfiguring the UE using a rule that distinguishes between gNB-initiated COT and UE-initiated COT based on specific criteria, such as the transmission priority (e.g. Table 5). This priority is determined by the PUSCH location relative to the gNB's FFP or the UE's FFP. When a UL transmission is scheduled by a DCI or a RAR message, the scheduling DCI or the RAR message provides the channel access parameters for the UL transmission(s) as outlined in [23]. Based on this information, the UE determines whether the scheduled UL transmission(s) are associated with a COT initiated by the gNB or the UE and whether sensing via LBT and CP extension are applicable.

For the operation of xFD in an unlicensed or License Assisted Access (LAA) band, the UE may need to enable the scheduling of resources and a COT for it on the SCell. In unlicensed spectrum, a UE's transmitter should do LBT procedures to sense and acquire an idle channel before transmitting. LBT Type 1 channel access procedures are done by the transmitter to obtain a new COT (duration of maximum channel occupancy time (MCOT) is $T_{ulm\ cot,p}$ in Table I and Table II). After obtaining a channel, the transmitter transmits data within the COT. A possible solution is if the gNB shares a COT that is initiated by the SCell UE. However, the COT would have to be restricted to the COT of the xFD subbands in the SCell. To handle potential LBT failures on configured grants (CG), the CG retransmission timer can be optionally configured to enable autonomous retransmissions. The priority class chosen by the gNB for the SCell UE may based on the channel condition of the probability of sensing the channel to satisfy the URLLC latency requirement and guarantee a fair use of the SCell channel with other UEs by using a suitable COT. The total Channel Occupancy Time of autonomous uplink transmission(s) obtained by the channel access procedure, including the following DL transmission if the UE sets 'COT sharing indication' in AUL-UCI to '1' in a subframe within the autonomous uplink transmission(s), shall not exceed the UL time (ms) $T_{ulm\ cot,p}$ and contention window size (CW) for a given access probability p as is given in Table 5 and specified in Release 17.

TABLE 5

Channel Access Priority Classes in Release 17

| Channel Access Priority Class (p) | $m_p$ | $CW_{min,\ p}$ | $CW_{max,\ p}$ | $T_{ulm\ cot,\ p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:

For p = 3, 4, $T_{ulm\ cot,\ p}$ = 10 ms if the higher layer parameter absenceOfAnyOtherTechnology-r14 or absenceOfAnyOtherTechnology-r16 is provided, otherwise, $T_{ulm\ cot,\ p}$ = 6 ms.

NOTE 2:

When $T_{ulm\ cot,\ p}$ = 6 ms it may be increased to 8 ms by inserting one or more gaps. The minimum duration of a gap shall be 100 μs. The maximum duration before including any such gap shall be 6 ms.

To facilitate xFD operation of FD-URLLC in an unlicensed band with a SCell the channel access priority classes may be modified to allow FD-URLLC operation which requires much tighter latency requirements. For example, in Table 6 the channel access priorities p=(1 . . . 4) have been added to facilitate FD-URLLC operation in an unlicensed SCell.

TABLE 6

Channel Access Priority Classes for Unlicensed FD-URLLC

| Channel Access Priority Class (p) | $m_p$ | $CW_{min,\ p}$ | $CW_{max,\ p}$ | $T_{ulm,\ p}$ | allowed $CW_p$ sizes |
|---|---|---|---|---|---|
| 1 | 1 | 2 | 5 | 0.5 ms | {2, 5} |
| 2 | 1 | 2 | 5 | 1 ms | {2, 5} |
| 3 | 1 | 3 | 7 | 2 ms | {3, 7} |
| 4 | 2 | 3 | 7 | 4 ms | {3, 7} |
| 5 | 2 | 7 | 15 | 4 ms | {7, 15} |
| 6 | 3 | 15 | 1023 | 6 ms or 10 ms | {15, 31, 63} |
| 7 | 7 | 15 | 1023 | 6 ms or 10 ms | {15, 31, 63, 127, 255, 511, 1023} |

An eNB/gNB may not transmit on a channel for a Channel Occupancy Time that exceeds $T_{mcot,p}$ where the channel access procedures are performed based on a channel access priority class p associated with the eNB/gNB transmissions, as given in Table 6.

Another issue is the use of xFD in an unlicensed band. Since the management of the COT is different in an unlicensed band, the resource schedule for xFD in an unlicensed band needs to accommodate these differences. When operating xFD in an unlicensed band, it is also assumed that the resource scheduling continues on the primary licensed band which is the same as a typical Release 19 operation. This implies that the configuration of xFD in an unlicensed band is by the eNB/gNB in the licensed primary band.

An embodiment proposes simultaneous HARQ feedback assignment and resource allocation, specifically for SBFD and FD-URLLC applications. HARQ feedback from the UEs can be dynamically allocated to different subbands of SBFD slots based on interference levels (i.e., self-interference (SI) and cross-link interference (CLI)), traffic conditions, or UE-specific restrictions. The term "dynamically" refers to a flexible and adaptive allocation approach where feedback resources are adjusted on a per-slot or per-subband basis, responding to real-time network conditions rather than following a fixed or predefined pattern. While existing scheduling techniques in Release 19 provide some level of flexibility, this proposal introduces an enhanced approach that incorporates interference-aware subband selection and prioritization. The dynamic allocation mechanism is further complemented with subband muting and extended to prioritize or assign primary subbands on a BWP basis, ensuring more efficient interference management and resource utilization.

A method addresses interference management challenges for full-duplex (FD) operation, by combining HARQ feedback scheduling with PDSCH grants, reducing signaling overhead. It aims to minimize collisions in feedback transmission by dynamically assigning feedback subbands to reduce interference with UL and DL data transmissions in SBFD. This approach supports both contention-based and contention-free feedback mechanisms. This ensures deterministic scheduling with minimal delays, making it suitable for low-latency applications such as URLLC. Additionally, this design simplifies UE implementation.

In FD operation of 5G NR, where the gNB operates in FD mode and the UEs operate in half-duplex mode, HARQ feedback collisions may occur when the gNB's DL data interferes with the reception of HARQ feedback from the UE in the same or neighbor subbands, degrading overall throughput and delays in retransmissions. In dense networks, neighboring gNB DL or UEs UL can interfere as well. FIG. 1 top and bottom illustrate SBFD operation for a single cell, and an example of a HARQ collision.

Figure 53:
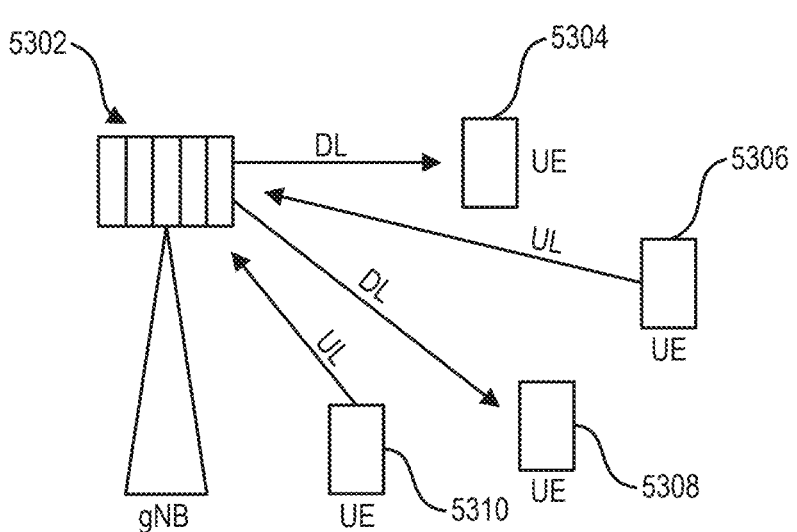
FIG. 53 shows a FD network (gNB) and half-duplex UEs which operate within the same cell.

FIG. 53 shows an example 5300 wherein a FD network (gNB) 5302 and half-duplex UEs 5304-5310 which operate within the same cell.

Figure 54:
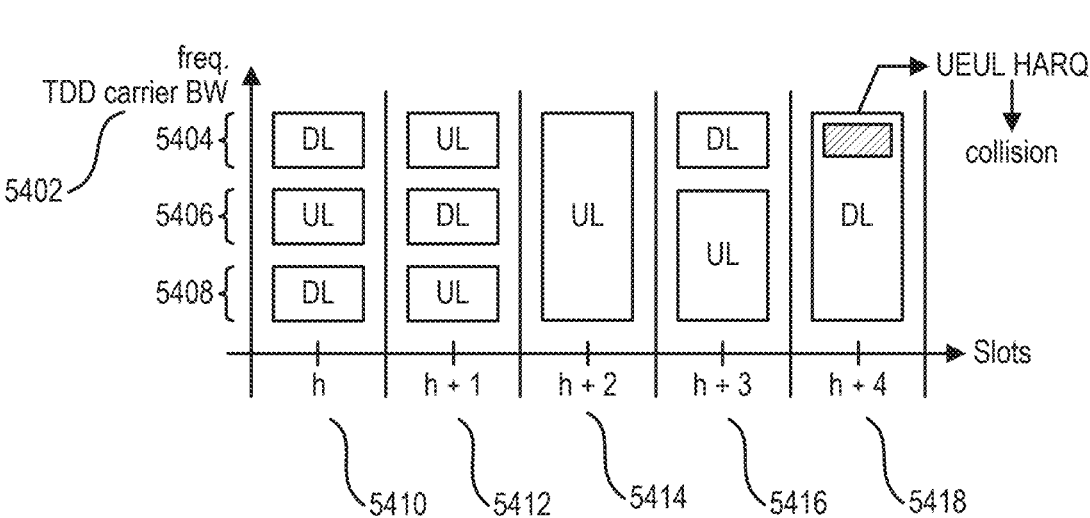
FIG. 54 shows a carrier bandwidth is equally divided into multiple subbands (e.g., 3 subbands), with a collision in slot h+4.

FIG. 54 shows an example 5400 carrier bandwidth is equally divided into multiple subbands (e.g., 3 subbands 5404-5408), with a collision in slot h+4 5418. In slot h+4 5418 HARQ feedback and data transmission occur (or at least are scheduled to occur). Slot h 5410 is a FD slot, slot h+1 5412 is a FD slot. Slot h+2 5414 is an UL slot. Slot h+3 5416 includes FD (one DL and one UL). Slot h+4 5418 is DL only.

The gNB monitors channel conditions and interference levels across subbands by analyzing CSI, corresponding to reference signals and received signals. Additionally, HARQ retransmission requirements are evaluated for specific services (e.g., URLLC or eMBB). For instance, for FD-URLLC, subbands with the least interference and traffic load may be prioritized. For each HARQ feedback instance, the gNB dynamically—that is, within a slot or filtered over multiple slots (implementation aspect) and based on continuously updated channel conditions and interference levels-selects the optimal subband for a feedback transmission. This selection process adapts to varying interference levels and traffic patterns, ensuring that subbands with high interference or conflicting UL/DL traffic are avoided.

With this embodiment, the gNB explicitly configures SBFD subbands for simultaneous UL/DL operations. These subbands are defined with explicit frequency and time granularity, allowing efficient scheduling of HARQ feedback alongside data transmission.

With this embodiment, the gNB explicitly configures SBFD subbands for simultaneous UL/DL operations. These subbands are defined with explicit frequency and time granularity, allowing efficient scheduling of HARQ feedback alongside data transmission. The frequency granularity is influenced by the subcarrier spacing (SCS), where different SCS configurations impact the resolution of subband allocation. A larger SCS (e.g., 60 kHz or 120 kHz) enables more precise subband definitions, which can be beneficial for high-mobility or low-latency scenarios, while a smaller SCS (e.g., 15 kHz or 30 kHz) may be preferable for coverage and interference management. This interplay between SCS and subband granularity ensures that resource allocation is optimized based on deployment scenarios and service requirements.

The gNB assigns specific subbands (subband indices) and time slots (timing offsets) for HARQ feedback, simultaneously with the scheduling of PDSCH, ensuring a tight coupling between data transmission and feedback signaling. For a specific HARQ feedback process (where the number of HARQ processes is configured via RRC, with a maximum of four processes based on the current NR standard for TDD), the HARQ feedback corresponding to received PDSCH data is transmitted via PUCCH when feedback needs to be sent independently or via PUSCH when integrated with UL data transmissions. Feedback transmission follows the configured subband index and timing offset.

The selection of the feedback resource also depends on whether it operates within a FD subband or a non-FD resource. In an FD subband, feedback can be sent with more relaxed timing constraints since simultaneous UL and DL transmissions are supported, reducing the need for strict scheduling alignment. In contrast, feedback transmitted over a non-FD resource may require more stringent timing coordination to avoid collisions with ongoing UL or DL transmissions.

Figure 55:
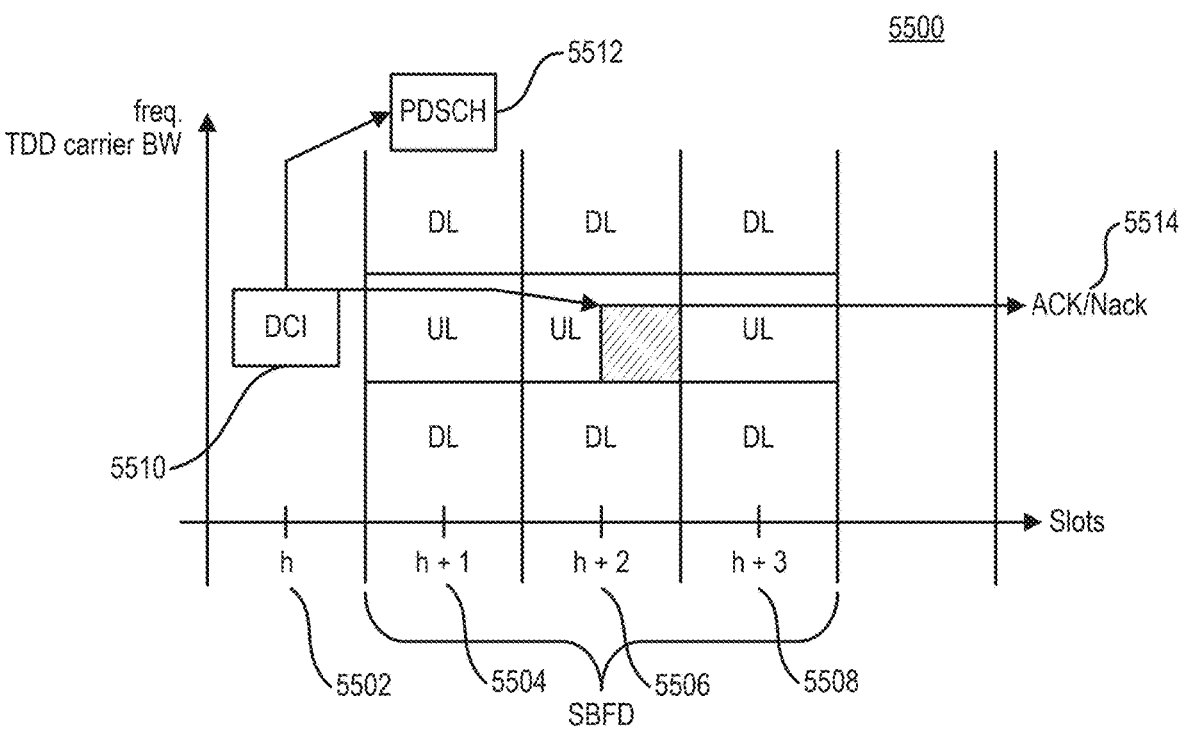
FIG. 55 shows an example operation, including how the gNB assigns subbands and time slots for HARQ feedback in both initial transmissions and re-transmissions.

FIG. 55 illustrates an example operation 5500, including how the gNB assigns subbands and time slots for HARQ feedback in both initial transmissions and re-transmissions.

Referring specifically to FIG. 55, the DL resource grant 5510 and HARQ feedback location information are sent to the UE in slot h 5502, the PDSCH 5512 is transmitted to the UE in slot h+1 5504, and the UE, based on the HARQ feedback location, transmits the HARQ feedback 5514 in slot h+2 5506 in the middle subband (e.g. based on information provided via DCI 5510). Slot h+3 5508 may also be an FD slot.

Leveraging the parameter k0 (DCI-to-PDSCH timing), the timing offset between PDSCH reception and HARQ feedback transmission is determined. The k1 (PDSCH-to-HARQ-feedback timing) parameter further defines the HARQ ACK/NACK timing for a specific PDSCH, ensuring a deterministic feedback mechanism. Within the FD slots, these parameters are critical for achieving ultra-low latency, particularly in FD-URLLC scenarios.

Figure 56:
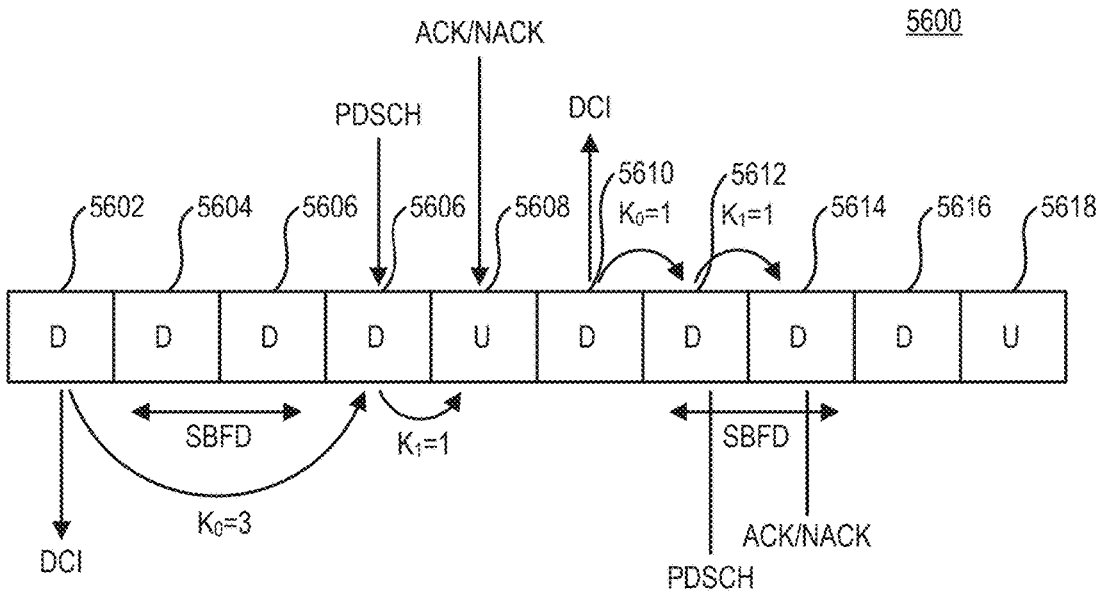
FIG. 56 shows an example of k0 and k1 values for the proposed SBFD-based HARQ mechanism.

FIG. 56 shows an example 5600 of k0 and k1 values for the proposed SBFD-based HARQ mechanism. In example 5600, DCI may be provided in downlink slot 5602. Two SBFD slots 5604-5606 may follow. PDSCH scheduled by the DCI in slot 5602 may occur in DL slot 5606 and an ACK/NACK may be transmitted in UL slot 5608. Slot 5610 may comprise DCI that schedules PDSCH in SBFD slot 5612 and an ACK/NACK in SBFD slot 5614 (which may also comprise DL data of the UE or another UE). Slot 5616 may be a DL slot and slot 5618 may be an UL slot.

Currently in Release 19, the HARQ feedback process is optimized to support URLLC latency requirements. Compared to previous releases, where HARQ feedback timing was often constrained by slot structures, Release 19 introduces more granular HARQ feedback opportunities, enabling tighter control over acknowledgment timing.

In conventional URLLC (Half-Duplex TDD Mode), k0 and k1 are designed to ensure that feedback is sent in the next available UL slot while following slot boundaries. However, slot-based HARQ feedback may still introduce non-negligible delays due to TDD restrictions. With SBFD in Release 19, HARQ feedback can be sent within the same slot as the corresponding PDSCH reception, but within a dedicated subband. This enables frequency-domain isolation between UL and DL within the same slot, minimizing latency while avoiding self-interference. FD-URLLC allows simultaneous full-band UL and DL transmission, providing even lower latency but requiring advanced self-interference cancellation.

The k3 parameter is introduced to provide fine-grained control over HARQ feedback subband selection, ensuring optimized feedback allocation across the available bandwidth. Specifically, the total bandwidth is divided into equal-width subbands (BW_SB or subbandSize) for HARQ feedback allocation. The subband width is configurable via SIB or RRC signaling, allowing adaptation to different deployment scenarios (e.g., smaller subbands for high-density networks). The subband indexing may start from the smallest frequency within the configured bandwidth as shown in the example 5700 of FIG. 57. FIG. 58 shows an example 5800 of operation with k0, k1 and k3.

A difference between SBFD and FD-URLLC lies in how UL and DL transmissions coexist within the same slot. SBFD operates by allowing simultaneous DL reception and UL HARQ feedback within different subbands. This mitigates interference while maintaining low latency. FD-URLLC enables simultaneous UL and DL transmissions across the entire band, offering the lowest possible latency but requiring advanced interference handling techniques.

Figure 57:
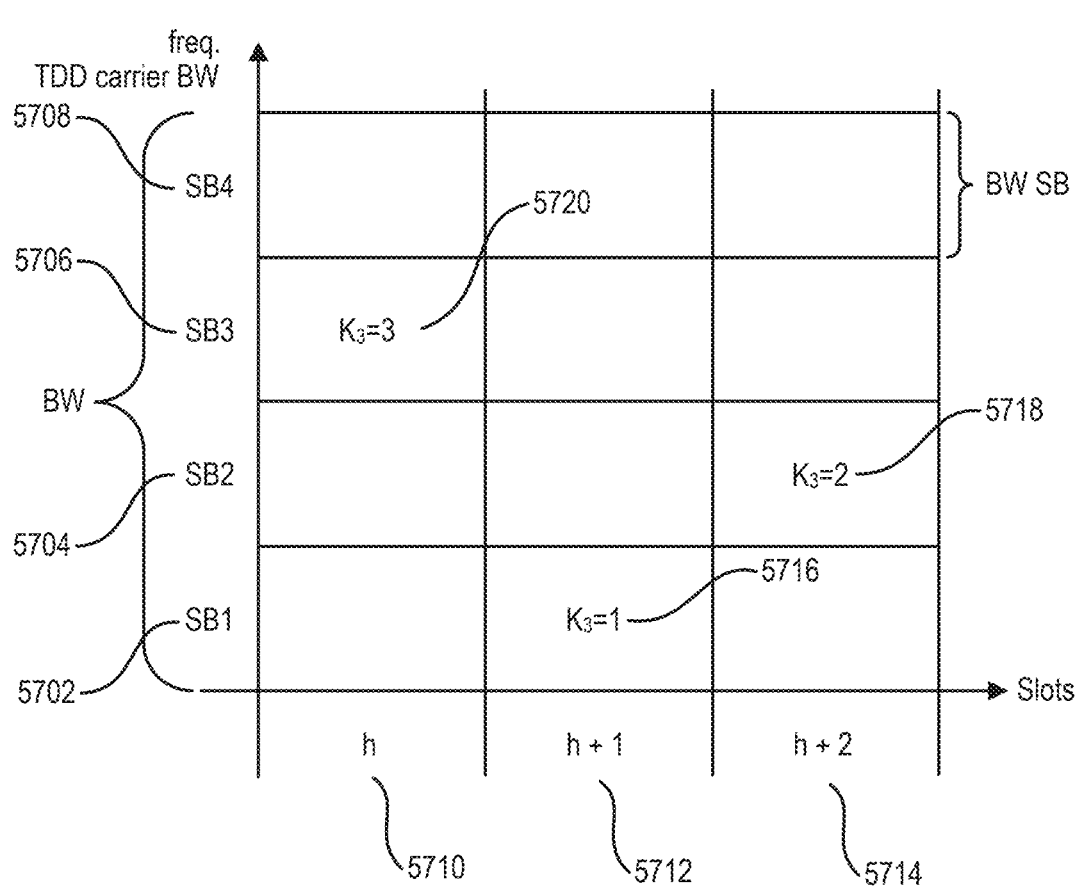
FIG. 57 shows that a TDD carrier bandwidth is divided into 4 subbands, with k3 values shown as examples for different subbands.
Figure 58:
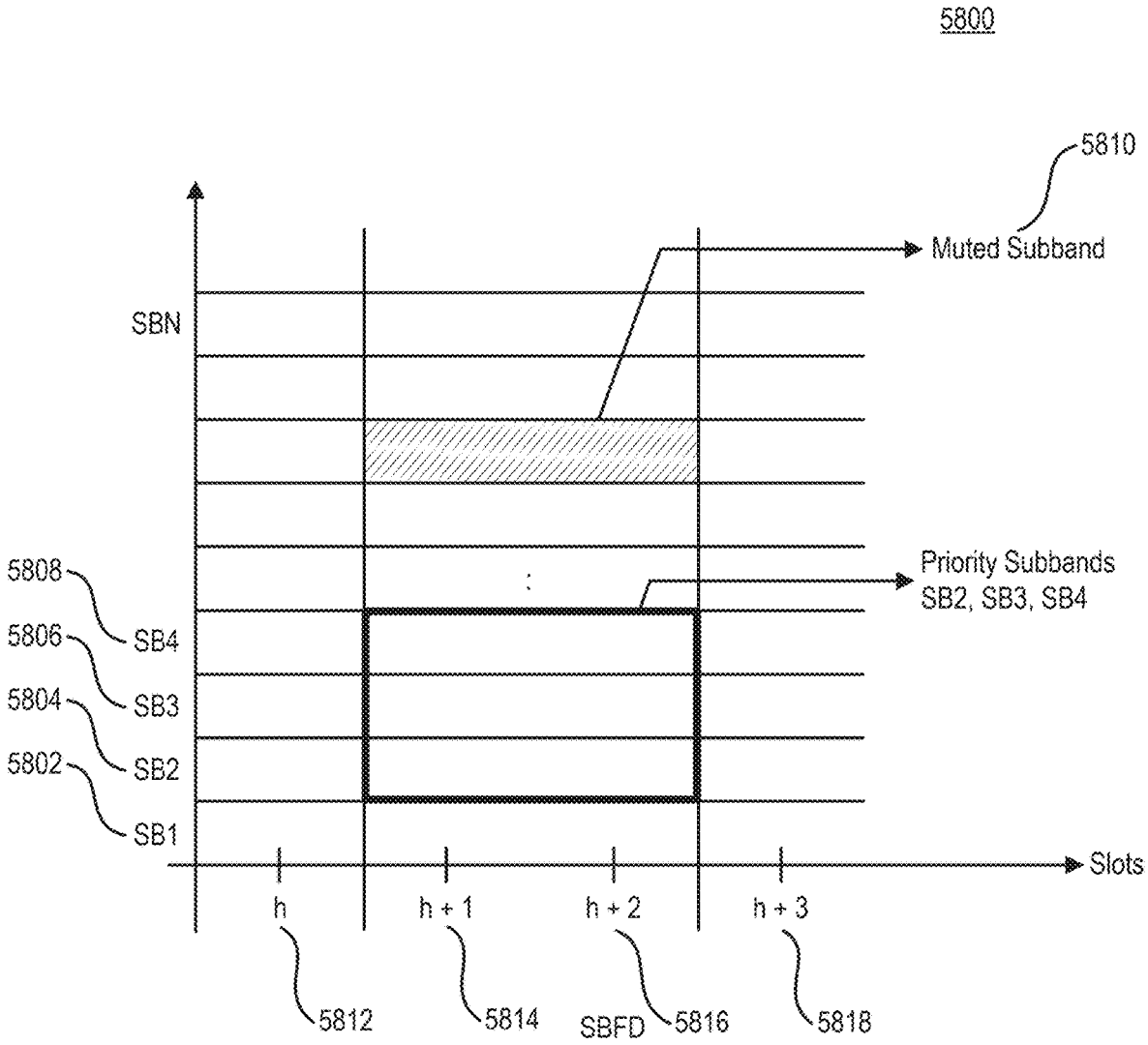
FIG. 58 shows an embodiment wherein the network configures priority subbands SB2, SB3, and SB4 as more reliable subbands for transmission as opposed to SB1.

FIG. 57 shows that a TDD carrier bandwidth 5700 is divided into 4 subbands, with k3 values shown as examples for different subbands. In the example, sub bands 5702-5708 are shown over three slots h 5710, h+1 5712 and h+2 5714. In SB3 5706 and slot h, K3=3. In SB1 5702 and slot h+1 5712, K3=1 5716. In SB2 5704 and slot h+2 5714 K3=2 5718.

In DL slots of SBFD, UL transmissions can be positioned at the center of the operator's TDD carrier bandwidth, while the outer edges remain allocated for DL transmissions to protect adjacent channels of other operators in the NR band. Therefore, in an embodiment, subband indexing can be re-defined only for this portion of TDD carrier bandwidth.

Additionally or alternatively, the gNB may transmit a "Subband Index Offset" to the UE via DCI Field. This subband offset represents a relative shift within the UE-specific absolute subband index, (which can be signaled to UE via RRC), reducing signaling overhead. While the new approach optimizes timing and subband-specific feedback for reduced latency and improved reliability, legacy devices can still operate in existing slots without interference from new mechanisms. For legacy devices, the timing parameters like k0 and k1 can be configured to match their existing capabilities. The proposed approach remains backward compatible with NR HARQ processes.

If interference is detected in the allocated subband, the gNB dynamically adjusts the subband and/or timing offset for feedback transmission. Updates are sent via new DCI. In extreme cases of interference, the gNB may instruct UE to perform fallback mechanisms by leaving FD operation and following the base TDD half duplex configuration. The gNB can provide explicit fallback instructions to maintain HARQ reliability based on specific QoS requirements via RRC messaging or MAC CE. The nrofUplinkSlots and nrof-DownlinkSlots of RRC IEs can be adjusted to define UL transmissions within a subband while allowing DL on other subbands in the same slot. The sbfd-Activation from MAC CE activates SBFD mode based on real-time conditions. In addition, gNB can abandon allocating the problematic UE or UEs within SBFD slots.

For some applications such as URLLC, the gNB can pre-configure a set of priority subbands for HARQ feedback, which could be common among groups of UEs. These subbands are selected to minimize latency and avoid interference, ensuring deterministic and low-latency feedback transmission.

To enable this mechanism, the gNB signals the priority subband configuration to UEs through RRC signaling during initial setup or via DCI/MAC CE for dynamic adjustments. This signaling ensures that all UEs know which subbands to use for HARQ feedback, allowing efficient scheduling and resource allocation. Additionally, the gNB may employ PDCCH signaling to adjust the HARQ feedback subband selection based on network conditions, ensuring robust and reliable low-latency transmission.

FIG. 58 illustrates an example 5800 of priority subbands over SBFD slots, showing how HARQ feedback is mapped to these subbands for timely and interference-aware transmission. The network configures priority subbands SB2, SB3, and SB4 5804-5808 as more reliable subbands for transmission as opposed to SB1 5802. This is configured for at least slots h+1 5814 through h+2 5816. It also shows a muted subband 5810 within SBFD slots. Slots h 5812 and h+3 5818 may not comprise priority subbands.

The gNB can assign both FD subbands (e.g. SBFD) and non-FD subbands for HARQ feedback transmission. This improves flexibility in handling different types of subbands, accommodating both legacy and advanced use cases. These non-FD subbands may be used in cases where FD transmission is not feasible, such as in networks that are not fully upgraded for SBFD or in situations where interference mitigation is required. In these cases, dedicated feedback subbands can be allocated for HARQ transmission. The feedbackMode parameter differentiates between FD and non-FD feedback subband assignments.

The gNB sends an RRCReconfiguration message containing information about the pre-configured priority subbands.

prioritySubbandConfig {
    subbandCount=int, The number of priority subbands in the system
    subbandSize=MHz, The bandwidth of each priority subband.
    subbandIndex={int}, Specific index (in frequency domain) of priority subband
    feedbackMode={FullDuplex, NonFullDuplex}, Specifies the mode for subband
}

At the PHY layer, the gNB pre-configures and signals the priority subbands to each UE. The UEs can transmit their HARQ feedback in these pre-allocated priority subbands.

Each UE can use the pre-configured priority subbands for their HARQ feedback, avoiding interference by ensuring that the same subband is not allocated to multiple UEs at the same time.

Alternatively, the gNB can pre-allocate HARQ feedback resources using Semi-Persistent Scheduling (SPS), guaranteeing deterministic scheduling and avoiding collisions as well as reducing scheduling overhead and improving latency. The RRCReconfiguration message is extended to include HARQ feedback SPS parameters, K1_HARQ-FB={int}, Defines the k1 (PDSCH-to-HARQ timing)
pucch-ResourceIndex={Index ID}, Pre-allocated PUCCH resource index for feedback.
harq-FB-SPS-Window={2, 4, 8 slots}, Specifies the feedback window to accommodate adaptive HARQ.

UE acknowledges via RRCReconfigurationComplete message and UE starts using pre-configured PUCCH resources for HARQ feedback without waiting for explicit scheduling grants.

To prioritize HARQ feedback reliability, the gNB may impose UE-specific scheduling restrictions. With UE specific priority Subbands the UE is restricted to transmit HARQ feedback only on specific pre-allocated subbands.

Figure 59:
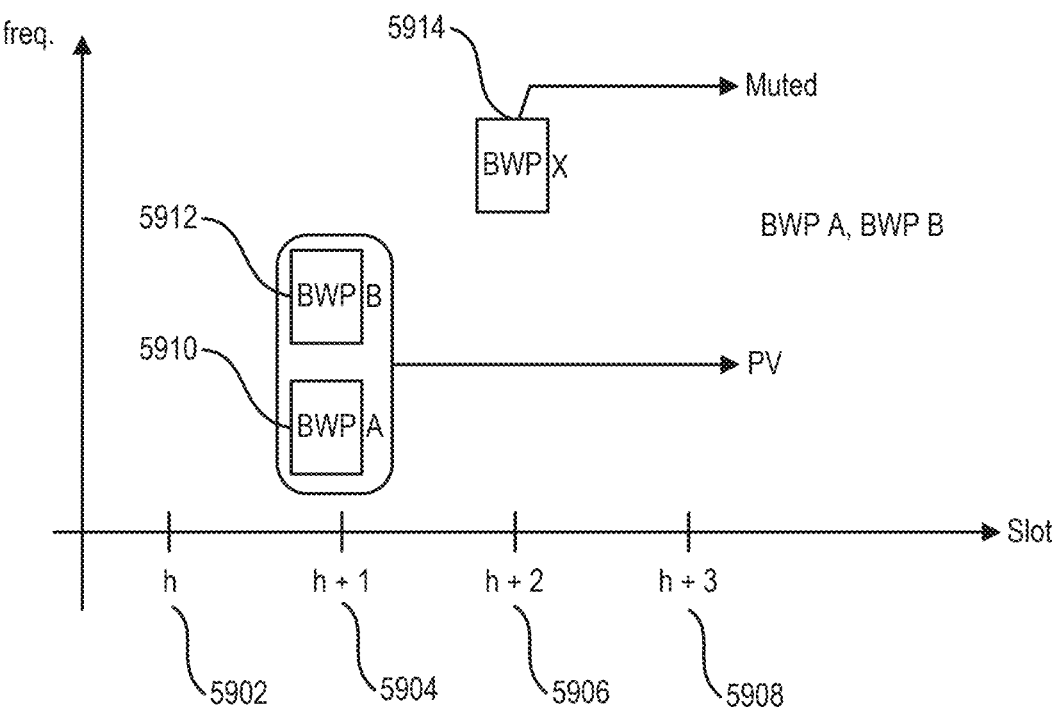
FIG. 59 shows an example of a priority subband configuration and muting at BWP level.

In another embodiment, the gNB may apply muting on certain subbands of SBFD slots to manage interference and prioritize HARQ feedback. The gNB ensures that the UE avoids transmitting feedback on, dynamically reallocating resources as needed. FIG. 59 shows SB x is muted.

In an extended embodiment, the gNB assigns a primary subband or set of subbands as the specific BWP for HARQ feedback. This ensures efficient feedback transmission while minimizing signaling overhead. HARQ feedback within the prioritized BWP has higher reliability. In addition, some BWP parts could be muted and no UL transmission can be performed. FIG. 59 illustrates BWP operation of SBFD specific HARQ feedback handling. Depending on UE capability and category, NW enables dynamic subband operations with MAC CE.

At the RRC layer, the gNB pre-configures the primary subband (or set of subbands) within a BWP for HARQ feedback. This configuration ensures the prioritization of resources for feedback transmissions.

```
primarySubbandBWP {
    bwpIndex={1}, Index of primary BWP for HARQ
        feedback bwpSize={10 MHz}, Bandwidth of the
        primary BWP
    subbandIndices={2, 4, 6}, Indices of priority subbands
        in the BWP
    muteBWPParts={True}, Mute unused parts of the
        BWP feedbackMode={FullDuplex, NonFullDu-
        plex}, Specifies the mode for subband}
}
```

At the MAC layer, the gNB can dynamically adjusts subband assignments for HARQ feedback based on the UE's capabilities and category. This may be done through the use of MAC CEs.

```
MAC CE: DynamicSubbandAllocation {
    feedbackBWPIndex={1}, Index of BWP for feedback
        transmission
    feedbackPeriodicity={2 ms}, Periodicity of feedback
        transmission
    muteSubbandParts={True/False}, Mute parts of sub-
        band to optimize interference
    feedbackMode={FullDuplex, NonFullDuplex}, Speci-
        fies the mode for subband}
```

At the PHY layer, the gNB signals to the UE the specific subbands within the BWP that are used for HARQ feedback. The UE may transmit ACK/NACK feedback within the allocated subband(s) that are assigned to it.

```
    feedbackBWPIndex={1}, Index of the BWP for HARQ
        feedback
    feedbackSubbandIndex={2, 4}, Specific subbands
        assigned for feedback
```

The gNB assigns the primary BWP for HARQ feedback, and feedback is transmitted using the pre-configured priority subbands within the BWP. The operation follows:

gNB Configuration: The gNB configures the primary subband or BWP for HARQ feedback in RRC signaling. UE Assignment: The UE is assigned to specific subbands within the BWP for feedback transmission. Feedback Transmission: The UE transmits ACK/NACK feedback within the assigned subband, ensuring higher reliability by using dedicated subbands for feedback. Mute Parts of the BWP: The gNB can mute unused parts of the BWP to avoid interference and ensure efficient use of resources.

FIG. 59 shows an example 5900 of a priority subband configuration and muting at BWP level. Specifically, the example 5900 shows four slots 5902-5908. In slot h+1 5904 BWP A 5910 and BWP B 5912 may be utilized in whole or partially. In another slot, h+2 5906, BWP X 5914 may be muted in whole or partially.

To enable continuous data flow without waiting for the outcome of a single transmission, 3GPP systems use multiple independent HARQ processes, known as the Stop-and-Wait protocol. A unique HARQ process number may be assigned to each new data block sent.

A transmitter (e.g., a base station or gNB) may send new data packets for one HARQ process while waiting for an acknowledgment (ACK/NACK) for an earlier packet from a different process.

The HARQ process ID may be signaled in the Downlink Control Information (DCI) that schedules the transmission. This allows the receiver (User Equipment or UE) to know which HARQ process to use for the incoming data. Each HARQ process at the receiver side has its own buffer to store the received data and a state variable called CUR-RENT_TX_NB to track the number of transmissions for that process.

A Redundancy Version is a parameter used with incremental redundancy (IR) HARQ schemes to select which coded bits to send during a retransmission. This is more efficient than simply resending the same data. For the initial transmission of a data block, the sender transmits a specific set of coded bits. If a retransmission is needed, the sender uses a different RV value to transmit a new, complementary set of coded bits. The receiver combines the bits from both the initial transmission and the retransmission. The combination of different versions of the data provides a more powerful error-correction code, improving the chances of successful decoding.

The DCI may also include the Redundancy Version, informing the receiver which version of the data is being sent. During the first transmission, the RV is typically 0, and it is then incremented for subsequent retransmissions.

In an embodiment, dual-HARQ feedback may be used for SBFD. This embodiment improves HARQ feedback transmission reliability in FD-URLLC and SBFD configurations. By combining primary and secondary feedback transmissions, the probability of feedback loss may be reduced. Furthermore, the dual-stream HARQ feedback optimizes the use of spatial diversity of MIMO for improved reliability.

The first HARQ feedback can be transmitted using the PUCCH on a pre-configured subband. This configuration is specified by the gNB in accordance with RRC signaling as per 3GPP standards (e.g., TS 38.331).

The second HARQ feedback is asynchronously transmitted using the PUSCH in the event of decoding failure or collision. Alternatively, the second feedback can be transmitted over a dynamically allocated subband, different from the first subband, to mitigate collision risks and support full-duplex feedback operations. The mechanism prioritizes FD-URLLC traffic by assigning higher-priority subbands and leveraging faster retransmission timers.

RRC messages provide the gNB with information to determine which services need to be prioritized for HARQ feedback. This RRCReconfiguration message can be used by the gNB to reconfigure the UE with specific parameters that prioritize FD-URLLC traffic. The configuration includes HARQ-ACK Priority, where the gNB assigns higher-priority subbands for FD-URLLC traffic in the HARQ-ACK-Config field. The subbands allocated for FD-URLLC have priority over non-URLLC traffic, ensuring low-latency HARQ feedback for FD-URLLC users. Another part is scheduling priority where the gNB can configure the UE's UL/DL scheduling priority by using priority level parameters. This can be done via the QCI (Quality of Service Class Identifier) field in the RRCConnectionReconfiguration message to ensure that FD-URLLC traffic gets higher priority for scheduling resources compared to non-URLLC traffic. The gNB uses QCI settings to prioritize PDSCH/PUSCH resources for FD-URLLC, ensuring low-latency by allocating them with higher priority over other traffic types (e.g., normal eMBB or URLLC).

The gNB sends an RRCConnectionReconfiguration message to configure SBFD priority subbands. An example of such fields is,

```
    RRCConnectionReconfiguration
        sbfd-Config
        subbandConfigList, Defines the set of subbands avail-
            able for SBFD operation.
        subbandIndex (e.g., 0, 1, 2, . . . ), Specifies if the
            subband is reserved for high-priority HARQ feed-
``` back. Indicates which PUCCH/PUSCH resources should be used for HARQ feedback.

bw_SB (Subband Bandwidth)

harqFeedbackSubband, ACK/NACK on PUCCH or PUSCH k3TimingOffset, Aligns the HARQ feedback timing with subband allocations.

feedbackMode={FullDuplex, NonFullDuplex}, Specifies the mode for subband}} sbfdActivation (TRUE/FALSE), If set to TRUE, the SBFD operation is enabled. It is set to FALSE, signaling the UE to stop using priority subbands.

Once the UE receives the RRCConnectionReconfiguration, MAC and PHY layers handle resource allocation.

FrequencyDomainResource Indicates allocated subband

TimeDomainResource Maps to PDSCH or PUSCH

HARQ-Process-ID Links to original transmission

Downlink Assignment Index (If applicable)

The MAC layer facilitates scheduling and resource allocation based on the RRC-configured priorities. Through MAC signaling, the gNB signals scheduling decisions to the UE using DCI messages. For FD-URLLC, the gNB prioritizes UL or DL resource allocation by using DCI formats with higher priority values for FD-URLLC traffic. The gNB also ensures that FD-URLLC feedback (ACK/NACK) is assigned on higher-priority subbands through DCI signaling. The MAC layer is responsible for controlling HARQ feedback timing, such as retransmission intervals. For FD-URLLC, shorter HARQ-ACK retransmission timers can be configured by the gNB.

The UE transmits initial HARQ feedback on a pre-configured subband within PUCCH resources. The gNB, upon detecting decoding failures due to interference, transmits a Feedback Retransmission Request, FRR to the UE via DCI. Upon receiving the FRR, the UE retransmits the HARQ feedback on the PUSCH. The retransmission ensures redundancy and reliability through the following mechanisms. The gNB dynamically allocates a secondary PUSCH subband to avoid collisions and interference.

Figure 60:
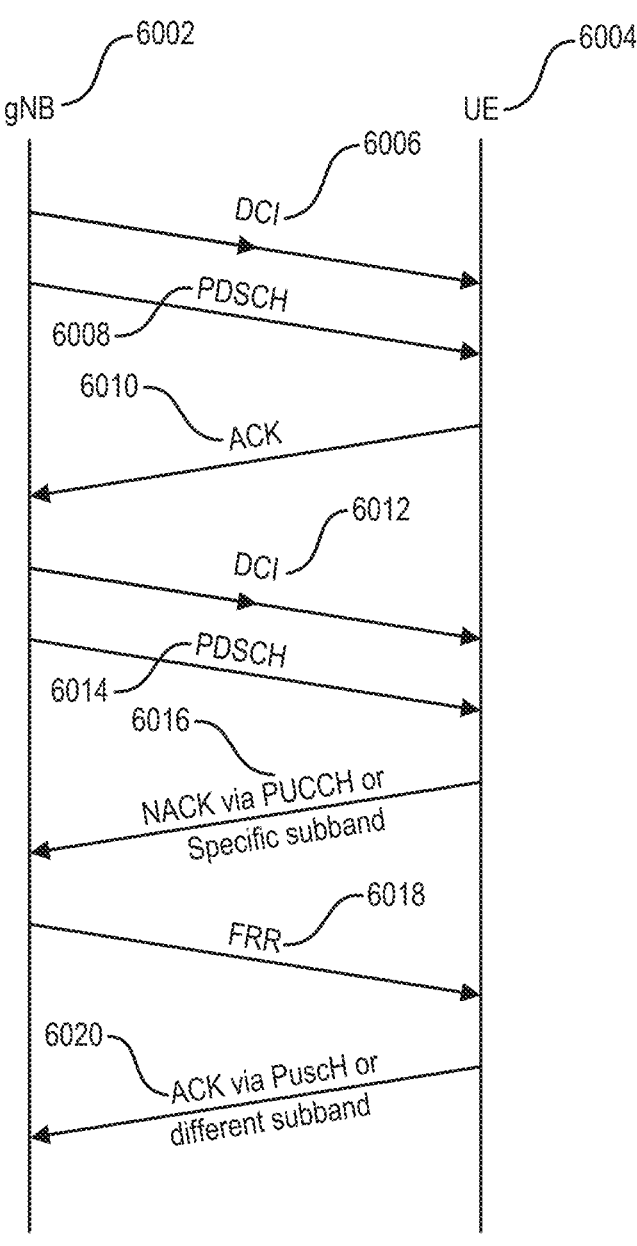
FIG. 60 illustrates an example of a gNB and UE exchange of messages.

FIG. 60 illustrates an example 6000 of a gNB 6002 and UE 6004 exchange of messages. Specifically, a gNB 6002 may transmit DCI 6006 and PDSCH 6008. The UE 6004 may respond with an ACK 6010. The gNB 6002 may transmit another DCI 6012 and PDSCH 6014. The UE 6004 may transmit a NACK 6016 via PUCCH or a specific subband. The gNB 6002 may transmit feedback retransmission request (FRR) 6018. The UE may transmit an ACK 6020 via PUSCH or via a different subband.

In FIG. 60, two scenarios are depicted: one where an ACK is received for the transmission, and another where a NACK is received, triggering the gNB to send a Feedback Retransmission Request (FRR).

FRR can be sent via DCI for fast response. In addition to FRR, subband offset and timing offset k4 for the corresponding HARQ feedback is sent to UE via the same DCI. Alternatively, FRR can have information on the PUSCH grant for HARQ delivery. Extension to more than two retransmissions of HARQ feedback is straightforward.

Figure 61:
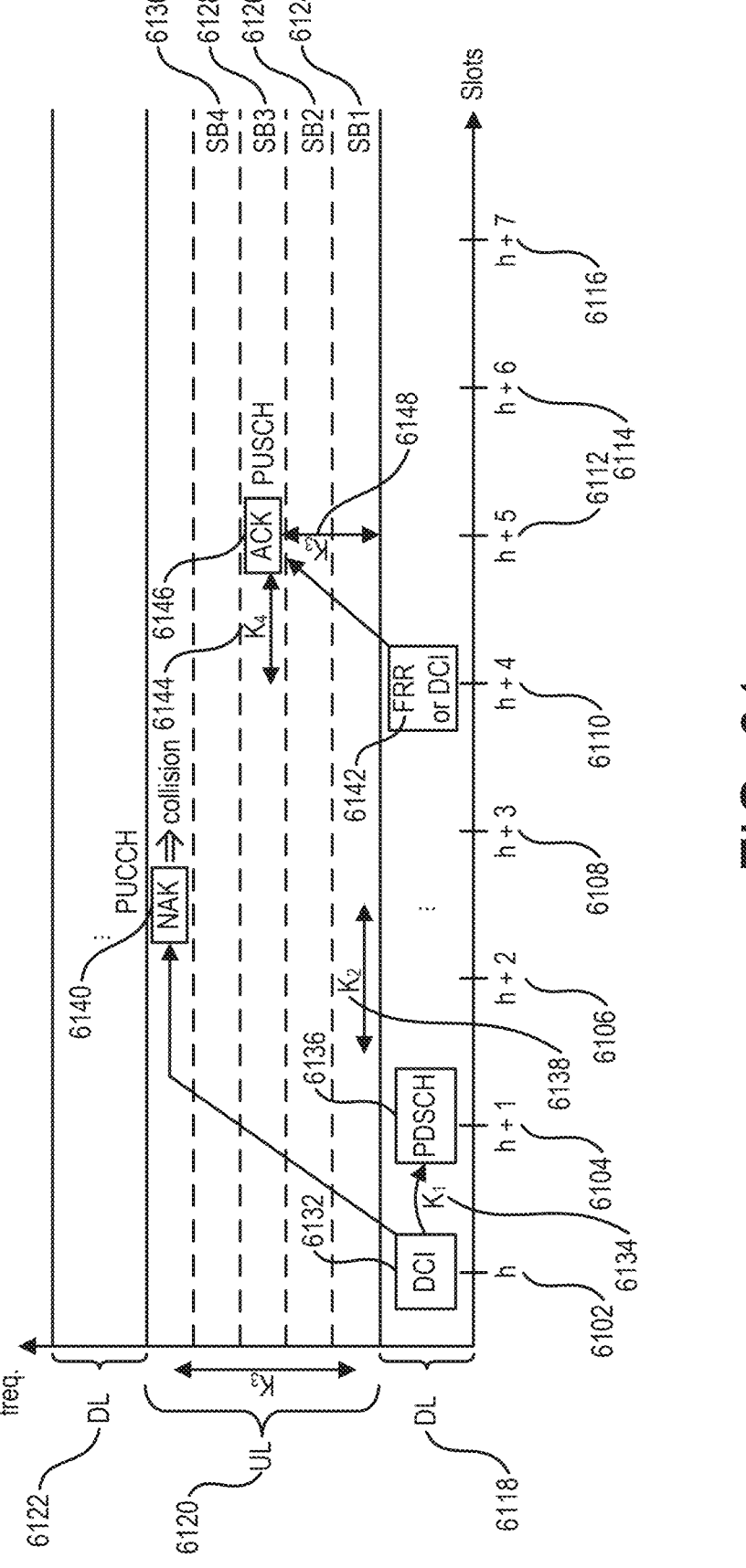
FIG. 61 illustrates an example of operation, depicting timing offsets k1, k2, k4 and subband offset k3 for a scenario where a collision occurs during the first HARQ feedback attempt.

FIG. 61 illustrates an example 6100 of operation, depicting timing offsets k1, k2, k4 and subband offset k3 for a scenario where a collision occurs during the first HARQ feedback attempt. Specifically, time slots 6102-6116 are shown over DL 6118, UL 6120 and DL 6122 frequency portions. UL frequency portion 6120 may be comprised of subbands 6124-6130.

In time slot 6102 a DCI 6132 may be received. The DCI 6132 may schedule a PDSCH 6136 in slot 6104 per k1 6134.

K2 6138 may be in accordance with a NACK 6140 where a collision occurs. FFR or a DCI may be transmitted 6142 in slot 6110. An ACK 6146 may be sent consistent with K4 6144 in time and K3 6148 in frequency.

FIG. 61 shows an operation of Dual HARQ feedback with FRR or a new DCI.

The secondary subband is chosen to ensure minimal overlap with the primary subband, leveraging frequency-domain diversity while enabling full-duplex operations. Alternatively, the feedback is retransmitted over pre-configured secondary subbands, predefined during initial setup.

When the gNB detects that the HARQ feedback was lost or collided, it triggers a FRR via DCI to request the UE to resend the feedback. This signaling also includes information on the secondary subband allocation, timing offsets, and optionally, PUSCH grant for the retransmission.

DCI {
feedbackRetransmissionRequest={True}, Feedback Retransmission Request trigger
secondarySubbandIndex={2}, The subband to be used for retransmitting feedback on PUSCH.
subbandOffset={10 MHz}, Specifies the frequency offset for the secondary subband.
timingOffset={symbols}, Provides the timing offset to adjust the feedback retransmission.
puschGrant={True}, Indicates if a PUSCH grant is needed for retransmitting the feedback.
}

At the physical layer, the UE initially sends the HARQ feedback on the PUCCH subband, and if a retransmission is needed, it uses the PUSCH subband to send the second feedback.

PHY HARQ Feedback Transmission for Primary and Secondary Feedback

PHY HARQ Feedback {
primaryFeedbackSubbandIndex={1}, Specifies the subband on PUCCH for primary feedback.
primaryFeedbackPeriodicity={symbols}, Specifies the subband on PUSCH for secondary feedback in case of failure.
secondaryFeedbackSubbandIndex={2}, Secondary feedback on PUSCH if primary fails
secondaryFeedbackRetransmission={True}, Retransmission of feedback
secondaryFeedbackTimingOffset={symbols}, Provides the timing offset for the secondary feedback.
secondaryFeedbackSubbandOffset={10 MHz}, Specifies the frequency offset for the secondary feedback to avoid interference.}

In a variant embodiment, at the event of decoding failure or a collision, the gNB triggers the transmission of the second HARQ feedback, where a secondary DCI message is sent to the UE to signal the resources for the second HARQ feedback transmission. This DCI includes information subband allocation (may differ from the first feedback subband), timing Information k4, subband index k3, HARQ Process ID (common for both the first and second transmissions). If the FRRProcedure is configured as disabled, both the gNB and the UE follow this procedure. FIG. 61 shows the operation.

The gNB specifies the primary subband for HARQ feedback on PUCCH and the secondary subband for retransmissions on PUSCH. This configuration is transmitted to the UE through RRC signaling.

RRCReconfiguration {
harq-FeedbackConfig {
primaryFeedbackSubband {Defines the pre-configured subband for HARQ feedback over PUCCH.

```
    subbandIndex={1}, Index of the primary feedback
        subband for PUCCH
    feedback Type={PUCCH}, Feedback sent over
        PUCCH
    feedbackPeriodicity={2 ms}, Periodicity of primary
        feedback
},
secondaryFeedbackSubband {Specifies the secondary
    subband for retransmission on PUSCH, with
    dynamic allocation enabled to avoid interference.
    subbandIndex={2}, Index of the secondary feedback
        subband for PUSCH
    feedback Type={PUSCH}, Feedback sent over
        PUSCH
},
feedbackRetransmissionMechanism {Configures the
    Feedback Retransmission Request (FRR) and pro-
    vides information for subband offset and timing
    offset to help the UE perform retransmissions effec-
    tively.
    FRRProcedure={Enabled}, Enable FRR
    subbandOffset={10 MHz}, Subband offset for sec-
        ondary retransmission
    timingOffset={symbols} Timing offset for second-
        ary retransmission
    }
}
}
RRCReconfiguration {
    HARQConfig {
        HARQConfigCommon {Common HARQ feedback
            configuration applicable to all UEs in a cell
            harq-FeedbackConfig {
                primaryFeedbackSubband {Defines the pre-
                    configured subband for HARQ feedback over
                    PUCCH.
                    subbandIndex={1}, Index of the primary feed-
                        back subband for PUCCH
                    feedbackType={PUCCH}, Feedback sent over
                        PUCCH
                    feedbackPeriodicity={2 ms}, Periodicity of pri-
                        mary feedback
                    }
                secondaryFeedbackSubband {Specifies the sec-
                    ondary subband for retransmission on PUSCH,
                    with dynamic allocation enabled to avoid inter-
                    ference.
                    subbandIndex={2}, Index of the secondary
                        feedback subband for PUSCH
                    feedback Type={PUSCH}, Feedback sent over
                        PUSCH
                    },
                feedbackRetransmissionMechanism {Config-
                    ures the Feedback Retransmission Request
                    (FRR) and provides information for subband
                    offset and timing offset to help the UE perform
                    retransmissions effectively.
                    FRRProcedure={Enabled}, Enable FRR
                    subbandOffset={10 MHz}, Subband offset for
                        secondary retransmission
                    timingOffset={symbols}, Timing offset for sec-
                        ondary retransmission
                    }
                }
            },
```

```
            HARQConfigDedicated {Dedicated HARQ feedback
                configuration for specific UEs
                harq-FeedbackConfig {
                    primaryFeedbackSubband
                        {subbandIndex={3}, Dedicated index for the UE
                        feedback Type={PUCCH},
                        feedbackPeriodicity={4 ms}, Different periodicity
                            for specific UE
                    },
                    secondaryFeedbackSubband
                        {subbandIndex={5},
                        feedback Type={PUSCH},
                        }
                    feedbackRetransmissionMechanism {
                        FRRProcedure={Enabled},
                        subbandOffset={12 MHz}, Different offset for spe-
                            cific UE
                        timingOffset={6 ms}
                    }}}}}
```

In an embodiment, the mechanism incorporates MIMO to further enhance reliability. The UE splits the primary and secondary HARQ feedback across different MIMO streams, effectively utilizing spatial diversity to mitigate interference. Utilizing MIMO, could further improve reliability and latency of feedback transmission. The gNB can combine feedback from both primary and secondary transmissions using LLR (Log-Likelihood Ratio) values from primary and secondary transmissions or dual-stream decoding for feedback is performed using spatial diversity.

Figure 62:
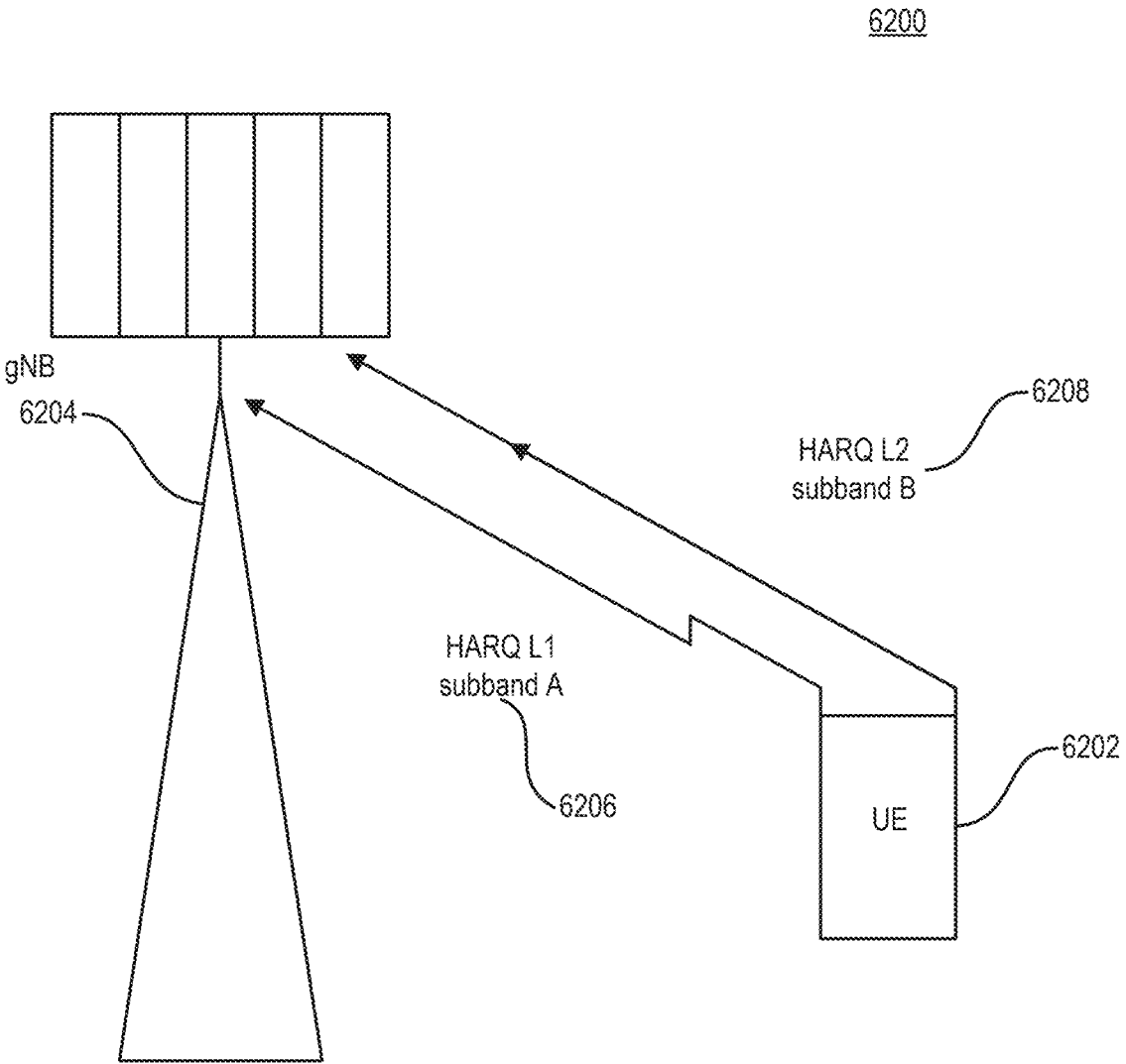
FIG. 62 shows MIMO aware operation of HARQ feedback for SBFD.

FIG. 62 shows MIMO aware operation 6200 of HARQ feedback for SBFD.

Specifically, FIG. 62 shows that HARQ feedback is sent to the network simultaneously through two different streams or layers at SBFD slots, enhancing robustness. A UE 6202 may transmit HARQ L1 6206 on subband A to the gNB 6204 simultaneously with HARQ L2 6208 on subband B.

Subband-Hopping HARQ Feedback may be used in a SBFD scenario. This embodiment integrates intra- and inter-slot subband-hopping to improve HARQ feedback reliability in SBFD. This method allows UE to follow a specific subband hopping pattern to send HARQ feedback. The subband hopping pattern is configured in RRC for at least a UE or more UEs by gNB. By spreading consecutive feed-backs across multiple subbands in both time and frequency domains, it minimizes the impact of localized interference (in case of SBFD could be SI or CLI). The pseudo-random hopping pattern ensures minimal overlap with other UL transmissions, particularly in SBFD systems with dense traffic scenarios, achieving collision free. The gNB can adjust semi statically hopping parameters based on interference measurements.

For a given bandwidth of a single carrier, different subband groups (SBG) can be defined. Each SBG can be utilized with one or group of UEs to transmit their HARQ feedback. Within each SBG, UE specific pseudo random hopping pattern is utilized by each UE.

Figure 63:
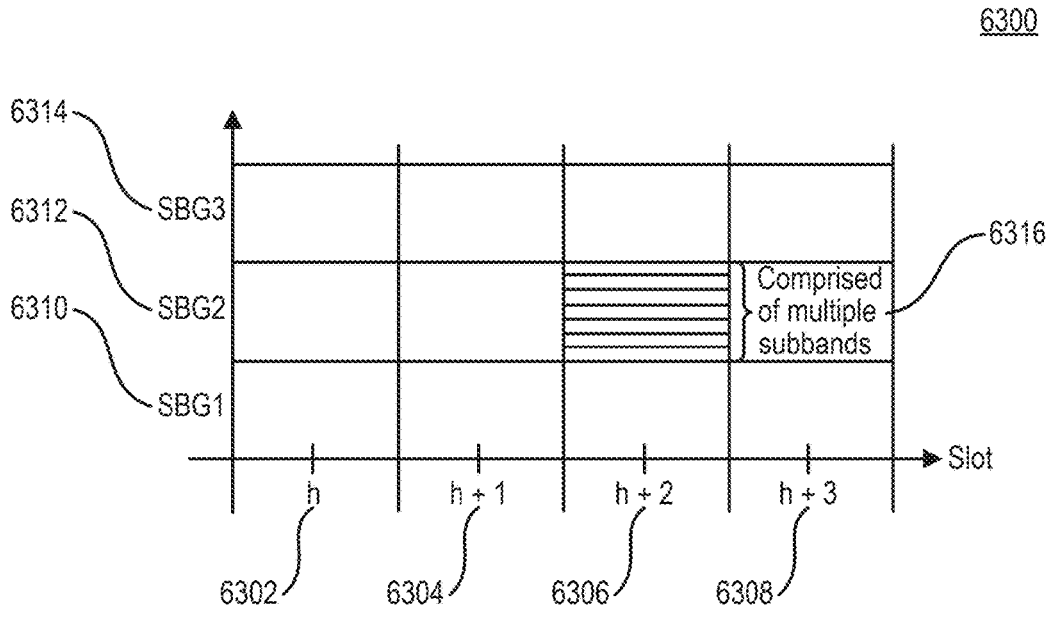
FIG. 63 is an illustration of subband groups and subbands over SBFD slots.

FIG. 63 is an illustration 6300 of subband groups and subbands over SBFD slots. Specifically, FIG. 63 shows an example 6300 of four slots 6302-6308 and three subband groups (SBG) 6310-6314, each consisting or comprised of multiple subbands 6316 for SBFD.

To configure, the gNB may need to configure a subband group for UEs. A subband group index represents a portion of the bandwidth. Once the subband group is configured via RRC messages by gNB, the NW can configure UE specific pseudo random with a fully flexible string of subbands of corresponding subband group or alternatively preconfigured pseudo random hopping pattern index.

Figure 64:
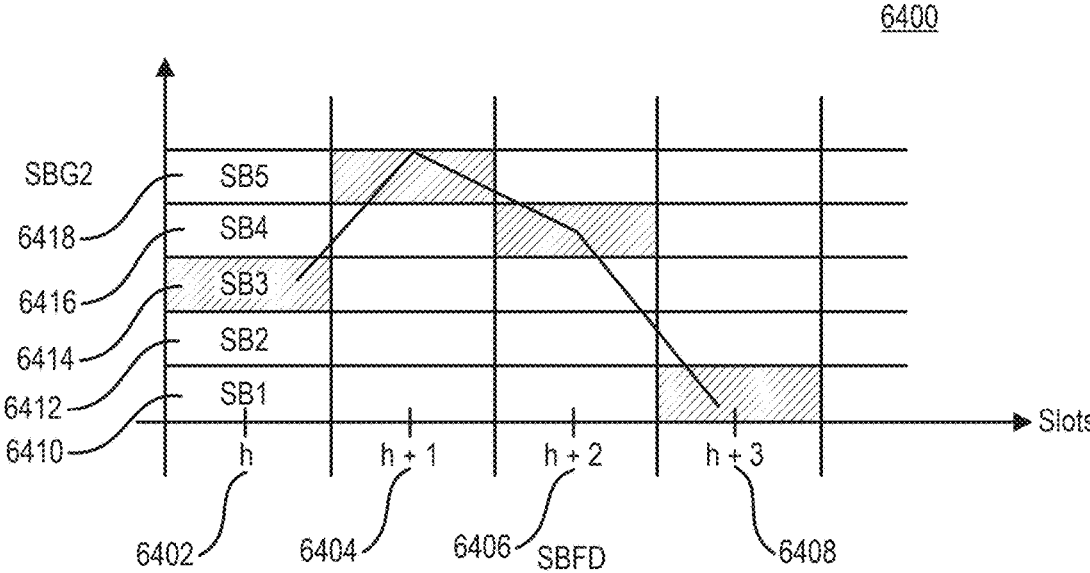
FIG. 64 is an example that illustrates SBG and subbands.

FIG. 64 is an example 6400 that illustrates SBG and subbands. Specifically, FIG. 64 shows an example 6400 of inter-slot subband hopping for a particular sub band group (e.g. SBG2) with hopping occurring on SB3, SB5, SB4 and SB1. Specifically, four slots 6402-6408 are shown over sub bands 6410-6418. First slot 6402 may employ SB3 6414. Second slot 6404 may employ SB5 6418. Third slot 6406 may employ SB4 6416. Fourth slot 6408 may employ SB1 6410. SB2 6412 is unused in this example 6400.

In this embodiment, UE performs Intra-Slot subband-Hopping where the UE switches subbands within a single slot for transmitting HARQ feedback. Each HARQ symbol within the slot follows a pseudo-random hopping pattern or preconfigured string of subbands defined by the gNB. For this purpose, a timing offset between the PDSCH reception and HARQ feedback transmission are configured by RRC in a semi static manner or dynamically with DCI. In case of inter-Slot subband-Hopping, across slots, HARQ feedback transmission occurs. The subband hopping follows a pre-configured or dynamically updated sequence provided by the gNB. This provides additional diversity over time.

The gNB pre-configures a frequency-hopping sequence for HARQ feedback transmission via RRC signaling. The hopping sequence is generated using pseudo-random number generators. Sequences can be generated either as static during initial connection setup, ensuring backward compatibility. Alternatively, dynamic sequences allow real-time adaptation based on interference and channel conditions, communicated via DCI or MAC CE.

The UE transmits HARQ feedback across the allocated subband range following the hopping sequence, for intra-slot hopping, feedbacks are sent out over multiple OFDM symbols within the slot, each on a different subband. For inter-slot hopping, the hopping sequence updates subband allocation on a per-slot basis.

HARQ feedback may be transmitted using PUCCH or PUSCH, with format selection based on feedback size and channel conditions. PUCCH formats 2-4 are used for larger payloads, while PUSCH supports enhanced reliability.

The gNB configures SBG for UEs using RRC signaling. A SBG represents a portion of the total available bandwidth, and each group can be assigned to one or more UEs. The subband group allows for flexible, pseudo-random hopping within the group.

```
RRCReconfiguration {
    subbandGroupConfig {
        subbandGroupIndex={int}, Index representing the
            subband group to be used by the UE.
        groupBandwidth={MHz}, Specifies the bandwidth
            allocated to the subband group.
        hoppingMode={Intra- or -InterSlot}, Indicates that
            intra- or inter-slot subband hopping is enabled.
        hoppingPatternType={Pseudo-Random or Flexible},
            Specifies that the hopping pattern is pseudo-ran-
            dom. Or Enables the flexibility of choosing dif-
            ferent hopping patterns for each UE within the
            same group.
        numberOfSubbands={int}, Defines the number of
            subbands within the subband group.
        hoppingRate={symbols for intra and slo for
            Interslot}, Defines the rate at which subband hop-
            ping occurs
    }
}
```

The gNB also configures each UE with a pseudo-random hopping pattern either via a pre-configured index or by directly defining a flexible string of subbands within the allocated subband group.

```
RRCReconfiguration
    {ueSpecificHoppingPattern {
        subbandGroupIndex={int}, The index of the sub-
            band group to which the UE is assigned.
        hoppingPattern={Pseudo-Random String}, The
            pseudo-random string of subbands that the UE
            uses for hopping.
        hoppingPatternIndex={int}, The pre-configured
            index for the pseudo-random hopping pattern,
            which is selected from a predefined set
        timingOffset={symbols}, The time offset for the
            UE's feedback transmission to synchronize it with
            the hopping pattern.
    }
}
```

The gNB signals the UE about subband hopping parameters, including subband group index, hopping pattern, and feedback transmission timing via DCI

```
DCI {
    subbandGroupIndex={int}, Indicates the subband
        group for HARQ feedback.
    hoppingPatternIndex={int}, Refers to the index of the
        pre-configured pseudo-random hopping pattern.
    hoppingRate={symbols}, The rate at which hopping
        occurs for the UE's feedback transmission
    timingOffset={symbols}, The time offset for the
        HARQ feedback transmission.
}
```

The gNB utilizes the pre-configured hopping pattern to identify the subbands for decoding, ensuring synchronization with UE transmissions. If the gNB detects errors or fails to decode the feedback, it initiates a retransmission request using DCI formats, such as 1_1 or 1_0, to allocate new PUSCH resources for feedback retransmission. Example Implementation:

Configuration: The gNB configures the UE with a hopping pattern spanning subbands {SB1, SB2, SB3, . . . . SBn}. The sequence is communicated via RRC signaling during initial setup or updated dynamically via MAC CE.

Feedback Transmission: In slot n: Three different HARQ feedback is transmitted on subbands {SB1, SB3, SB5}. In slot n+1: Feedback is transmitted on subbands {SB2, SB4, SB6}. This pattern continues, ensuring both intra-slot diversity (SB1 to SB5) and inter-slot diversity (across slot boundaries).

What is claimed is:

1. A method performed by a subband full duplex (SBFD) compliant base station, the method comprising:

transmitting a first indication of first synchronization signal/physical broadcast channel (SS/PBCH) blocks of a secondary cell (SCELL) of the base station;

transmitting a second indication by way of a Medium Access Control Control Element (MAC CE), wherein the second indication configures second on demand SS/PBCH blocks, wherein the MAC CE specifies a number N of on-demand SSB bursts on the SCELL and a system frame number (SFN) offset;

transmitting the first SS/PBCH blocks and the second on demand SS/PBCH blocks;

transmitting configuration information for a sounding reference signal (SRS) transmission corresponding to the SCELL, wherein the configuration information for the SRS transmission includes power control settings for SBFD symbols;

transmitting downlink control information (DCI) on the SCELL, wherein the DCI indicates whether the DCI corresponds to a dynamic grant or a static grant;

transmitting data on a physical downlink shared channel (PDSCH), in one or more SBFD subbands of the SCELL, in accordance with the DCI being dynamic or static; and receiving an SRS transmission on the SCELL in accordance with the configuration information for the SRS transmission.

2. The method of claim 1, further comprising:

transmitting second DCI, on the SCELL, wherein the second DCI allocates a resource for an uplink SBFD transmission; and receiving data in an uplink subband based on the received uplink DCI and a resource block offset (RB_offset).

3. The method of claim 2, wherein the uplink SBFD transmission is restricted to one or more resource block groups (RBGs).

4. The method of claim 1, further comprising:

transmitting higher layer signaling that specifies whether resource muting applies to non-SBFD symbols in addition to SBFD symbols of the SCELL;

wherein the higher layer signaling allows at least one UE to determine whether to mute one or more resources in both SBFD symbols and non-SBFD symbols the SCELL.

5. The method of claim 1, further comprising:

transmitting configuration information comprising a plurality of RB_offsets, each corresponding to one of a plurality of symbol types, wherein the plurality of symbol types include at least an SBFD symbol type and a non-SBFD symbol type; and receiving data on an uplink data channel, on the SCELL, according to the RB_offset for each of the plurality of symbol types.

6. The method of claim 1, further comprising:

transmitting radio resource control (RRC) information and DCI that provide information about a configured grant or a dynamic grant transmission in SBFD symbols, wherein the information includes a resource block offset;

receiving an uplink shared channel transmission in accordance with the resource block offset.

7. The method of claim 1, further comprising:

transmitting configuration information specifying a hopping sequence for physical uplink control channel (PUCCH) transmissions in sub band full duplex symbols;

receiving, based on the configuration information, in a first even numbered slot, a first PUCCH transmission on a first frequency;

receiving, based on the configuration information, in a second odd numbered slot, a second PUCCH transmission on a second frequency;

wherein the first frequency is different from the second frequency.

8. A base station comprising:

a transmitter configured to transmit first synchronization signal/physical broadcast channel (SS/PBCH) blocks of a secondary cell (SCELL) of the base station;

the transmitter configured to transmit a Medium Access Control Control Element (MAC CE), wherein the MAC CE configures second on demand SS/PBCH blocks and specifies a number N of on-demand SSB bursts on the SCELL and a system frame number (SFN) offset;

the transmitter configured to transmit the second on demand SS/PBCH blocks;

the transmitter configured to transmit configuration information for a sounding reference signal (SRS) transmission corresponding to the SCELL including power control settings for SBFD symbols;

the transmitter configured to transmit downlink control information (DCI) on the SCELL, wherein the DCI indicates whether the DCI corresponds to a dynamic grant or a static grant;

the transmitter configured to transmit data on a physical downlink shared channel (PDSCH), in one or more SBFD subbands of the SCELL, in accordance with the DCI indicating a dynamic or static grant; and a receiver configured to receive an SRS transmission on the SCELL in accordance with the configuration information for the SRS transmission.

9. The base station of claim 8, further comprising:

the transmitter configured to transmit higher layer signaling that specifies whether resource muting applies to non-SBFD symbols in addition to SBFD symbols of the SCELL;

wherein the higher layer signaling allows at least one UE to determine whether to mute one or more resources in both SBFD symbols and non-SBFD symbols the SCELL.

10. The base station of claim 8, wherein:

the transmitter is configured to transmit information indicating that a time/frequency resource configured for SBFD is to be alternatively used for downlink;

the transmitter is configured to transmit a downlink signal on the time/frequency resource.

11. The base station of claim 8, further comprising:

circuitry configured to allocate a first time interval for SBFD and to process uplink and downlink transmissions during the first time interval;

the transmitter configured to transmit downlink control information or a media access control control element (MAC CE) that indicates, for a second time interval, that an uplink subband width is different from that of an uplink subband width employed during the first time interval;

wherein the first time interval and the second time interval are different time intervals.

12. The base station of claim 8, further comprising:

circuitry configured to allocate a first time interval for SBFD and to process uplink and downlink transmissions during the first time interval;

the transmitter configured to transmit downlink control information or a media access control control element (MAC CE) that indicates, for a second time interval, that an uplink or downlink subband position is different from that of an uplink or downlink subband position of the first time interval;

wherein the first time interval and the second time interval are different time intervals.

13. The base station of claim 8, further comprising:

circuitry configured to split a time division duplex (TDD) subband into a plurality of subbands including at least a first subband and a second subband, wherein the first subband has a first time duplex configuration and the second subband has a second time duplex configuration, wherein the first time duplex configuration and the second time duplex configuration are different;

the transmitter configured to transmit an indication of the first time duplex configuration and the second time duplex configuration.

14. A method performed by a sixth-generation (6G) user equipment (UE) in communication with at least one sub band full duplex (SBFD) compliant base station (BS), the method comprising:

receiving one or more first synchronization signal/physical broadcast channel (SS/PBCH) blocks;

receiving a Medium Access Control Control Element (MAC CE) which specifies a number N of on-demand SSB bursts of a secondary cell (SCELL) and a system frame number (SFN) offset;

receiving one or more on demand SS/PBCH blocks on the SCELL in accordance with the MAC CE;

receiving downlink control information (DCI) on the SCELL;

transmitting data on a physical uplink shared channel (PUSCH), in an uplink subband of the SCELL, in accordance with the DCI, wherein the uplink subband has a first width;

transmitting a sounding reference signal (SRS) on the SCELL in accordance with SBFD configuration information received by the UE;

receiving configuration information indicating a second uplink subband width, wherein the second uplink subband width is different than the first uplink width;

transmitting data in accordance with the second uplink subband width in response to receiving another DCI.

15. The method of claim 14, further comprising:

receiving information indicating that a time/frequency resource configured for SBFD is to be alternatively used for downlink;

receiving a downlink signal on the time/frequency resource.

16. The method of claim 14, wherein the configuration information indicating the second uplink subband width is received via downlink control information.

17. The method of claim 14, further comprising:

receiving information allocating a first time interval for SBFD and processing uplink and downlink transmissions during the first time interval;

receiving information indicating that an uplink or downlink subband position of a second time interval is different from that of an uplink or downlink subband position of the first time interval;

wherein the first time interval and the second time interval are different time intervals.

18. The method of claim 14, wherein:

a time division duplex (TDD) subband is split into a plurality of subbands including at least a first subband and a second subband, wherein the first subband has a first time duplex configuration and the second subband has a second time duplex configuration, wherein the first time duplex configuration and the second time duplex configuration are different.

19. The method of claim 1, wherein the DCI corresponds to a dynamic grant.

20. The base station of claim 8, wherein the DCI corresponds to a dynamic grant.

* * * * *